(12) United States Patent
Low et al.

(10) Patent No.: US 11,699,087 B2
(45) Date of Patent: Jul. 11, 2023

(54) HAMILTONIAN SIMULATION IN THE INTERACTION PICTURE

(71) Applicant: Microsoft Technology Licensing, LLC, Redmond, WA (US)

(72) Inventors: Guang Hao Low, Redmond, WA (US); Nathan O. Wiebe, Redmond, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 1043 days.

(21) Appl. No.: 16/383,365

(22) Filed: Apr. 12, 2019

(65) Prior Publication Data
US 2019/0318053 A1    Oct. 17, 2019

Related U.S. Application Data

(60) Provisional application No. 62/656,517, filed on Apr. 12, 2018.

(51) Int. Cl.
G06N 10/00    (2022.01)
G06F 30/20    (2020.01)
G06F 111/10   (2020.01)

(52) U.S. Cl.
CPC .......... G06N 10/00 (2019.01); G06F 30/20 (2020.01); *G06F 2111/10* (2020.01)

(58) Field of Classification Search
CPC ...... G06F 30/20; G06F 2111/10; G06N 10/00
See application file for complete search history.

(56) References Cited

U.S. PATENT DOCUMENTS

| | | | |
|---|---|---|---|
| 6,678,450 B1* | 1/2004 | Franson | B82Y 10/00 359/326 |
| 10,169,445 B2* | 1/2019 | Weinstein | G06F 16/287 |
| 2003/0055513 A1* | 3/2003 | Raussendorf | G06N 10/00 700/1 |
| 2009/0097652 A1* | 4/2009 | Freedman | G06N 10/00 380/259 |
| 2011/0313741 A1* | 12/2011 | Langhoff | G16C 20/30 703/2 |

(Continued)

OTHER PUBLICATIONS

Wu, R., Chakrabarti, R., & Rabitz, H. (2008). Optimal control theory for continuous-variable quantum gates. Physical Review A, 77(5), 052303. (Year: 2008).*

(Continued)

*Primary Examiner* — Bijan Mapar
(74) *Attorney, Agent, or Firm* — Klarquist Sparkman, LLP

(57) ABSTRACT

In this disclosure, quantum algorithms are presented for simulating Hamiltonian time-evolution $e^{-i(A+B)t}$ in the interaction picture of quantum mechanics on a quantum computer. The interaction picture is a known analytical tool for separating dynamical effects due to trivial free-evolution A from those due to interactions B. This is especially useful when the energy-scale of the trivial component is dominant, but of little interest. Whereas state-of-art simulation algorithms scale with the energy $\|A+B\| \leq \|A\| + \|B\|$ of the full Hamiltonian, embodiments of the disclosed approach generally scale linearly with the sum of the Hamiltonian coefficients from the low-energy component B and poly-logarithmically with those from A.

15 Claims, 15 Drawing Sheets

(56) References Cited

U.S. PATENT DOCUMENTS

| | | | | |
|---|---|---|---|---|
| 2012/0072191 | A1* | 3/2012 | Freedman | H04L 9/0852 |
| | | | | 703/2 |
| 2015/0046457 | A1* | 2/2015 | Weinstein | G06F 16/287 |
| | | | | 707/737 |
| 2018/0189444 | A1* | 7/2018 | van Rooyen | G16B 50/30 |
| 2018/0240032 | A1* | 8/2018 | van Rooyen | G06K 9/6297 |
| 2018/0336299 | A1* | 11/2018 | Barzegar | G06F 30/20 |
| 2019/0181256 | A1* | 6/2019 | Roberts | H01L 29/66 |
| 2020/0143280 | A1* | 5/2020 | Haah | G06N 10/00 |
| 2020/0185120 | A1* | 6/2020 | Keesling Contreras | |
| | | | | G21K 1/06 |

OTHER PUBLICATIONS

Aharonov et al., "Adiabatic Quantum State Generation and Statistical Zero Knowledge," *ACM Symp. on Theory of Computing*, pp. 20-29 (Jun. 2003).

Babbush et al., "Low Depth Quantum Simulation of Electronic Structure," *Quantum Physics*, pp. 1-41 (May 2017).

Berry et al., "Black-Box Hamiltonian Simulation and Unitary Implementation," *Quantum Information and Computation*, vol. 12, No. 1&2, pp. 29-62 (Jan. 2012).

Berry et al., "Efficient quantum algorithms for simulating sparse Hamiltonians," *Communications in Mathematical Physics*, vol. 270, Issue 2, pp. 1-9 (Mar. 2007).

Berry et al., "Exponential improvement in precision for simulating sparse Hamiltonians," *ACM Symp. on Theory of Computing*, pp. 283-291 (May 2014).

Berry et al., "Exponential Improvement in Precision for Simulating Sparse Hamiltonians," *Forum of Mathematics, Sigma*, vol. 5, pp. 1-40 (Mar. 2017).

Berry et al., "Hamiltonian simulation with nearly optimal dependence on all parameters," *IEEE Symp. on Foundations of Computer Science*, pp. 792-809 (Oct. 2015).

Berry et al., "Improved Techniques for Preparing Eigenstates of Fermionic Hamiltonians," *npj Quantum Information*, vol. 4, Issue, 1, pp. 1-16 (Mar. 2018).

Berry et al., "Simulating Hamiltonian dynamics with a truncated Taylor series," arXiv:1412.4687v1, LA-UR-14-22745, MIT-CTP #4618, 5 pp. (Dec. 2014).

Berry et al., "Simulating Hamiltonian Dynamics with a Truncated Taylor Series," *Physical Review Letters*, vol. 114, Issue 9, pp. 1-5 (Mar. 2015).

Childs et al., "Hamiltonian Simulation Using Linear Combinations of Unitary Operations," *Quantum Information and Computation*, vol. 12, No. 11&12, pp. 901-924 (Jan. 2012).

Childs, "On the relationship between continuous- and discrete-time quantum walk," *Communications in Mathematical Physics*, vol. 294, Issue 2, pp. 1-22 (Mar. 2010).

Childs et al., "Toward the first quantum simulation with quantum speedup," *Proc. National Academy of Sciences*, vol. 115, Issue 38, pp. 1-64 (Sep. 2018).

Ferris, "Fourier transform of fermionic systems and the spectral tensor network," *Physical Review Letters*, vol. 113, Issue 1, pp. 1-9 (Jul. 2014).

Feynman, "Simulating Physics with Computers," *Int'l Journal of Theoretical Physics*, vol. 21, Nos. 6/7, pp. 467-477 (Jun. 1982).

Haah et al., "Quantum algorithm for simulating real time evolution of lattice Hamiltonians," *IEEE Symp. on Foundations of Computer Science*, pp. 350-360 (Oct. 2018).

Hadfield et al., "Divide and conquer approach to quantum Hamiltonian simulation," *New Journal of Physics*, vol. 20, No. 4, pp. 1-30 (Apr. 2018).

International Search Report and Written Opinion dated Jul. 12, 2019, from International Patent Application No. PCT/US2019/027357, 17 pp.

Lloyd, "Universal Quantum Simulators," *Science*, vol. 279, No. 5278, pp. 1073-1078 (Aug. 1996).

Low et al., "Hamiltonian Simulation by Qubitization," *Quantum Physics*, pp. 1-20 (Oct. 2016).

Low et al., "Hamiltonian Simulation by Uniform Spectral Amplification," *Quantum Physics*, pp. 1-32 (Jul. 2017).

Low et al., "Hamiltonian Simulation in the Interaction Picture," *Quantum Physics*, pp. 1-30 (May 2018).

Low et al., "Optimal Hamiltonian Simulation by Quantum Signal Processing," *Physical Review Letters*, vol. 118, No. 1, pp. 1-5 (Jan. 2017).

Masum Habib et al., "Modified Dirac Hamiltonian for efficient quantum mechanical simulations of micron sized devices," *Applied Physics Letters*, vol. 108, pp. 1-4.

Novo et al., "Improved Hamiltonian simulation via a truncated Taylor series and corrections," *Quantum Information & Computation*, vol. 17, No. 7-8, pp. 1-11 (Nov. 2016).

Papageorgiou et al., "On the Efficiency of Quantum Algorithms for Hamiltonian Simulation," *Quantum Information Processing*, vol. 11, No. 2, pp. 1-15 (Apr. 2012).

Poulin et al., "Fast Quantum Algorithm for Spectral Properties," *Quantum Physics*, pp. 1-6 (Dec. 2017).

Shende et al., "Synthesis of Quantum Logic Circuits," *IEEE. Trans. on Computer-Aided Design of Integrated Circuits and Systems*, vol. 25, No. 6, pp. 1-19 (Jun. 2006).

Somma et al., "Spectral Gap Amplification," *SIAM Journal on Computing*, vol. 42, No. 2, pp. 1-14 (Apr. 2013).

Wiebe et al., "Higher Order Decompositions of Ordered Operator Exponentials," *Physics A Mathematical and Theoretical*, vol. 43, No. 6, pp. 1-17 (Dec. 2008).

\* cited by examiner

1500

Implement a quantum algorithm on a quantum computer for simulating a general sparse time-dependent quantum system, wherein the quantum algorithm does not use graph decomposition techniques - 1510

Figure 15

HAMILTONIAN SIMULATION IN THE INTERACTION PICTURE

CROSS-REFERENCE TO RELATED APPLICATIONS

This application claims the benefit of U.S. Provisional Application No. 62/656,517 entitled "HAMILTONIAN SIMULATION IN THE INTERACTION PICTURE" and filed on Apr. 12, 2018, which is hereby incorporated herein in its entirety.

SUMMARY

In this disclosure, quantum algorithms are presented for simulating Hamiltonian time-evolution $e^{-i(A+B)t}$ in the interaction picture of quantum mechanics on a quantum computer. The interaction picture is a known analytical tool for separating dynamical effects due to trivial free-evolution A from those due to interactions B. This is especially useful when the energy-scale of the trivial component is dominant, but of little interest. Whereas state-of-art simulation algorithms scale with the energy $\|A\|+\|B\|$ of the full Hamiltonian, embodiments of the disclosed approach generally scale with only the low-energy component $\|B\|$. Applied to simulating a periodic N-site Hubbard model with arbitrary long-ranged density-density interactions, the disclosed gate complexity $\tilde{\mathcal{O}}(N^2 t)$ is a quadratic improvement in N over prior art for electronic structure simulation in the plane-wave basis. More generally in the abstract query model, diagonally-dominant Hamiltonians with sparsity d can be simulated with cost independent of the diagonal component. The various contributions disclosed herein include a rigorous analysis of a low-space overhead simulation algorithm based on the Dyson series for general time-dependent Hamiltonians, which also enables a quadratic improvement in sparsity for time-dependent simulation with $\tilde{\mathcal{O}}$ (td) queries.

In some embodiments of the disclosed technology, a quantum computer is configured to simulate a quantum system, and a Hamiltonian in the simulation is represented in the interaction picture. The simulation of the quantum system is then performed using the quantum computer. In certain implementations, the simulation of the quantum system is a subroutine that is repeated two or more times. In some implementations, the simulation is performed using linear combinations of unitaries. For instance, in some cases, the simulation uses linear combinations of unitaries performed on a diagonally dominant matrix (e.g., using linear combinations of unitaries performed on the diagonally dominant components of the diagonally dominant matrix). In certain implementations, the quantum system is modelled by a Hubbard model. In particular implementations, the quantum system describes a physical chemical system or molecule. In some implementations, the Hamiltonian is sparse and the simulation uses the a state of an auxiliary qubit to encode the matrix elements of the Hamiltonian instead of using graph decomposition techniques. In certain implementations, the simulation is performed by compressing ancillas for quantum simulation of a time-dependent Hamiltonian.

In further embodiments, a quantum algorithm is implemented on a quantum computer for simulating a general sparse time-dependent quantum system. In this embodiment, the quantum algorithm does not use graph decomposition techniques. In certain implementations, a quantum Hamiltonian used in the simulation is represented in the interaction picture. In some implementations, the simulation uses linear combinations of unitaries performed on a diagonally dominant matrix. In particular implementations, an interaction Hamiltonian is chosen to be a diagonal matrix. In certain implementations, the quantum system is modelled by a Hubbard model, a physical chemical system, or a molecule. In further implementations, the simulation includes compressing ancillas use to index the time for the simulation.

The foregoing and other objects, features, and advantages of the disclosed technology will become more apparent from the following detailed description, which proceeds with reference to the accompanying figures.

BRIEF DESCRIPTION OF THE DRAWINGS

FIG. 15 illustrates a further example method for performing a quantum simulation in accordance with an embodiment of the disclosed technology.

DETAILED DESCRIPTION

I. General Considerations

Figure 1:
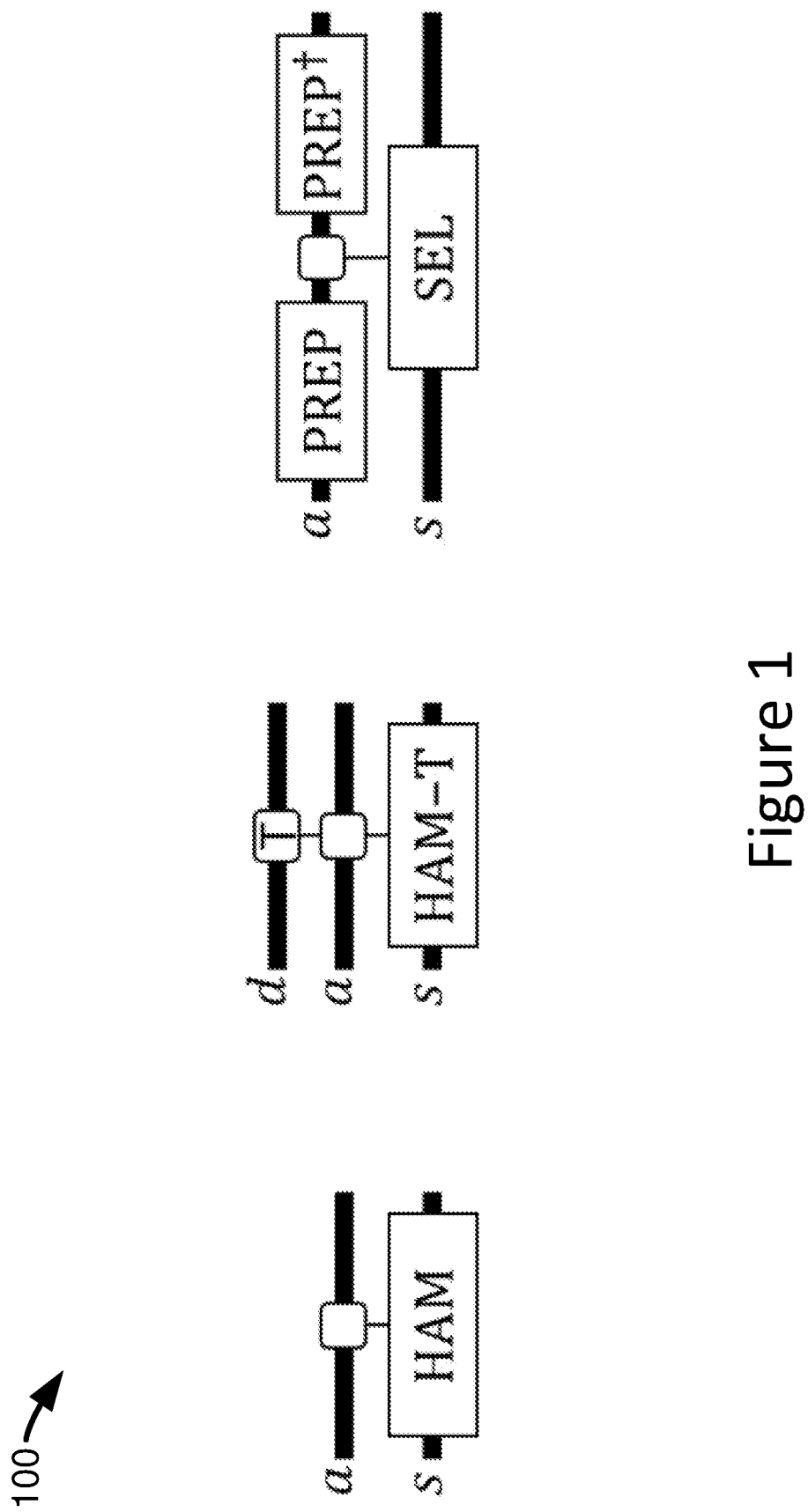
FIG. 1 is a schematic block diagram showing a circuit that implements HAM with normalization constant $\alpha = \Sigma_{j=1}^{\prime} \alpha_j$ using example unitary oracles.

As used in this application, the singular forms "a," "an," and "the" include the plural forms unless the context clearly dictates otherwise. Additionally, the term "includes" means "comprises." Further, the term "coupled" does not exclude the presence of intermediate elements between the coupled items. Further, as used herein, the term "and/or" means any one item or combination of any items in the phrase.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed systems, methods, and apparatus can be used in conjunction with other systems, methods, and apparatus. Additionally, the description sometimes uses terms like "produce" and "provide" to describe the disclosed methods. These terms are high-level abstractions of the actual operations that are performed. The actual operations that correspond to these terms will vary depending on the particular implementation and are readily discernible by one of ordinary skill in the art.

II. Introduction

Many-body dynamics are often described by a Hamiltonian H=A+B with two non-commuting parts: a well-understood but trivial free-particle theory A, and a more interesting component B describing interactions. One often finds a large separation of energy scales $\|A\| \gg \|B\|$ in nature. For instance, the ultra-violet cutoff of a free scalar field is usually assumed to be significantly higher than the energy scale of its interactions. In practical applications, the energy contribution of electron-electron correlations in molecules and materials are typically larger than chemical accuracy, at 4 kJ mol$^{-1}$, but still much smaller than the Hartree-Fock component.

Dynamical effects arising from the interaction are often the subject of interest. Whereas the quantum state-vector $|\varphi_I(t)\rangle$ evolves under the full Hamiltonian by the Schrödinger equation $i\partial_t|\varphi(t)\rangle=(A+B)|\varphi(t)\rangle$, the interaction picture moves to the rotating frame of the trivial dynamics. This frame allows one to focus on effects of the interaction, and is particularly fruitful when interactions are perturbative corrections to the free-theory. For instance, an analytic evaluation of the time-ordered propagator of the interaction picture Hamiltonian $H_I(t)=e^{iAt}Be^{-iAt}$ is possible by perturbative expansions based on Green's functions and Feynman diagrams. However, such techniques fail for interactions that are non-perturbative, even if they are weak relative to the free theory. In such situations, one resorts to numerical simulations.

Numerical simulations of quantum dynamics scale exponentially with particle number, so the interaction picture provides little advantage here. One then relies on non-perturbative numerical approximations such as density-functional theory or Monte Carlo path-integral evaluation. Though highly successful in elucidating qualitative behavior, obtaining accurate quantitative predictions to high precision is difficult. For instance, achieving chemical accuracy in ab-initio quantum chemistry calculations of reaction rates often only possible by exact diagonalization of the Hamiltonian. This has an exponentially growing cost $e^{\mathcal{O}(n)}$ with the system size n. (The standard big-$\mathcal{O}$ notation defines $f(n)=\mathcal{O}(g(n))$ for positive functions $f(n),g(n)>0$ as the existence of absolute constants $\alpha>0, b>0$ such that for any $n>\alpha$, $f(n) \leq bg(n)$. One can also use $f(n)=\tilde{\mathcal{O}}(g(n))$ when $f(n) \leq bg(n)$ polylog(g(n)), and $f(n)=\Omega(g(n))$ when $f(n) \geq bg(n)$, and $f(n)=\Theta(g(n))$ when both $f(n)=\mathcal{O}(g(n))$ and $f(n)=\Omega(g(n))$ are true.)

One approach that is tractable and non-perturbative is simulating quantum dynamics on a quantum computer. Given a $\mathcal{O}$ (poly(n))-sized description of a time-independent Hamiltonian H, one devises a sequence of $\mathcal{O}$ (poly(n)) primitive quantum gates that approximates the unitary time-evolution operator $e^{-iHt}$ with error $\epsilon$. (Primitive gate costs are defined as the number N of arbitrary single- and two-qubit gates. In fault-tolerant architectures, one multiples by an additional overhead $\mathcal{O}$ (log (N/$\epsilon$)) for approximating N such gates to total error $\epsilon$ using a universal discrete gate set, e.g. CLIFFORD+T.) This is then applied to the system state $|\varphi(0)\rangle$ encoded in $\mathcal{O}$ (poly(n)) logical quantum bits to obtain the time-evolved state $|\varphi(t)\rangle =e^{-iHt}|\varphi(0)\rangle$. Algorithms for Hamiltonian simulation have progressed rapidly culminating recently in schemes with optimal query complexity $\mathcal{O}$ (nt+log (1/$\epsilon$)) with respect to all parameters for generic sparse Hamiltonians, and algorithms for geometrically-local exponentially-decaying interactions, with gate complexity $\mathcal{O}$ (nt polylog(nt/$\epsilon$)) that is optimal up to poly-logarithmic factors.

It would be desirable if the cost of simulating time-evolution scaled with energy of the smaller interaction term, say $\mathcal{O}$ (t$\|B\|$). As the interaction picture Hamiltonian has norm $\|H_I(t)\|=\|B\|$, this possibility is highly suggestive. Nevertheless, state-of-art performs simulation in the Schrödinger picture, where the gate cost of simulating $e^{-iHt}$ generally scales at least like $\Omega(t(\|A\|+\|B\|)\log(1/\epsilon))$, even if the trivial dynamics $e^{-iAt}$ of term A may be evaluated in closed-form. Even with specialized techniques that scale with a geometric mean $\mathcal{O}$ ($e^{\mathcal{O}(k)}t\|A\|(t\|B\|/\epsilon)^{1/k}$), $\forall k \in 2\mathbb{Z}^+$. the uninteresting component $\mathcal{O}$ (t$\|A\|$) is the dominant prefactor.

Unfortunately, simulation in the interaction picture is difficult. There, evolution by a time-independent Hamiltonian H is transformed in the rotating frame $|\varphi_I(t)\rangle = e^{iAt}|\varphi(t)\rangle$ to evolution by a time-dependent Hamiltonian $H_I(t)=e^{iAt}Be^{-iAt}$. This follows from an elementary manipulation of the Schrödinger equation:

$$i\partial_t|\varphi(t)\rangle=(A+B)|\varphi(t)\rangle \rightarrow i\partial_t|\varphi_I(t)\rangle=e^{iAt}Be^{-iAt}|\varphi_I(t)\rangle. \quad (1)$$

Implementing the time-ordered propagator $\mathcal{T}$ [exp($-i\int_0^t$H(s) ds)] that solves Eq. (1) on a quantum computer requires time-dependent simulation algorithms. These are generally more complicated than time-independent algorithms, and exhibit different cost trade-offs that do not appear favorable. For instance, an order-k time-dependent Trotter-Suzuki product formula has a cost that scales with the rate of change of H(t) like $\mathcal{O}$ ($e^{\mathcal{O}(k)}(t\Lambda)^{1+1/(2k)}$), where $\Lambda = \max_s\|\dot{H}(s)\|^{1/2}=\mathcal{O}$ ($\|[A,B]\|^{1/2}$). More advanced techniques based on compressed fractional queries appear to scale better like ~

$$t\|B\| \frac{\log(\Lambda t/\epsilon)}{\log\log(\Lambda t/\epsilon)}$$

but in terms of queries to a unitary oracle that obscures the gate complexity as it expresses Hamiltonian matrix elements at different times in binary, and may be difficult to implement in practice. One proposed technique directly implements a truncated Dyson series of a the time-ordered propagator and argues, though without proof, a similar scaling in terms of queries to a different type of oracle.

Here, it is shown that simulation in the interaction picture can substantially improve the efficiency of simulation. In Section III, the general time-dependent simulation algorithm is completed by a truncated Dyson series by providing a rigorous analysis of the approximation and explicit circuit constructions, with improvements in gate and space complexity over previously expected costs. In Section IV, situations are identified where the gate complexity of implementing these queries scale with the interaction strength $\mathcal{O}$ ($\|B\|$), and not the larger uninteresting component $\mathcal{O}$ ($\|A\|$). Such are the cases where simulation in the interaction picture is advantageous. In Section V, the potential of interaction-picture simulation by an electronic structure application in the plane-wave basis is discussed. Further, the cost of simulating the time-evolution of N spin-orbitals subject to long-range electron-electron interactions to $\tilde{\mathcal{O}}$ ($N^2 t$) gates is discussed, which is close to a quadratic improvement over prior art of $\tilde{\mathcal{O}}$ ($N^{11/3} t$). In Section VI, a complexity theoretic perspective of the disclosure is provided by considering the abstract problem of simulating time-dependent sparse Hamiltonians in the standard query model. A quadratic improvement in sparsity scaling is shown, and optimized algorithms for simulating diagonally dominant Hamiltonians are provided. A more detailed summary of main results in each section is as follows.

In Section III ("Time-dependent Hamiltonian simulation by a truncated Dyson series"), an example algorithm for a general time-dependent simulation algorithm Theorem 1 is provided. The example algorithm is based on approximating a truncation and discretization of the Dyson series for general time-dependent Hamiltonians H(t) characterized by spectral-norm $\alpha \geq \max_t \|H(t)\|$ and average rate-of-change $$\langle \|\dot{H}\| \rangle = \frac{1}{t} \int_0^t \|\dot{H}(s)\| ds.$$

A rigorous analysis of its performance is provided in together with explicit circuit constructions. Bounds on the approximation error is evaluated in Section III A, which is used to obtain the cost of simulating the time-ordered evolution operator. This cost is found to be $$O\left(\alpha t \frac{\log(\alpha t/\epsilon)}{\log\log(\alpha t/\epsilon)}\right)$$

queries to a certain unitary oracle HAM-T that encodes H(t) evaluated $$M = O\left(\frac{1}{\epsilon} \frac{\langle \|\dot{H}\| \rangle}{\alpha^3}\right)$$

points. Example implementations as disclosed in Section III B, characterized by Theorem 2, completes the scheme proposed by D. W. Berry, A. M, Childs, and R. Kothari, "Hamiltonian simulation with nearly optimal dependence on all parameters," in Proceedings of the 56th Annual IEEE Symposium on Foundations of Computer Science (FOCS), pages 792-809 (October 2015), with some improvements in gate complexity. One obtains scaling with the average rate-of-change $\mathcal{O}$ ($\log(\langle \|\dot{H}\| \rangle)$), instead of the worst case $\mathcal{O}$ ($\log(\max_t \|H(t)\|)$). This allows one to simulate Hamiltonians with arbitrary elementwise slew-rates, so long as $\|H(t)\|$ remains bounded. One can then devise a compression gadget in Section III C that reduces the qubit overhead complexity of this implementation to $\mathcal{O}$ ($\log(M)$), compared to $$O\left(\log(M) \frac{\log(\alpha t/\epsilon)}{\log\log(\alpha t/\epsilon)}\right)$$

of the original. This gadget is of independent interest and also applicable to the time-independent truncated Taylor series algorithm, discussed in Section X A for completeness.

In Section IV ("Accelerated interaction picture simulation"), one can apply this truncated Dyson series algorithm to simulate time-evolution by $e^{-i(A+B)t}$ in the interaction picture. One can evaluate the gate complexity in Section IV A for one possible construction of these queries HAM-T for the interaction picture Hamiltonian $H_I(t) = e^{iAt} B e^{-iAt}$. This leads to the simulation algorithm Theorem 3 for time-evolution by $e^{-i(A+B)t}$ with gate complexity $$\mathcal{O} ((C_B + C_{e^{iA/\alpha_B}}) \alpha_B t \, \mathrm{polylog}(\|A\|, \alpha_B, t, \epsilon)), \quad (2)$$

where $C_B$ is the gate complexity a unitary oracle $O_B$ such that $$(\langle 0|_a \otimes I_s) O_B (|0\rangle_a \otimes I_s) = \frac{B}{\alpha_B},$$

and $C_{e^{iA/\alpha_B}}$ is the cost of simulating time-evolution by A for time $\mathcal{O}$ ($\alpha_B^{-1}$). This may be compared to state-of-art Schrödinger picture simulation algorithms for time-independent Hamiltonians, which have gate complexity $$\mathcal{O} ((C_B + C_A)(\alpha_B + \alpha_A) t \, \mathrm{polylog}(\|A\|, \|B\|, t, \epsilon)), \quad (3)$$

where $C_A$ is analogous to $C_B$ but for the Hamiltonian term A. The disclosed result Eq. (2) is then advantageous in cases where $\|A\| \gg \|B\|$ and $C_{e^{iA/\alpha}} = \mathcal{O}$ ($C_B$). There, the gate complexity scales with the interaction strength $\|B\|$, and not the larger uninteresting component $\|A\|$, up to polylogarithmic factors.

In Section V ("Application to the Hubbard model with long-ranged interactions"), One can demonstrate a concrete advantage for Hamiltonian simulation in the interaction picture over time-independent simulation algorithms. One can consider a general Hubbard periodic model on N lattice sites in an arbitrary number of dimensions, which has Hamiltonian $$H = \sum_{\vec{x},\vec{y},\sigma} T(\vec{x}-\vec{y}) a^\dagger_{\vec{x}\sigma} a_{\vec{y}\sigma} + \sum_{\vec{x},\sigma} U(\vec{x},\sigma) n_{\vec{x}\sigma} + \sum_{(\vec{x},\sigma) \neq (\vec{y},\sigma')} V(\vec{x}-\vec{y}) n_{\vec{x}\sigma} n_{\vec{y}\sigma'}, \quad (4)$$

where $a^\dagger_{\vec{x}\sigma}$, $a_{\vec{x}\sigma}$ are Fermionic creation and annihilation operators indexed by lattice position $\vec{x}$ and spin $\sigma$, and $n_{\vec{x}\sigma}$ is a number operator. Note that one can allow for arbitrary translationally invariant kinetic T(•) hopping terms and long-range density-density V(•) interactions, subject to arbitrary local disorder U(•). Provided that the kinetic term is extensive, embodiments of the disclosed interaction-picture algorithm have gate complexity $\tilde{\mathcal{O}}$ ($N^2 t$), independent of U and V up to poly-logarithmic factors. This model generalizes electronic structure simulations in the plane-wave basis, considered in Section V A, where one obtains almost a quadratic improvement over the prior art of $\tilde{\mathcal{O}}$ ($N^{11/3} t$) gates for this special case. This is complementary to recent work by Jeongwan Haah, Matthew B Hastings, Robin Kothari, and Guang Hao Low, Quan- tum algorithm for simulating real time evolution of lattice Hamiltonians. arXiv preprint arXiv:1801.03922, 2018, which achieves $\tilde{\mathcal{O}}$ (Nt) scaling, but under the assumption of short-range exponentially decaying coefficients.

In Section VI ("Application to sparse Hamiltonian simulation"), the application to the Hubbard model with long-ranged interactions is explained.

Consider next a complexity-theoretic generalization of the technology that has been developed for time-dependent simulation and simulation in the interaction picture. The standard query model for black-box d-sparse Hamiltonian simulation assumes access to a unitary oracle that provides the positions and values of non-zero entries of the Hamiltonian. Each row has at most d non-zero entries, and the maximum absolute value of any entry is $\|H\|_{max}$. This informtmation is also provided as a function of a time index for time-dependent Hamiltonians, In Section VI A, one considers this time-dependent case and show with Theorem 4 that the time-ordered evolution operator may be simulated using $$O\left(td\|H\|_{max} \frac{\log(td\|H\|_{max}/\epsilon)}{\log\log(td\|H\|_{max}/\epsilon)}\right)$$

queries. Though linear scaling with respect to d is well-known in the time-independent case, this is a quadratic improvement in sparsity scaling over prior art for the time-dependent case. An analogous treatment for simulating sparse time-independent Hamiltonian in the interaction picture in Section VI B, Theorem 5 has query complexity that scales only with $\|H_{od}\|_{max}$, which is the maximum absolute value of any off-diagonal entry. This improved cost $$O\left(td\|H_{od}\|_{max} \frac{\log(td\|H_{od}\|_{max}/\epsilon)}{\log\log(td\|H_{od}\|_{max}/\epsilon)}\right),$$

is particularly advantageous for the common situation of diagonally dominant Hamiltonians.

III Time-Dependent Hamiltonian Simulation by A Truncated Dyson Series

The time-dependent simulation technique applied throughout this work is motivated by the Dyson series which solves the time-dependent Schrödinger equation. The Dyson series is a power-series expansion of the unitary propagator that involves integrals of products of H(t) at different times. The technique implements a truncation of this power-series, where integrals in each term is discretized in time.

This technology is presented with a rigorous analysis of the truncation and discretization error in Section III A, followed by an explicit circuit construction that is in the spirit of earlier work in Section III B. Two improvements are of note. First, the gate complexity of the algorithm scales with the average rate-of-change $\mathcal{O}$ ($\log(\langle\|\dot H\|\rangle)$), instead of the worst case $\mathcal{O}$ ($\log (\max_t\|\dot H(t)\|)$). This allows one to simulate Hamiltonians with arbitrary element-wise slew-rates, so long as $\|H(t)\|$ remains bounded. Second, in Section III C, an alternate implementation of the technique is introduced that reduces the space overhead of the original proposal substantially, and has the same query and gate complexity.

The complexity of any simulation algorithm depends on assumptions made about how information on the time-dependent Hamiltonian H(t) is accessed by the quantum computer. This section begins by defining an input model for the unitary quantum oracle HAM-T that encodes H(t). The complexity of time-dependent simulation is then expressed in terms of queries to HAM-T (It is assumed that the query complexity to a controlled-unitary black-box is the same as that to the original black-box. In general, this will not affect the gate complexity. Though there are often cleverer ways to implement an arbitrary controlled-unitary, in the worst-case, all quantum gates may be replaced by their controlled versions with constant overhead.), any additional primitive gates required beyond HAM-T, and the total number of qubits required including that for HAM-T. In later sections where the time-dependent simulation algorithm is applied to the interaction picture, this oracle is "opened up" and and the gate complexity of its implementation is discussed.

A common assumption in the time-independent situation is that $H=\Sigma_{j=1}^{l} \alpha_j H_j$ is a sum of l local Hermitian terms with positive coefficients $\alpha_j$, and that each term $e^{-iH_j t}$ may be implemented with $\mathcal{O}$ (1) quantum gates for any t. In abstract models for sparse Hamiltonians, a binary representation of matrix entries $H_{jk}$ and positions are returned in superposition by querying a certain unitary quantum oracle that is a natural generalization of classical Boolean circuits, Here, Hamiltonians H is considered encoded in a so-called standard-form. For any time-independent Hamiltonian H, it is assumed that there exists a unitary oracle HAM such that $$(\langle 0|_a \otimes I_s)HAM(|0\rangle_a \otimes I_s)=H/\alpha, \qquad (5)$$

where HAM acts jointly on registers α, s consisting of $n_\alpha$, $n_s$ qubits respectively, and $\alpha \geq \|H\|$ is a normalization constant that should be made small for best performance. In other words, post-selected on the $n_\alpha$-qubit measurement outcome $|0\rangle_\alpha$ the Hamiltonian H is applied on any arbitrary state in the system register s. Use of this is justified as it generalizes a variety of different input models. Thus any simulation algorithm that queries Eq. (5) for this general case readily specializes to more structured inputs. As an example, $H=\Sigma_{j=1}^{2^{n_\alpha}} \alpha_j U_j$ could be a linear combination of $l=2^{n_\alpha}$ unitaries. Then the circuit depicted in FIG. 1 implements HAM with normalization constant $\alpha=\Sigma_{j=1}^{l} \alpha_j$ using the unitary oracles $$HAM = (PREP^\dagger \otimes I_s) \cdot SEL \cdot (PREP \otimes I_s), \qquad (6)$$

$$PREP\ |0\rangle_a = \sum_{j=1}^{i} \sqrt{\frac{a_j}{\alpha}}\ |j\rangle_a,$$

$$SEL = \sum_{j=1}^{i} |j\rangle\langle j|_a \otimes U_j.$$

These unitaries each cost $\mathcal{O}$ (l) gates—PREP is implemented by arbitrary quantum state preparation on l dimensions, and SEL is implemented by binary-tree control logic for l different inputs. Typically, the number of terms in the Hamiltonian scales like $l=\mathcal{O}$ (poly($n_s$)), so $n_\alpha=\mathcal{O}$ (log(l)). However, the number of ancilla qubits can also be polynomial in $n_s$, such as in the simulation of sparse Hamiltonians where $n_\alpha \geq n_s+2$, or where a space-time complexity trade-off is possible.

FIG. 1 shows a quantum circuit representation of (left) an oracle HAM from Eq. (5) encoding a time-independent Hamiltonian, (center) an oracle HAM-T from Eq. (7) encoding a time-dependent Hamiltonian, and (right) an example implementation of HAM from with a linear-combination of unitaries from Eq. (6). Bold horizontal lines depict registers that in general comprise of multiple qubits. Vertical lines connecting boxes depict unitaries that act jointly on all registers covered by the boxes. A small square box marked by T indicates control by a time index.

A number of techniques may be applied to approximate the unitary time-evolution operator $e^{-iHt}$ to error $\epsilon$ by querying HAM. The combined Qubitization and quantum signal processing approach is one such algorithm with query complexity $\mathcal{O}(\alpha t + \log(1/\epsilon))$ that is optimal for sparse Hamiltonians. Alternatively, one could apply a truncated Taylor series of $e^{-iHt}$, which has a slightly worse query and space complexity, but benefits from being conceptually simpler. As the Dyson series algorithm is time-dependent generalization of the truncated Taylor series algorithm, a review and some useful background is provided before in Section X A for completeness.

A natural time-dependent generalization of Eq. (6) is the unitary oracle HAM-T encoding the Hamiltonian H(s) defined over time $s \in [0,t]$, with $t>0$. The continuous parameter s is discretized into an integer number of $M>0$ time bins which are indexed by $m \in \{0, 1, \ldots, M-1\}$. Here, it is assumed that H(s) is encoded in an analogous format $$(\langle 0|_a \otimes I_s) HAM-T (|0\rangle_a \otimes I_s) = \sum_{m=0}^{M-1} |m\rangle\langle m|_d \otimes \frac{H(m\Delta)}{\alpha}. \quad (7)$$

Given black-box access to HAM-T, details of a quantum algorithm that approximates the Dyson series Eq. (8) are provided. The overall algorithm is efficient so long as HAM-T has an efficient implementation in terms of primitive quantum gates. More formally, the performance of the algorithm is captured by the following theorem, proven in the remainder of this section.

Theorem 1 (Hamiltonian simulation by a truncated Dyson series). Let a time-dependent Hamiltonian H(s) be characterized by spectral norm $\alpha \geq \max_s \|H(s)\|$, and average rate-of-change $$\langle \|\dot{H}\| \rangle = \frac{1}{t} \int_o^t \left\| \frac{dH(s)}{ds} \right\| ds.$$

This Hamiltonian is defined for $s \in [0, t]$, where $|\alpha t| \leq \frac{1}{2}$, and is encoded in an oracle HAM-T acting on $n_s + n_\alpha + n_d$ qubits, as per Eq. (7), evaluated at $$M = \mathcal{O}\left(\frac{t^2}{\epsilon}\left(\frac{\langle\|\dot{H}\|\rangle}{\alpha} + \frac{\max_s \|H(s)\|^2}{\alpha^2}\right)\right)$$

points, where $n_d = \mathcal{O}(\log(M))$. Then the time-ordered evolution operator $\mathcal{T}[\exp(-i\int_0^t H(s)ds)]$ may be approximated to error $\epsilon$ with the following cost.

1. Queries to HAM-T: $\mathcal{O}\left(\frac{\log(t/\epsilon)}{\log\log(t/\epsilon)}\right)$.
2. Qubits: $n_s + \mathcal{O}(n_a + \log(M))$.
3. Primitive gates: $\mathcal{O}\left((n_a + \log(M))\frac{\log(1/\epsilon)}{\log\log(1/\epsilon)}\right)$.

Note that, this algorithm performs time-evolution for a relatively short duration of $t \leq \alpha^{-1}$. Time-evolution for longer durations is simulated by breaking the time-ordered evolution operator $\mathcal{T}[\exp(-i\int_0^t H(s)ds)]$ into $L = \mathcal{O}(\alpha t)$ time-steps $0 = t_0 < t_1 \ldots < t_L = t$ of size $\mathcal{O}(\alpha^{-1})$, and each step is implemented by the quantum circuit underlying Theorem 1 that queries a different HAM-T now defined for a Hamiltonian H(s) for $s \in [t_j, t_{j-1}]$. As the final error is $L\epsilon$ by a simple triangle inequality, one can rescale $\epsilon \to \epsilon/L$. Thus simulation for the full duration to error $\epsilon$ has query complexity $$\mathcal{O}\left(\alpha t \frac{\log(\alpha t/\epsilon)}{\log\log(\alpha t/\epsilon)}\right).$$

A. Dyson Series Truncation Error

The choice of parameters in Theorem 1 depends on the scaling of error from a finite and discrete approximation of the Dyson series. Consider a unitary propagator U(t) defined to solve the time-dependent Schrödinger equation $i\partial_t |\varphi(t)\rangle = H(t)|\varphi(t)\rangle$ by providing the state $|\varphi(t)\rangle = U(t)|\varphi(0)\rangle$ given the initial state $|\varphi(0)\rangle$ at time $t=0$. For any $t>0$ and bounded $\|H(t)\|$, U(t) has an absolutely convergent infinite expansion known as the Dyson series $$U(t) = I - i\int_0^t H(t_1)dt_1 - \int_{t_2}^t \int_0^{t_2} H(t_2)H(t_1)dt_1dt_2 + \\ i\int_{t_3}^t \int_{t_2}^{t_3} \int_0^{t_2} H(t_3)H(t_2)H(t_1)dt_1dt_2dt_3 + \ldots \quad (8)$$

This may be compactly represented using the time-ordering operator $\mathcal{T}$,99 which sorts any sequence of k operators according to the times $t_j$ of their evaluation, that is, $\mathcal{T}[H(t_k) \ldots H(t_2)H(t_1)] = H(t_{\sigma(k)}) \ldots H(t_{\sigma(2)})H(t_{\sigma(1)})$, where $\sigma$ is a permutation such that $t_{\sigma(1)} \leq t_{\sigma(2)} \leq \ldots \leq t_{\sigma(k)}$. For instance, $\mathcal{T}[H(t_2)H(t_1)] = \theta(t_2-t_1)H(t_2)H(t_1) + \theta(t_1-t_2)H(t_1)H(t_2)$ using the Heaviside step function $\theta$. With this notation, the propagator is commonly expressed as a time-ordered evolution operator $U(t) = \mathcal{T}[e^{-i\int_0^t H(s)ds}]$, and Eq. (8) is written as $$\mathcal{T}[e^{-i\int_0^t H(s)ds}] = \sum_{k=0}^{\infty} (-i)^k D_k, \quad (9)$$

$$D_k = \frac{1}{k!} \int_0^t \ldots \int_0^t \mathcal{T}[H(t_k) \ldots H(t_1)]d^k t.$$

The Dyson series of Eq. (9) may be approximated on a computer by truncating the infinite expansion at some finite order $k = K \geq 0$, and evaluating $H(t_j)$ at some finite number of M time-steps of size $\Delta = t/M$. Thus, one has the approximation $$\mathcal{T}[e^{-i\int_0^t H(s)ds}] \approx \sum_{k=0}^{K} (-i)^k D_k \approx \sum_{k=0}^{\infty} \frac{(-it)^k}{k!M^k} \tilde{B}_k, \quad (10)$$

$$\tilde{B}_k = \sum_{m_1,\ldots,m_k=0}^{M-1} \mathcal{T}[H(m_k\Delta) \ldots H(m_1\Delta)],$$

which converges to U(t) in the limit K, M→∞ if H(t) is Riemann integrable. One can obtain some intuition on how the error of this approximation depends on choices of K, M, H(t). As $\|H(t)\|$ is bounded, $$\|D_k\| \leq \frac{t^k}{k!} \max_s \|H(s)\|^k.$$

Using Taylor's remainder theorem for the exponential function, the error of truncation for $|t| \max_s \|H(s)\| = \mathcal{O}(1)$ is at most $\epsilon = \mathcal{O}(1/K!)$. Thus the order of truncation is at most $$K = \mathcal{O}\left(\frac{\log(1/\epsilon)}{\log\log(1/\epsilon)}\right).$$

As $\tilde{B}_k$ is a left Riemann sum of $D_k$, one expects that the error of discretization should scale like $$\epsilon = \mathcal{O}\left(\frac{1}{M}\right).$$

These two errors may then be added by a triangle inequality to obtain the overall error from approximating $\mathcal{T}[e^{-i\int_0^t H(s)ds}]$ with $$\sum_{k=0}^{K} \frac{(-it)^k}{M^k} B_k.$$

The explicit time-ordering in $\tilde{B}_k$ may be removed with a slightly different approximation $$\tilde{B}_k = k! B_k + C_k, \quad B_k = \sum_{0 \le m_1 < \ldots < m_k < M} H(m_k \Delta) \ldots H(m_1 \Delta), \quad (11)$$

where $C_k$ captures terms where at least one pair of indices $m_j = m_k$ collide for $j \ne k$. A rigorous statement of this intuition is given by the following Lemma 1, with a detailed proof in Section XI.

Lemma 1 (Error from truncating and discretizing the Dyson series). Let $H(s): \mathbb{R} \to \mathbb{C}^{N \times N}$ be differentiable on the domain $[0, t]$, and let $$\langle \|\dot{H}\| \rangle := \frac{1}{t} \int_0^t \left\|\frac{dH(s)}{ds}\right\| ds.$$

For any $\epsilon \in [0, 2^{1-e}]$, an approximation to the time ordered operator exponential of $-iH(s)$ can be constructed such that $$\left\|\mathcal{T}[e^{-i\int_0^t H(s)ds}] - \sum_{k=0}^{K}(-it/M)^k B_k\right\| \le \epsilon$$

if one takes all the following are true.

1. $\max_s \|H(s)\| t \le \ln 2$.
2. $K = \left\lceil -1 + \frac{2\ln(2/\epsilon)}{\ln\ln(2/\epsilon)+1} \right\rceil$.
3. $M \ge \max\left\{\frac{16t^2}{\epsilon}(\langle \|\dot{H}\| \rangle + \max_s \|H(s)\|^2), K^2\right\}$.

On a quantum computer, it becomes possible to compute the $B_k$ exactly and efficiently even if they sum over exponentially many points M. In contrast, computing these Riemann sums on classical computer would be prohibitive, even by approximate Monte-Carlo sampling, which is exacerbated by the sign problem. However, this efficient quantum computation crucially assumes that information on terms of the Hamiltonian are made accessible in a certain coherent manner. In the case discussed here, this is information is accessed by querying the black-box unitary oracle HAM-T in Eq. (7).

B. Algorithm by Duplicating Control Registers

A quantum algorithm is presented that applies the $\epsilon$-approximation $$\tilde{U} = \sum_{k=0}^{\infty} \frac{(-it)^k}{M^k} B_k$$

to the time-ordered evolution operator $\mathcal{T}[e^{-i\int_0^t H(s)ds}]$, where the truncation order K and the number of discretization points M are given by Lemma 1. This version is the prelude to Theorem 1 and has worse space complexity. The algorithm proceeds in two steps: First, one synthesizes a unitary quantum circuit $DYS_K$ that applies $\tilde{U}$ with success probability ½ on any input state to the s register. As $B_K$ contains K a product of K Hamiltonian, this step requires $\mathcal{O}(K)$ queries to HAM-T. Second, since $\tilde{U}$ is $\epsilon$-close to unitary, one applies one round of oblivious amplitude amplification to boost this probability to $1-\mathcal{O}(\epsilon)$. Among the contributions here are rigorous bounds on K and M, and the implementation of a step not discussed previously—the efficient preparation of a particular quantum state that correctly selects a desired linear combination of time-ordered products of Hamiltonians. This step is non-obvious as the state has $\mathcal{O}(M!)$ different amplitudes, and in the worst-case would take $\mathcal{O}(M!)$ gates to create by arbitrary state preparation techniques. The cost of this implementation is captured by the following theorem.

Theorem 2 (Hamiltonian simulation by a truncated Dyson series with duplicated registers). Let a time-dependent Hamiltonian H(s) be characterized by spectral norm $\alpha \ge \max_s \|H(s)\|$, and average rate-of-change $$\langle \|\dot{H}\| \rangle = \frac{1}{t} \int_0^t \left\|\frac{dH(s)}{ds}\right\| ds.$$

This Hamiltonian is defined for $s \in [0,t]$, where $|\alpha t| \le \frac{1}{2}$, and is encoded in an oracle HAM-T acting on $n_s + n_\alpha + n_d$ qubits, as per Eq. (7), evaluated at $$M = \mathcal{O}\left(\frac{t^2}{\epsilon}\left(\frac{\langle \|\dot{H}\| \rangle}{\alpha} + \frac{\max_s \|H(s)\|^2}{\alpha^2}\right)\right)$$

points, where $n_d = \mathcal{O}(\log(M))$. Then the time-ordered evolution operator $\mathcal{T}[\exp(-i\int_0^t H(s)ds)]$ may be approximated to error $\epsilon$ with the following cost.

1. Queries to HAM-T: $\mathcal{O}\left(\frac{\log(t/\epsilon)}{\log\log(t/\epsilon)}\right)$.

2. Qubits: $n_s + \mathcal{O}\left(n_a + \log(M)\frac{\log(t/\epsilon)}{\log\log(t/\epsilon)}\right)$.

-continued

3. Primitive gates: $O\left((n_a + \log(M))\frac{\log(1/\epsilon)}{\log\log(1/\epsilon)}\right)$.

Proof Let HAM-$T_K$ be a unitary that acts jointly on registers s, $\vec{a}$, $\vec{b}$, c, $\vec{d}$. This unitary is depicted in FIG. 2 and is defined to apply products of Hamiltonians $$\left(\langle 0|_{\vec{a}e} \otimes I_s\right)\text{HAM-}T_K(|0\rangle_{\vec{a}e} \otimes I_s) := \quad (12)$$

$$\left(\sum_{k=0}^{K} |k\rangle\langle k|_{\vec{b}} \otimes \left(\sum_{\vec{m}\in[M]^k} |\vec{m}\rangle\langle\vec{m}|_{d_1\ldots d_k} \otimes I_{d_{k+1}\ldots d_K} \otimes \left(\prod_{j=1}^{k} H(m_j\Delta)\right)\right) + \ldots\right) \otimes \text{SWAP}_c,$$

were $\text{SWAP}_c$ swaps the two qubits of register c. Note that the action of HAM-$T_K$ is only defined for input states to register $\vec{b}$ that are spanned by basis states of the unary encoding $|k\rangle_{\vec{b}} = |0\rangle^{\otimes k}|1\rangle^{\otimes K-k}$, which determines the number of terms in the product. As seen in the figure, HAM-$T_K$ makes K queries to HAM-T and copies the $\alpha$, b, and d registers K times.

Figure 2:
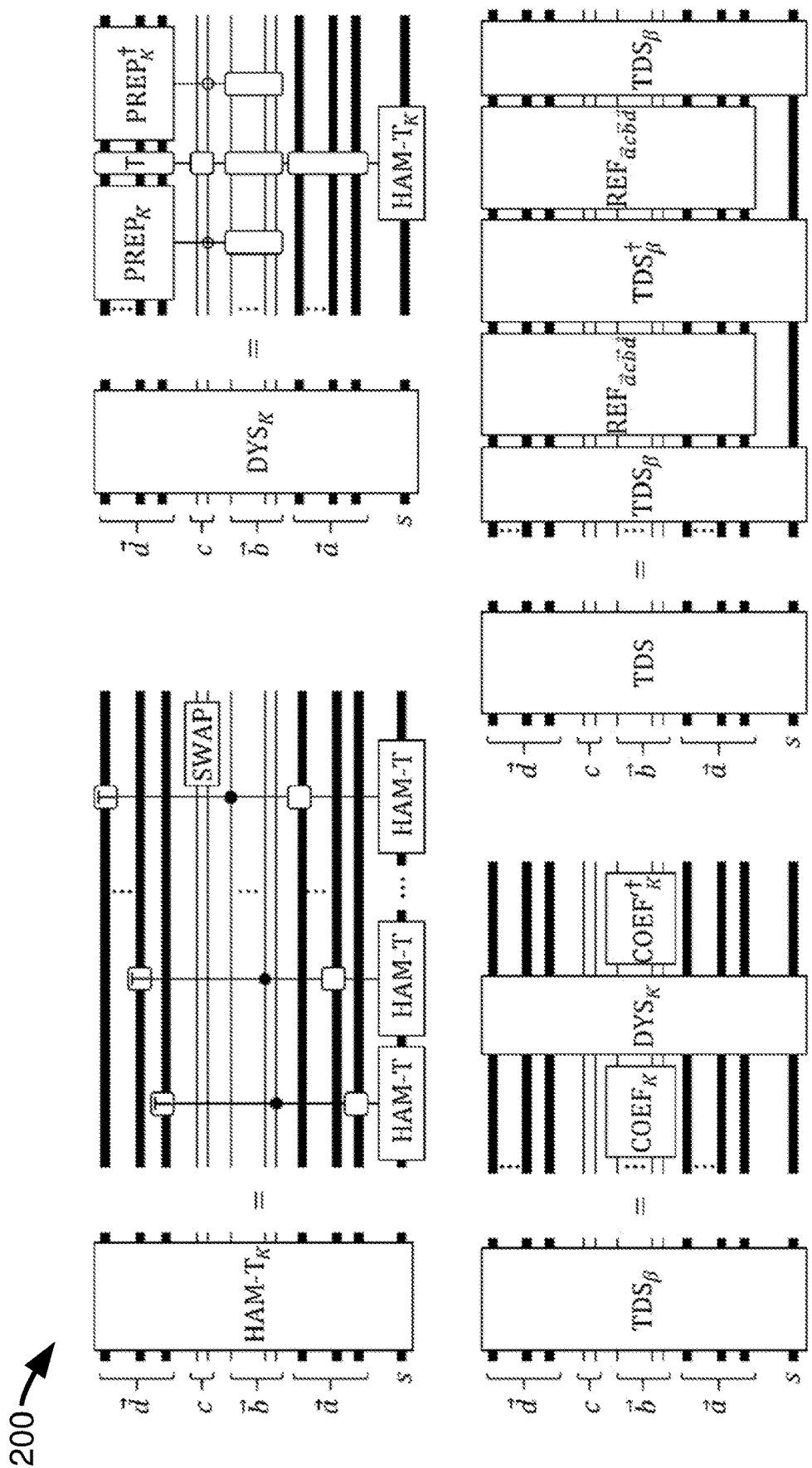
FIG. 2 shows a quantum circuit representations of the components implementing the truncated Dyson series algorithm TDS.

FIG. 2 shows a quantum circuit representations of the components implementing the truncated Dyson series algorithm TDS.

Now, consider a state $|s_k\rangle_{\vec{d}}$, which is a uniform superposition of time-index states under the dimension-k unit simplex $$|s_k\rangle_{\vec{d}} := \sqrt{\frac{k!(M-k)!}{M!}}\left(\sum_{0\leq m_1<m_2<\ldots<m_k<M} |\vec{m}\rangle_{d_1\ldots d_k}\right)|0\rangle_{d_{k+1}\ldots d_K}. \quad (13)$$

This state is easy to prepare when k=1—there, it is simply a uniform superposition over M number states, and costs $O(\log M)$ gates. Otherwise, naive methods based on rejection sampling have some success probability $|\gamma_k|^2$ that decreases exponentially with large k. Let $\text{PREP}_K$ be one such unitary that prepares $|s_k\rangle_{\vec{d}}$ on measurement outcome $|00\rangle_c$.

$$\text{PREP}_K|k\rangle_{\vec{b}}|0\rangle_{c\vec{d}} := |k\rangle_{\vec{b}}(\gamma_k|00\rangle_c|s_k\rangle_{\vec{d}} + \sqrt{1-|\gamma_k|^2}|01\rangle_c\ldots). \quad (14)$$

For each order k, the Riemann sum $B_k$ may be implemented by $\text{DYS}_K := (\text{PREP}_K^\dagger \otimes I_{\alpha s}) \cdot \text{HAM-}T_{K'} \cdot (\text{PREP}_K \otimes I_{\alpha s})$, as depicted in FIG. 2. The unitary $\text{DYS}_K$ encodes precisely terms $B_k$ of the Dyson series as follows $$(\langle 0|_{\vec{a}c\vec{d}} \otimes I_{\vec{bs}}) \text{DYS}_K(|0\rangle_{\vec{a}c\vec{d}} \otimes I_{\vec{bs}}) = \quad (15)$$

$$\sum_{k=0}^{K} |k\rangle\langle k|_{\vec{b}} \otimes \frac{|\gamma_k|^2 k!(M-k)!}{M!} B_k.$$

Now, a linear combination of Dyson series terms is implemented by preparing a state with the appropriate amplitudes in the basis $|k\rangle_{\vec{b}}$. The required state preparation operators are $$\text{COEF}_K |0\rangle_{\vec{b}} := \frac{1}{\sqrt{\beta}} \sum_{k=0}^{K} \sqrt{\frac{M!(-it)^k}{M^k|\gamma_k|^2 k!(M-k)!}} |k\rangle_{\vec{b}}, \quad (16)$$

$$\beta = \sum_{k=0}^{K} \frac{M!t^k}{M^k|\gamma_k|^2 k!(M-k)!},$$

$$\text{COEF}'_K|0\rangle_{\vec{b}} := \frac{1}{\sqrt{\beta}} \sum_{k=0}^{K} \sqrt{\frac{M!t^k}{M^k|\gamma_k|^2 k!(M-k)!}} |k\rangle_{\vec{b}},$$

and may be implemented using $O(K)$ primitive gates. Up to a proportionality factor $\beta$, one can obtain the desired linear combination for simulating time-evohnion.

$$\text{TDS}_\beta := (\text{COEF}'^\dagger_K \otimes I_{\vec{a}c\vec{ds}}) \cdot \text{DYS}_K \cdot (\text{COEF}_K \otimes I_{\vec{a}c\vec{ds}}) \quad (17)$$

$$(\langle 0|_{\vec{a}b\vec{cd}} \otimes I_s)\text{TDS}_\beta(|0\rangle_{\vec{a}b\vec{cd}} \otimes I_s) = \frac{\sum_{k=0}^{K}(-it)^k B_k}{M^k \beta} \approx \frac{\mathcal{T}e^{-i\int_0^s H(s)ds}}{\beta}.$$

If one chooses t to be sufficiently small such that $\beta=2$, one can then obtain a single time-step of the truncated Dyson series algorithm TDS in FIG. 2. All that remains is to find an implementation of $\text{PREP}_K$ that prepares $|s_k\rangle_{\vec{d}}$ with an amplitude that $|\gamma_k|$ that is sufficiently large so that $t=\Theta(1)$.

The state $|s_k\rangle_{\vec{b}c\vec{d}}$ can be prepared in a number of ways. The most straightforward approach creates a uniform superposition of states over the dimension-k hypercube using $n_d\times k$ Hadamard gates HAD, then uses k reversible adders to flag states $|\vec{m}\rangle_{d_1\ldots d_k}$ with the correct ordering. This circuit $\text{PREP}_{|s_k\rangle}$ produces $|s_k\rangle_{\vec{d}}$ with amplitude $$\gamma_k = \sqrt{\frac{M!}{M^k k!(M-k)!}} \cdot \text{PREP}_K$$

is then obtained by controlling $\text{PREP}_{|s_k\rangle}$ on input state $|k\rangle_{\vec{b}}$. Thus $$\beta = \sum_{k=0}^{K} t^k \leq \sum_{k=0}^{\infty} t^k = \frac{1}{1-t}. \quad (18)$$

Thus by choosing $t=\Theta(1)\approx\frac{1}{2}$, s=2 and a single round of oblivious amplitude amplification suffices. Notably, even though the success probability of naive state preparation $|\gamma_k|^2$ decays rapidly, this only amounts to a constant factor slowdown compared to more sophisticated techniques that effectively prepare $|s_k\rangle_{\vec{d}}$ with success probability$\approx 1$. For example, rather than rejection sampling, one may perform a reversible sort on on uniform superposition of states $$\frac{1}{\sqrt{M^k}}\sum_{\vec{m}}|\vec{m}\rangle_{d_1\ldots d_k}|0\rangle_{\text{garbage}} \to \frac{1}{\sqrt{M^k}}\sum_{\vec{m}}|\mathcal{T}[m_{d_1}\ldots m_{d_k}]\rangle_{d_1\ldots d_k}|\vec{m}\rangle_{\text{garbage}},$$

such as with the quantum bitonic sorting network. This effectively increases $\gamma_k^2$ by a factor of k!, and uses significantly more ancilla qubits, but ultimately allows us to implement time steps t≈ln2≈0.693 larger by a constant factor. □

C. Compression of Control Registers

The dominant contribution to the space overhead of the truncated Dyson series algorithm in Section III B is the K-fold duplication of registers $\vec{\alpha}$, $\vec{d}$ in the oracle $DYS_K$. A general technique is now presented that when applied to $DYS_K$ avoids this duplication and completes the proof of Theorem 1. Suppose one has a sequence of K unitary oracles $U_1, U_2, \ldots, U_K$, defined as $$(\langle 0|_\alpha \otimes I_s) U_k (|0\rangle_\alpha \otimes I_s) = H_k, \qquad (19)$$

where $H_j$ is some arbitrary matrix with bounded spectral norm $\|H_j\| \leq 1$. In the general problem, one can construct a quantum circuit V that when controlled on index k in register b, applies the sequence $U_k \ldots U_2 U_1$, that is $$(\langle 0|_{ac} \otimes I_s) V (|0\rangle_{ac} \otimes I_s) = |0\rangle\langle 0|_b \otimes I_s = \sum_{k=1}^{K} |k\rangle\langle k|_b \otimes \left(\prod_{j=1}^{k} H_j\right). \qquad (20)$$

Though binary control logic for this sequence is trivial when $H_k$ is unitary, the complication here is that $H_k$ is in general non-unitary and so the probability of successfully measuring $|0\rangle_\alpha$ is less than one. Any other measurement outcome corresponds failure as it applies on register α an operator that is not $H_k$. This complication is overcome by introducing two more registers b, c of size $\mathcal{O}$ (log(K)) qubits that count the number of successful measurements.

Lemma 2 (Compression gadget). Let $\{U_k, k \in [K]\}$ be a set of K unitaries that encode matrices $H_k$ as defined in Eq. (19). Then there exists a quantum circuit V satisfying Eq. (20) such that the number of qubits $n_b = \mathcal{O}$ (log (K)), $n_c = \mathcal{O}$ (log (K)). The cost of V is one query to each of controlled-controlled-$U_k$, and $\mathcal{O}$ (K ($n_\alpha$+log(K))) additional primitive quantum gates.

Proof. Let b, c be counter registers. Using notation where commas in the subscript indicates respective assignments, these represent an $n_{b,c}$-bit integer $l_{b,c} = \Sigma_{r=0}^{n_{b,c}-1} 2^r q_r$ in the number state $|l_{b,c}\rangle_{b,c} := |q_0 q_1 \ldots q_{n_{b,c}} \ldots 1\rangle_{b,c}$, where $q_r \in \{0, 1\}$. The size of these integers are determined by $n_b = n_c + 1 = \lceil \log_2(K+1) \rceil + 1$. The unitaries $U_j$ will be applied conditional on the trailing bit $q_0 = 0$ in the c register, and the leading bit $q_{n_b-1} = 0$ in the b register, that is $$CC\text{-}U_k := I^{\otimes n_b n_c - 2} \otimes (|0\rangle\langle 0|_{b_{n_b-1}} \otimes |0\rangle\langle 0|_{c_0} \otimes U_k + \ldots). \qquad (21)$$

Figure 3:
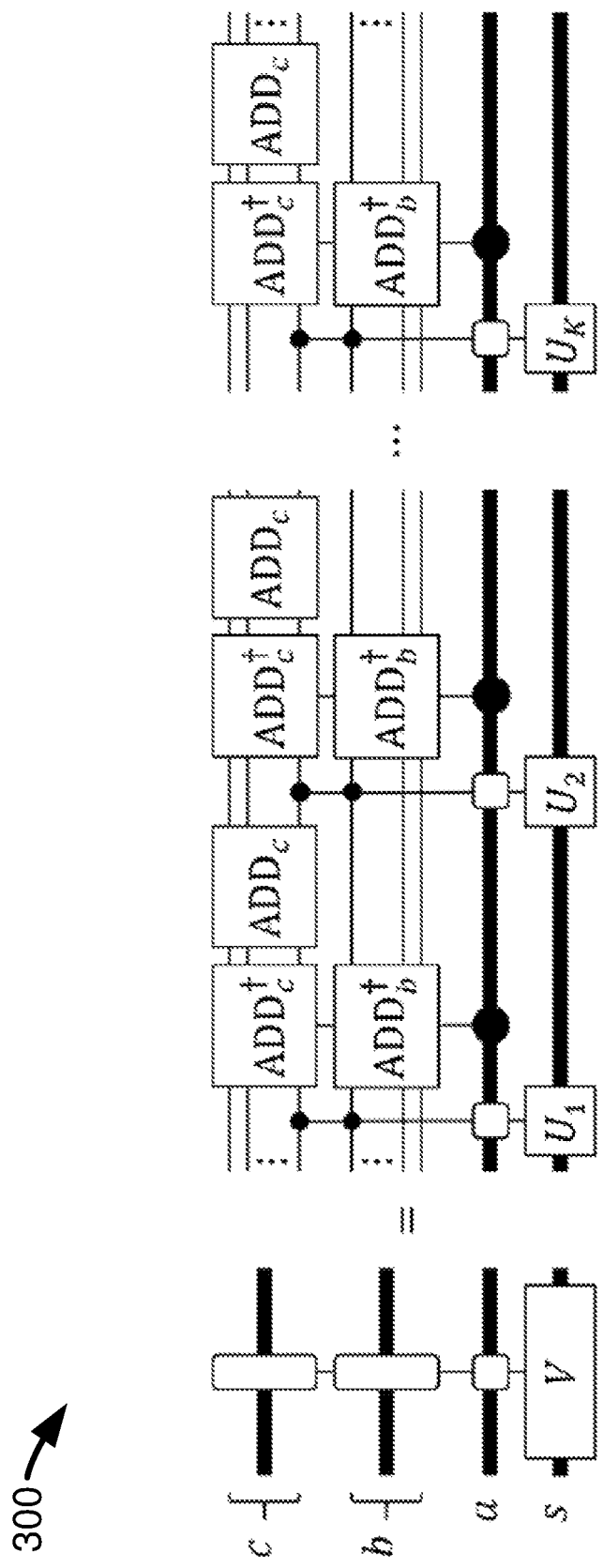
FIG. 3 is a quantum circuit representations of the gadget V for applying a sequence of probabilistic operators $H_k \ldots H_2 H_1$, encoded in $(\langle 0|_a \otimes I_s) U_k (|0\rangle_a \otimes I_s) = H_k$, controlled on number state $|k\rangle_b$, $k \in \{0, 1, \ldots, K\}$.

Consider the circuit in FIG. 3. There, one can apply $CC\text{-}U_k$, then increment k by one, increment $l_c$ by one conditional on the α register not being in the $|0\rangle_\alpha$ state, and decrement $l_b$ by one conditional on the α register being in the $|0\rangle_\alpha$ state. This is accomplished by multiply-controlled modular addition $$ADD_{ca} = ADD_b^\dagger \otimes I_c \otimes |0\rangle\langle 0|_a + I_b \otimes ADD_c \otimes \sum_{l=1}^{2^{n_a}-1} |l\rangle\langle l|_a, \qquad (22)$$

$$ADD_{b,c} = \sum_{l=0}^{2^{n_{b,c}}-1} |l+1 \bmod 2^{n_{b,c}}\rangle\langle l|_{b,c}.$$

As one adds integers of size $\mathcal{O}$ (K), each application of modular addition costs $\mathcal{O}$ (log(K)) primitive gates and requires $\mathcal{O}$ (log(K)) qubits. Implementing the multiple controls costs $\mathcal{O}$ ($n_\alpha$) primitive gates and up to $n_\alpha$ extra qubits. FIG. 3 is a quantum circuit representations of the gadget V for applying a sequence of probabilistic operators $H_k \ldots H_2 H_1$, encoded in $(\langle 0|_\alpha \otimes I_s) U_k (|0\rangle_\alpha \otimes I_s) = H_k$, controlled on number state $|k\rangle_b$, $k \in \{0, 1, \ldots, K\}$.

Restricted to input states $|0\rangle_\alpha |1\rangle_b |0\rangle_c$, where $1 \in \{2^{n_b}-1, 0,1,2,3, \ldots, K-1\}$, this implements V. For example, consider the evolution of an input state $|0\rangle_\alpha |2\rangle_b |0\rangle_c |\varphi\rangle_s$ for K=3.

$$|0\rangle_a |1\rangle_b |0\rangle_c |\psi\rangle_s \xrightarrow{CC\text{-}U_1} |0\rangle_a |1\rangle_b \left[ |0\rangle_c H_1 |\psi\rangle_s + |0^{\perp 1}\rangle_a |2\rangle_b |0\rangle_c \ldots \xrightarrow{ADD_{ca}} \right. \qquad (23)$$

$$|0\rangle_a |0\rangle_b \left[ |0\rangle_c H_1 |\psi\rangle_s + |0^{\perp 1}\rangle_a |2\rangle_b |1\rangle_c \ldots \xrightarrow{CC\text{-}U_2} \right.$$

$$|0\rangle_a |0\rangle_b |0\rangle_c H_2 H_1 |\psi\rangle_s + |0^{\perp 2}\rangle_a |1\rangle_b |0\rangle_c \ldots + |0^{\perp 1}\rangle_a |2\rangle_b |1\rangle_c \ldots \xrightarrow{ADD_{ca}}$$

$$|0\rangle_a |-1\rangle_b |0\rangle_c H_2 H_1 |\psi\rangle_s + |0^{\perp 2}\rangle_a |1\rangle_b |1\rangle_c \ldots + |0^{\perp 1}\rangle_a |2\rangle_b |2\rangle_c \ldots \xrightarrow{CC\text{-}U_3}$$

$$|0\rangle_a |-1\rangle_b |0\rangle_c H_2 H_1 |\psi\rangle_s + |0^{\perp 2}\rangle_a |1\rangle_b |1\rangle_c \ldots + |0^{\perp 1}\rangle_a |2\rangle_b |2\rangle_c \ldots \xrightarrow{ADD_{ca}}$$

$$|0\rangle_a |-2\rangle_b |0\rangle_c H_2 H_1 |\psi\rangle_s + |0^{\perp 2}\rangle_a |1\rangle_b |2\rangle_c \ldots + |0^{\perp 1}\rangle_a |2\rangle_b |3\rangle_c \ldots$$

In the above, negative integers correspond to the trailing bit $q_{n_b-1} = 1$ so $U_k$ in Eq. (21) is not applied. Note that Eq. (20) applies $H_k \ldots H_1$ controlled on $|k\rangle_b$, so one can simply relabel $k = l_b + 1 \bmod 2^{n_b}$.

Proof of Theorem 1. Thus $DYS_K$ may be implemented with reduced ancilla overhead through Lemma 2 provided that one finds a sequence $\{U_k\}$ such that $H_k \ldots H_2 H_1 \propto B_k$—in other words, $$(\langle 0|_{ac,others} \otimes I_{bs}) DYS_K (|0\rangle_{ac,others} \otimes I_{bs}) = \sum_{k=0}^{K} |k\rangle\langle k|_b \otimes \gamma_k B_k, \qquad (24)$$

where 'others' represent registers with size independent of K, and $\gamma_k$ is a scaling factor depends on the choice of $U_k$. This sequence is obtained by combining three matrices. First, a unitary matrix U that prepares a uniform superposition $$U |0\rangle_d = \sum_{m=0}^{M-1} \frac{1}{\sqrt{M}} |m\rangle_d.$$

Second, the block-diagonal matrix $D = \Sigma_{m=0}^{M-1} |m\rangle\langle m| \otimes H(\Delta m)$ implemented by HAM-T. Third, a strictly upper-triangular matrix $G \in \mathbb{R}^{M \times M}$ with elements $$G_{ij} = \begin{cases} \frac{1}{M}, & i < j \\ 0, & \text{otherwise,} \end{cases} \quad G = \frac{1}{M} \sum_{i=0}^{M-1} \sum_{j=i+1}^{M-1} |i\rangle\langle j|. \qquad (25)$$

The non-unitary triangular operator G is implemented by using an integer comparator COMP acting on registers d, e, f consisting of $n_d = n_e$ and $n_f = 1$ qubits. For any input number state index $|j\rangle_d$, let one compare j with a uniform superposition state $$\sum_{m=0}^{M-1} \frac{1}{\sqrt{M}} |i\rangle_e.$$

Conditional on i≥j, perform a NOT gate on register f. One can then swap registers d,e, and unprepare the uniform superposition. On input $|j\rangle_d|0\rangle_e|0\rangle_f$, this implements the sequence.

$$|j\rangle_d|0\rangle_e|0\rangle_f \xrightarrow{U \text{ on } e} \frac{|j\rangle_d}{\sqrt{M}}\sum_{i=0}^{M-1}|i\rangle_e|0\rangle_f \xrightarrow{COMP} \frac{|j\rangle_d}{\sqrt{M}}\sum_{i=0}^{M-1}|i\rangle^e \Big| i \geq j \Big\rangle_f \xrightarrow{SWAP_{de}} \tag{26}$$

$$\frac{|j\rangle_e}{\sqrt{M}}\sum_{i=0}^{M-1}|i\rangle^d \Big| i \geq j \Big\rangle^f \xrightarrow{U^\dagger \text{ on } e} \frac{1}{M}\sum_{i=0}^{M-1}|i\rangle^d |0\rangle^e \Big| i \geq j \Big\rangle^f + \ldots,$$

where $||i \geq j\rangle_f = |1\rangle_f$ if i≥j and is $|0\rangle_f$ if i<j. This defines the following circuit that encodes G.

$$LT = (I_f \otimes U \otimes I_d) \cdot COMP \cdot (I_f \otimes SWAP_{de}) \cdot (I_f \otimes U^\dagger \otimes I_d), \tag{27}$$

$$(\langle 0|_{ef} \otimes I_d) LT (|0\rangle_{ef} \otimes I_d) = \frac{1}{M}\sum_{i=0}^{M-1}\sum_{j=i+1}^{M-1}|i\rangle\langle j|_d.$$

The gate complexity of G is dominated by the comparator COMP, which costs $\mathcal{O}(n_d)$ primitive quantum gates.

Figure 4:
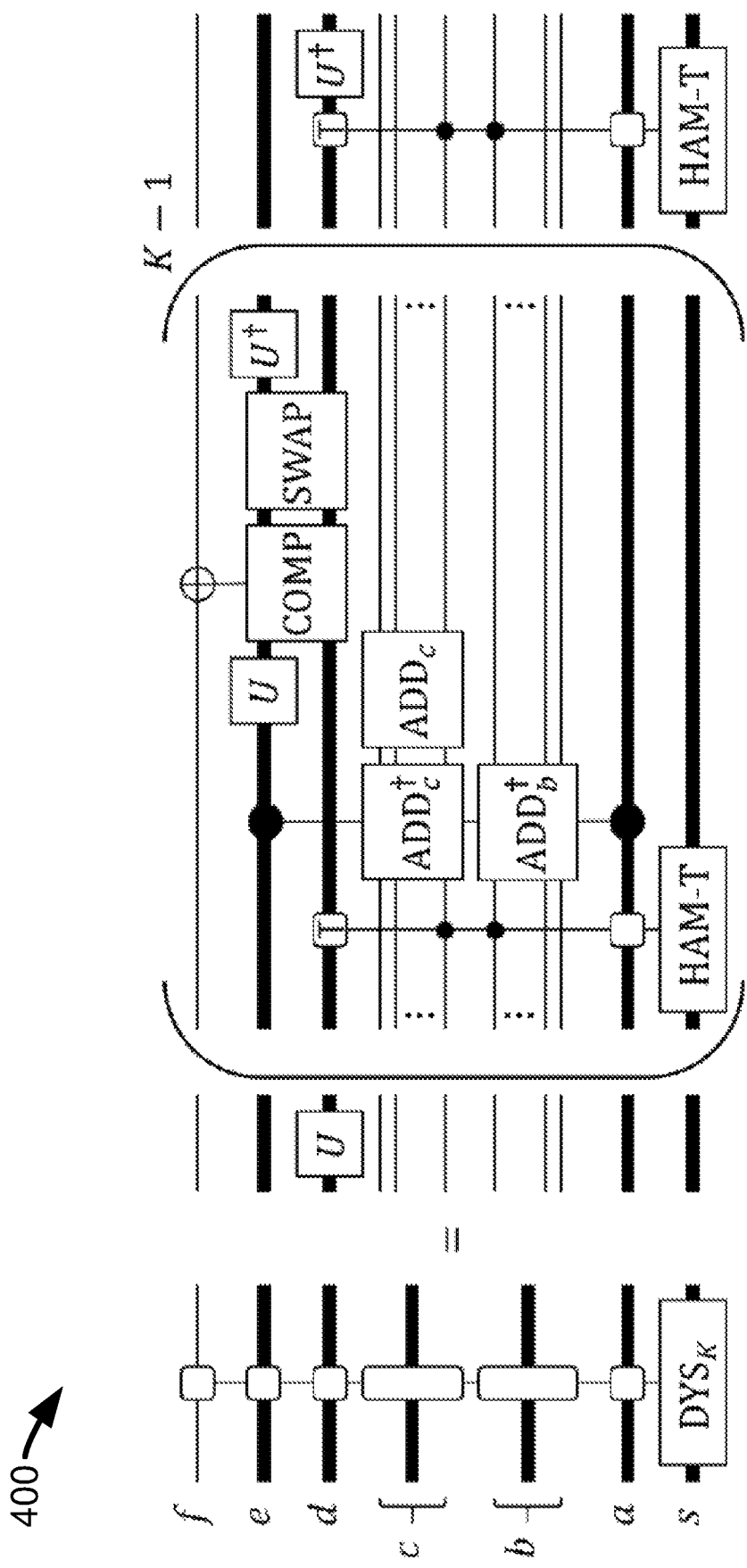
FIG. 4 depicts the quantum circuit representation of an example implementation of $HAM_K$ from Eq. (75) using K queries to controlled-HAM, a single step of the truncated Taylor series algorithm before oblivious amplitude amplification, and a single step of time-evolution by the truncated Taylor series algorithm from Eq. (78).
Figure 5:
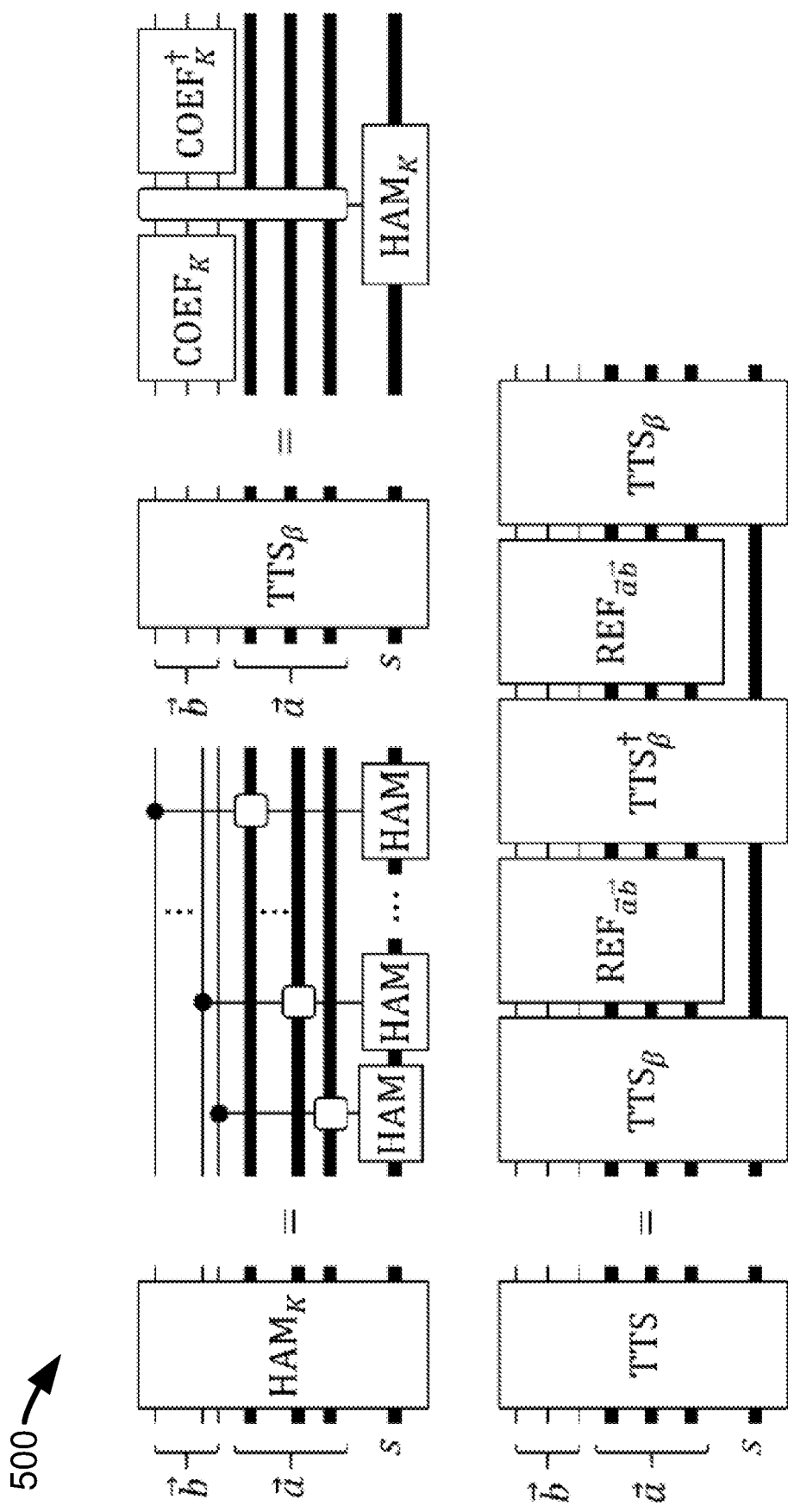
FIG. 5 is a schematic block diagram showing quantum circuit representations of the unitary $DYS_K$ that encodes time-ordered products of Hamiltonians, using fewer ancilla than the construction in FIG. 2 by applying the compression gadget of FIG. 4.

FIG. 5 is a schematic block diagram showing quantmn circuit representations of the unitary $DYS_K$ that encodes time-ordered products of Hamiltonians, using fewer ancilla than the construction in FIG. 2 by applying the compression gadget in FIG. 4.

One may then verify that the terms $B_k$ are generated by the following sequence $$\langle 0|_d U^\dagger \cdot D \cdot U |0\rangle_d = \frac{B_1}{M} = \frac{1}{M}\sum_{m_1=0}^{M-1} H(\Delta m), \tag{28}$$

$$\langle 0|_d U^\dagger \cdot (D \cdot G) \cdot D \cdot U |0\rangle_d = \frac{B_2}{M^2} = \frac{1}{M^2}\sum_{0 \leq m_1 < m_2 < M} H(\Delta m_2) H(\Delta m_1),$$

$$\vdots$$

$$\langle 0|_d U^\dagger \cdot (D \cdot G)^{k-1} \cdot D \cdot U |0\rangle_d =$$

$$\frac{B_k}{M^k} = \frac{1}{M^k}\sum_{0 \leq m_1 < m_2 < \ldots m_j < M} H(\Delta m_j) \ldots H(\Delta m_2) \ldots H(\Delta m_1).$$

Thus one can make the choice $$U_k := \begin{cases} (U^\dagger \otimes I_{aefs}) \cdot (HAM-T \otimes I_{ef}) \cdot (U \otimes I_{aefs}), & k=1, \\ (U^\dagger \otimes I_{aefs}) \cdot (HAM-T \otimes I_{ef}) \cdot (LT \otimes I_{as}) \cdot (U \otimes I_{aefs}), & k>1. \end{cases} \tag{29}$$

Combined with Lemma 2, this leads to the circuit of FIG. 5, which implements $DYS_K$ in Eq. (24) by identifying 'others' with the e and f registers, and scaling factor $$\gamma_k = \frac{1}{M^k}.$$

$$(\langle 0|_{acef} \otimes I_{bs}) DYS_K (|0\rangle_{acef} \otimes I_{bs}) = \sum_{k=0}^{K} |k\rangle\langle k|_b \otimes \frac{B_k}{M^k}, \tag{30}$$

One can then select the desired linear combination of different orders in the Dyson series with the state $$COEF_K |0\rangle_b = \frac{1}{\sqrt{\beta}}\sum_{k=0}^{K} \sqrt{(-it)^k} |k\rangle_b, \tag{31}$$

$$COEF'_K |0\rangle_b = \frac{1}{\sqrt{\beta}}\sum_{k=0}^{K} \sqrt{t^k} |k\rangle_b, \beta = \sum_{j=0}^{K} t^k \leq \sum_{k=0}^{\infty} t^k = \frac{1}{1-t}. \tag{32}$$

where one assumes that t<1 for convergence. Thus by choosing $t=\Theta(1)\approx\frac{1}{2}$, the success probability of approximating $\mathcal{T} e^{-i\int_0^t H(s)ds}$ may be boosted from $\beta^2=4$ to $1-\mathcal{O}(\epsilon)$ using a single round of oblivious amplitude amplification. □

IV. Accelerated Interaction Picture Simulation

Time-independent Hamiltonians H become time-dependent $H_I(t)$ in the interaction picture. This requires the use of time-dependent Hamiltonian simulation algorithm, which scale with parameters of $H_I(t)$ that differ from those for the time-independent case. For certain broad classes of Hamiltonian identified in Section IV A, these different dependencies allow us to improve the gate complexity of approximating the time-evolution operator $e^{-iHt}$ by instead performing simulation in the interaction picture using the truncated Dyson series algorithm Theorem 1.

The interaction picture can be viewed as an intermediate between the Schrödinger and Heisenberg pictures wherein some of the dynamics is absorbed into the state and the remainder is absorbed into the dynamics of the operators. If the Hamiltonian in the Schrödinger picture is H=A+B and $|\varphi(t)\rangle = e^{-iHt}|\varphi(0)\rangle$ then the Hamiltonian in the interaction picture is $H_I(t) = e^{iAt}Be^{-iAt}$ and $i\partial_t |\varphi_I\rangle (t) = H_I(t)|\varphi_I(t)\rangle$ with $|\varphi_I(t)\rangle = e^{iAt}|\varphi(t)\rangle$ for all t. These relations can easily be seen by substituting into the Schrödinger equation:

$$i\partial_t |\psi_I(t)\rangle = \tag{33}$$

$$i\partial_t \left(e^{iAt}|\psi(t)\rangle\right) = e^{iAt}(-A+H)|\psi(t)\rangle = e^{iAt}Be^{-iAt}e^{iAt}|\psi(t)\rangle = H_I(t)|\psi_I(t)\rangle.$$

Note that if one started with time-dependent B(t), that is H(t)=A+B(t), the interaction picture Hamiltonian is $H_I(t) = e^{iAt}B(t)e^{-iAt}$. The following results generalize easily to this situation, and so one can consider time-independent B for simplicity.

The advantage of this representation is a Hanmiltonian with a smaller norm $\|H(t)\| = \|B\| \leq \|A\| + \|B\|$, but at the price of introducing time-dependence. In general, one cannot write a closed form expression for the time-evolution operator. The following notation is commonly used to express the time evolution operator $\mathcal{T}[e^{-i\int_0^t H(s)ds}] = \lim_{r\to\infty}\prod_{j=1}^{r} e^{-iH(jt/r)t/r}$ where this product is implicitly defined to be time ordered. Given an initial state $|\varphi(0)\rangle$, the state after evolution for t>0 may thus be written as $$|\psi(t)\rangle = e^{-iAt}|\psi_I(t)\rangle = e^{-iAt}\mathcal{T}\left[e^{-i\int_0^t H_I(s)ds}\right]|\psi_I(0)\rangle = \tag{34}$$

-continued $$e^{-iAt}\mathcal{T}\left[e^{-i\int_0^t H_I(s)ds}\right]|\psi(0)\rangle = \left(e^{-iAt}\mathcal{T}\left[e^{-i\int_0^\tau H_I(s)ds}\right]\right)^L|\psi(0)\rangle,$$

and evolution by the full duration is decomposed into evolution by L shorter segments of duration $\tau$.

Using the simulation algorithm Theorem 1 to simulate each segment in Eq (34) leads to the following result Lemma 3 (Query complexity of Hamiltonian simulation in the interaction picture). For any Hamiltonian H=A+B, let HAM-T be a unitary oracle that encodes $H_I(t)=e^{iAt}Be^{-iAt}$ at $$M = O\left(\frac{t}{\epsilon}\frac{\|A\|}{\alpha_B}\right)$$

uniformly spaced values of $t \in [0, \mathcal{O} = \tau(\alpha_B^{-1})]$.

$$(\langle 0|_a \otimes I_s)HAM-T(|0\rangle_a \otimes I_s) = \sum_{m=0}^{M-1}|m\rangle\langle m|_d \otimes \frac{e^{iA\tau m/M}Be^{-iA\tau m/M}}{\alpha_B}, \quad (35)$$

$$\alpha_B \geq \|B\|.$$

Then $e^{-iHt}$ may be approximated to error $\epsilon$ using

1. Queries to HAM-T: $O\left(\alpha_B t \frac{\log(\alpha_B t/\epsilon)}{\log\log(\alpha_B t/\epsilon)}\right)$.

2. Queries to $e^{-iA\tau}$: $O(\alpha_B t)$.

3. Qubits: $n_s + O(n_a + \log(M))$.

4. Primitive gates: $O\left((n_a + \log(M))\alpha_B t \frac{\log(\alpha_B t/\epsilon)}{\log\log(\alpha_B t/\epsilon)}\right)$.

Proof. The number of segments $L = \mathcal{O}(\alpha_B t)$ in Eq. (34) is determined by a normalization constant $\alpha_B \geq \max_t \|H_I(t)\| = \|B\|$, and so each segment is of size $\tau = \mathcal{O}(\alpha_B^{-1})$. After rescaling $\epsilon \to \epsilon/L$ by the number of segments, the total query complexity is obtained from the truncated Dyson series algorithm Theorem 1. Using the facts $\max_s \|H_I(s)\| \leq \|B\|$, $\langle\|\dot{H}\|\rangle = \|[A,B]\| \leq 2\|A\|\|B\|$, and $\tau = \mathcal{O}(\alpha_B^{-1})$, it suffices to choose $$M = O\left(\frac{\alpha_B t \tau^2}{\epsilon}\left(\frac{\langle\|\dot{H}\|\rangle}{\alpha_B} + \frac{\max_s\|H(s)\|^2}{\alpha_B^2}\right)\right) = O\left(\frac{t}{\epsilon}\frac{\|A\|}{\alpha_B}\right). \quad (36)$$

Each segment is simulated $$O\left(\frac{\log(\alpha_B t/\epsilon)}{\log\log(\alpha_B t/\epsilon)}\right)$$

queries to HAM-T, thus simulation for the full duration has query complexity $$O\left(\alpha_B t \frac{\log(\alpha_B t/\epsilon)}{\log\log(\alpha_B t/\epsilon)}\right).$$

A. Comparison with Simulation of Time-Independent Hamiltonians in the Schrödinger Picture The cost of simulation in the interaction picture using the truncated Dyson series is now compared with state-of-art simulation in the Schrödinger picture with time-independent Hamiltonians using the truncated Taylor series approach outlined in section X A. Up to logarithmic factors, this comparison is valid as the truncated Taylor series algorithm cost differs from optimal algorithms by only logarithmic factors.

For any Hamiltonian H=A+B, let us assume access to the oracles $$(\langle 0|_a \otimes I_s)O_A(|0\rangle_a \otimes I_s) = \frac{A}{\alpha_A}, \quad (37)$$

$$(\langle 0|_a \otimes I_s)O_B(|0\rangle_a \otimes I_s) = \frac{B}{\alpha_B},$$

which have gate complexity $C_A, C_B$ respectively. The gate complexity of time-independent simulation $e^{-i(A+B)t}$ is then $$C_{TTS} = O\left((C_A + C_B + n_a)(\alpha_A + \alpha_B)t\frac{\log((\alpha_A + \alpha_B)t/\epsilon)}{\log\log((\alpha_A + \alpha_B)t/\epsilon)}\right) \quad (38)$$
$$= O((C_A + C_B + n_a)(\alpha_A + \alpha_B)t\,\text{polylog}(\alpha_A, \alpha_B, t, \epsilon)).$$

In the interaction-picture, one can prove the following theorem

Theorem 3 (Gate complexity of Hamiltonian simulation in the interaction picture). For any Hamiltonian H=A+B, let
1. $C_B$ be the gate cost of implementing the oracle $$(\langle 0|_a \otimes I_s)O_B(|0\rangle_a \otimes I_s) = \frac{B}{\alpha_B}.$$

2. $C_{e^{-iAt}[\epsilon]} = \mathcal{O}(|t|\text{polylog}(t,\epsilon))$ be the gate cost of approximating $e^{-iAt}$ to error $\epsilon$.

Then the total gate complexity of simulating $e^{-iHt}$ is $$C_{TDS} = \mathcal{O}((C_B + C_{e^{iAt}}[\epsilon] + n_a)\alpha_B t\,\text{polylog}(\|A\|, \alpha_B, t, \epsilon)). \quad (39)$$

Proof. let $C_{HAM-T}[\epsilon]$ be the gate complexity of approximating HAM-T in Eq. (35) to error $\epsilon$. Then from Lemma 3, the total gate complexity of simulating $e^{-iHt} = (e^{-iA\tau}\mathcal{T}[e^{-i\int_0^\tau H_I(s)ds}])^{t/T}$, $T = \mathcal{O}(\alpha_B^{-1})$, is $$O\left(\left(C_{HAM-T}\left[\frac{\alpha_B t}{\epsilon}\right] + n_a + \log\left(\frac{\|A\|t}{\epsilon\alpha_B}\right)\right)\left(\alpha_B t\frac{\log(\alpha_B t/\epsilon)}{\log\log(\alpha_B t/\epsilon)}\right)\right). \quad (40)$$

One possible decomposition of HAM-T is $$HAM-T = \quad (41)$$

$$\left(\sum_{m=0}^{M-1}|m\rangle\langle m|_d \otimes I_a \otimes e^{iA\tau m/M}\right) \cdot (I_d \otimes O_B) \cdot \left(\sum_{m=0}^{M-1}|m\rangle\langle m|_d \otimes I_a \otimes e^{-iA\tau m/M}\right). \quad (42)$$

Using $C_{e^{-iAt}}[\epsilon] = \mathcal{O}(|t|\,\text{polylog}(t, \epsilon))$, synthesis of $\sum_{m=0}^{M-1}|m\rangle\langle m|_d \otimes e^{iA\tau m/M}$ by exponentiated power of controlled-$e^{iAt/M}, e^{iA2t/M}, e^{iA4t/M}, \ldots, e^{iA2^{\lfloor \log_2(M) \rfloor}T/M}$, has cost $\sum_{j=0}^{O(\log M)} C_{e^{iAt2j/M}}[\epsilon/\log(M)] = \mathcal{O}(C_{e^{iAt}}[\epsilon/\log(M)])$. Thus $C_{HAM-T}[\epsilon] = \mathcal{O}(C_B + C_{e^{iAt}}[\epsilon/\log(M)])$. □

From comparing Eqs. (38) and (39), one may immediately state sufficient criteria for when simulation in the interaction picture is advantageous over simulation in the Schrödinger picture.

1. The upper bound on the spectral norms $\alpha_A \geq \|A\|$, $\alpha_B \geq \|A\|$ of the encoding in Eq. (37) satisfy $\alpha_A \gg \alpha_B$. Generally speaking, this is correlated with term A representing fast dynamics $\|A\| \gg \|B\|$.
2. The gate complexity of time-evolution by A alone for time $\mathcal{T} = \mathcal{O}(\alpha_B^{-1})$ is comparable to that of synthesizing the oracle $O_B$, that is $C_{e^{iA\alpha_B^{-1}}} = \mathcal{O}(C_B)$.

Note that satisfying condition (2) depends strongly on the structure of A, B. For instance, a simulation of A for time $\mathcal{T} = \mathcal{O}(\alpha_B^{-1})$ using generic time-independent techniques has gate complexity $\tilde{\mathcal{O}}(C_{A^\alpha A}/\alpha_B)$. As the interest is in the case $\|A\|/\|B\| \gg 1$, this quantity could be large and scale poorly with the problem size. One sufficient possibility is the very strong assumption that $e^{-iAt}$ is cheap and can be fast-forwarded., such that the gate complexity $C_{e^{-iAt}}[\epsilon] = \mathcal{O}(\text{polylog}(t,\epsilon))$ is constant up to logarithmic factor. This turns out to be a reasonable assumption in the application to next consider.

V. Application to the Hubbard Model with Long-Ranged Interactions

One can now apply the technology developed in Section III and Section IV for Hamiltonian simulation in the interaction picture to physical problems of practical interest. Here, the focus is on the Hubbbard model in d-dimensions with N lattice sites subject to local disorder and translational-invariant two-body couplings that may be long-ranged in general. One can perform a gate complexity comparison with simulation by time-independent techniques, and later in Section V A, this model is specialized to that of quantum chemistry simulations in the plane-wave and dual basis.

The Hubbard Hamiltonian considered has the form H=T+U+V, where T is the kinetic energy hopping operator, U is the local single-site potential, and V is a symmetric translationally-invariant two-body density coupling term between opposite spins. In the dual basis, H is expressed in terms of single-site Fermionic creation and annihilation operators $\{a_{\vec{x}\sigma}, a_{\vec{y}\sigma'}\} = \{a_{\vec{x}\sigma}^{554}, a_{\vec{y}\sigma'}^{554}\} = 0$, $\{a_{\vec{x}\sigma}, a_{\vec{y}\sigma'}^{554}\} = \delta_{\vec{x}\vec{y}}\delta_{\sigma\sigma'}$, and the number operator $n_{\vec{x}\sigma} = a_{\vec{x}\sigma}^{554} a_{\vec{x}\sigma}$. The subscript $\vec{x} \in [-N^{1/d}, N^{1/d}]^d$ indexes one of N lattice sites in d dimensions, and $\sigma \in \{-1, 1\}$ is a spin-½ index. Explicitly, $$H = \sum_{\vec{x},\vec{y},\sigma} T(\vec{x}-\vec{y}) a_{\vec{x}\sigma}^\dagger a_{\vec{y}\sigma} + \sum_{\vec{x},\sigma} U(\vec{x},\sigma) n_{\vec{x}\sigma} + \sum_{(\vec{x},\sigma) \neq (\vec{y},\sigma')} V(\vec{x}-\vec{y}) n_{\vec{x}\sigma} n_{\vec{y}\sigma'}, \quad (43)$$

where the coefficients $T(\vec{s})$, $U(\vec{s},\sigma)$, $V(\vec{s})$ are real functions of the lattice index $\vec{s} \in [-N^{1/d}, N^{1/d}]^d$.

Further simplification of Eq. (43) is possible as the kinetic energy operator is diagonal in the plane-wave basis. This basis related to the dual basis by a unitary rotation FFFT, an acronym for 'Fast-Fermionic-Fourier-Transform' that implements a Fourier transform over the lattice site indices, resulting in Fermionic creation and annihilation operators $c_{\vec{p}\sigma}^{554}$, $c_{\vec{p}\sigma}$.

$$c_{\vec{p}\sigma} = \frac{1}{\sqrt{N}} \sum_{\vec{x}} a_{\vec{x}\sigma} e^{i2\pi \vec{p}\cdot\vec{x}/N^{1/d}} = FFFT^\dagger a_{\vec{p}\sigma} FFFT, \quad (44)$$

$$c_{\vec{p}\sigma}^\dagger = \frac{1}{\sqrt{N}} \sum_{\vec{x}} a_{\vec{x}\sigma}^\dagger e^{-i2\pi \vec{p}\cdot\vec{x}/N^{1/d}} = FFFT^\dagger a_{\vec{p}\sigma}^\dagger FFFT, \quad (45)$$

By substituting the Fourier transform of the kinetic term $$T(\vec{s}) = \frac{1}{N} \sum_{\vec{p}} \tilde{T}(\vec{p}) e^{-i2\pi \vec{p}\cdot\vec{s}/N^{1/d}},$$

an equivalent expression for the Hubbard Hamiltonian is $$H = FFFT^\dagger \cdot \left( \sum_{\vec{x},\sigma} \tilde{T}(\vec{x}) n_{\vec{x}\sigma} \right) \cdot FFFT + \sum_{\vec{x},\sigma} U(\vec{x},\sigma) n_{\vec{x}\sigma} + \sum_{(\vec{x},\sigma) \neq (\vec{y},\sigma')} V(\vec{x}-\vec{y}) n_{\vec{x}\sigma} n_{\vec{y}\sigma'}, \quad (46)$$

where each term is now diagonal in their respective bases.

A simulation of this Hamiltonian on a qubit quantum computer requires a map from its Fermionic operators to spin operators. One possibility is the Jordan-Wigner transformation, which requires some map from Fermionic indices to spin indices, such as $$f(\vec{x}, \sigma) = N \frac{1-\sigma}{2} + \left( \sum_{j=0}^{d-1} \vec{x}_j N^{j/d} \right).$$

Subsequently, one can replace $$a_{\vec{x}\sigma}^\dagger \rightarrow \frac{1}{2} \left( X_{f(\vec{x},\sigma)} - iY_{f(\vec{x},\sigma)} \right) \bigotimes_{j=0}^{f(\vec{x},\sigma)-1} Z_j, \quad (47)$$

$$a_{\vec{x}\sigma} \rightarrow \frac{1}{2} \left( X_{f(\vec{x},\sigma)} + iY_{f(\vec{x},\sigma)} \right) \bigotimes_{j=0}^{f(\vec{x},\sigma)-1} Z_j.$$

Note the very useful property where number operators map to single-site spin operators $n_{\vec{x}\sigma} \rightarrow \frac{1}{2}(I - Z_{f(\vec{x},\sigma)})$ (under this encoding. Moreover, FFFT, can be implemented using $\mathcal{O}(N \log(N))$ primitive quantum gates in the Jordan-Wigner representation.

Now evaluate the worst-case gate-complexity for time-evolution by H in the Schrödinger picture. As an example of state-of-art using the truncated Taylor series approach in Section X A, $e^{-i(T+U+V)t}$ may be simulated using $\tilde{\mathcal{O}}((\alpha_T + \alpha_U + \alpha_V)t \log(1/\epsilon))$ queries to oracles that encode T, U, and V.

$$(\langle 0|_a \otimes I_s) O_T (|0\rangle_a \otimes I_s) = \frac{T}{\alpha_T}, \quad (48)$$

$$(\langle 0|_a \otimes I_s) O_U (|0\rangle_a \otimes I_s) = \frac{U}{\alpha_U},$$

$$(\langle 0|_a \otimes I_s) O_V (|0\rangle_a \otimes I_s) = \frac{V}{\alpha_V}.$$

The cost of simulation depends strongly on the coefficients $\tilde{T}(\vec{p})$, $U(\vec{x})$, $V(\vec{x})$. The most straightforward approach synthesizes these oracles using the linear-combination of unitaries outline in Eq. (6). For instance, $O_T=(PREP_T^\dagger \otimes FFFT^\dagger) \cdot SEL_T \cdot (PREP_T \otimes FFFT)$, where $$PREP_T |0\rangle_a = \sum_{\vec{p},\sigma} \sqrt{\frac{\tilde{T}(\vec{p})}{\alpha_T}} |\vec{p},\sigma\rangle_a, \qquad (49)$$

$$SEL_T = \sum_{\vec{p},\sigma} |\vec{p},\sigma\rangle\langle\vec{p},\sigma|_a \otimes n_{\vec{p}\sigma},$$

$$\alpha_T = \sum_{\vec{p},\sigma} |\tilde{T}(\vec{p})|.$$

and similarly for U and V. As there are $\mathcal{O}(N)$ distinct coefficients in the worst-case, each of $PREP_{T,U,V}$ costs $\mathcal{O}(N)$. As V has $\mathcal{O}(N^2)$ terms, $SEL_V$ has the largest cost of $\mathcal{O}(N^2)$. Thus overall gate complexity is $\tilde{\mathcal{O}}(N^2(\alpha_T+\alpha_U+\alpha_V))t \log(1/\epsilon)$. As there are $\mathcal{O}(N^2)$ coefficients, $\max\{\alpha_T, \alpha_U, \alpha_V\}=\mathcal{O}(\alpha_T+N^2)$, and so the cost of simulation is $$\tilde{\mathcal{O}}(N^2(\alpha_T+N^2)t \log(1/\epsilon)). \qquad (50)$$

The worst-case gate-complexity may be substantially improved by instead simulating H in the interaction picture using the truncated Dyson series algorithm in Section III.

The key idea is to simulate in the rotating frame of the interactions $e^{-i(U+V)t}$, where the Hamiltonian becomes a time-dependent $H_I(t)=e^{i(U+V)t} T e^{-i(U+V)t}$. Using the same oracle $O_T$ in Eq. (48) for the kinetic term, the cost of time-evolution $e^{-i(T+U+V)t}$ by this technique is given by Eq. (39):

$$C_{TDS} = O\Big(\big(C_T + C_{e^{i(U+V)/\alpha_{T+n_a}}}[\epsilon]\big) \qquad (51)$$
$$\alpha_T t \text{polylog}(\|U+V\|, \alpha_T, t, \epsilon)\Big)$$
$$= O\Big(\big(N + C_{e^{i(U+V)/\alpha_T}}[\epsilon]\big)$$
$$\alpha_T t \text{polylog}(N, \|U\|, \|V\|, \alpha_T, t, \epsilon)\Big).$$

All that remains is to bound the cost of time-evolution by the term $C_{e^{i(U+V)/\alpha_T}}[\epsilon]$. Using the fact that this is diagonal in the Pauli Z basis, the Hamiltonian may be fast-forwarded and so has cost that is independent of the evolution time. Thus the most straightforward approach decomposes $$e^{i(U+V)t} = \Big(\prod_{\vec{x},\sigma} e^{-iU(\vec{x},\sigma)n_{\vec{x}\sigma}t}\Big)\Big(\prod_{(\vec{x},\sigma)\neq(\vec{y},\sigma)} e^{-iV(\vec{x}-\vec{y})n_{\vec{x}\sigma}n_{\vec{y}\sigma'}t}\Big). \qquad (52)$$

There are $\mathcal{O}(N^2)$ exponentials, and so $C_{e^{i(U+V)t}}[\epsilon]=\mathcal{O}(N^2)$. Compared to Eq. (50), one can already see an improvement by a factor $\mathcal{O}(N)$ in cases where the kinetic energy is extensive, that is $\alpha_T=\mathcal{O}(N)$, so $C_{TDS}=\mathcal{O}(N^2\alpha_T\text{polylog}(N,\alpha_T,t,\epsilon))$.

A further improvement to $$C_{TDS}=\mathcal{O}(N\alpha_T\text{polylog}(N,\alpha_T,t,\epsilon)) \qquad (53)$$

is possible by a more creative evaluation of the gate complexity of $e^{i(U+V)t}$ to reduce its cost from $\mathcal{O}(N^2)$ to $\mathcal{O}(N \log(N))$. Clearly, $C_{e^{iUt}}=\mathcal{O}(N)$ with N commuting terms poses no problem. The difficulty lies in constructing time-evolution by the two-body term $e^{iVt}$ such that $C_{e^{iVt}}=\mathcal{O}(N \log N)$. As V is a sum of $\mathcal{O}(N^2)$ commuting terms, a gate cost $\mathcal{O}(N^2)$ appear unavoidable. However, this may be reduced by exploiting the translation symmetry of its coefficients with a discrete Fourier transform. As $V(\vec{x})=V(-\vec{x})$ is real and symmetric, its discrete Fourier transform $\tilde{V}(\vec{k})=\Sigma_{\vec{x}} V(\vec{x}) e^{i2\pi \vec{x}\cdot\vec{k}/N^{1/d}}$ only has real coefficients. Let one re-write V from Eq. (43) as $$V = \qquad (54)$$
$$\sum_{(\vec{x},\sigma)\neq(\vec{y},\sigma')} V(\vec{x}-\vec{y})n_{\vec{x}\sigma}n_{\vec{y}\sigma'} = \sum_{(\vec{x},\sigma)\neq(\vec{y},\sigma')} \frac{1}{N}\sum_{\vec{k}} \tilde{V}(\vec{k})e^{-i2\pi(\vec{x}-\vec{y})\cdot\vec{k}/N} n_{\vec{x}\sigma}n_{\vec{y}\sigma'} =$$
$$\sum_{\vec{k}} \frac{\tilde{V}(\vec{k})}{N}\Big(\sum_{(\vec{x},\sigma),(\vec{y},\sigma')} e^{-i2\pi(\vec{x}-\vec{y})\cdot\vec{k}/N} n_{\vec{x}\sigma}n_{\vec{y}\sigma'} - \sum_{\vec{x},\sigma} n_{\vec{x}\sigma}\Big) =$$
$$\sum_{\vec{k}} \tilde{V}(\vec{k}) \underbrace{\Big(\frac{1}{\sqrt{N}}\sum_{\vec{x}} e^{-i2\pi\vec{x}\vec{k}/N}\sum_{\sigma} n_{\vec{x}\sigma}\Big)}_{\tilde{x}_k} \underbrace{\Big(\frac{1}{\sqrt{N}}\sum_{\vec{y}} e^{i2\pi\vec{y}\vec{k}/N}\sum_{\sigma'} n_{\vec{y}\sigma'}\Big)}_{\tilde{x}_k^\dagger} -$$
$$\sum_{\vec{p},\sigma}\Big(\sum_{\vec{k}} \tilde{V}(\vec{k})\Big) n_{\vec{p},\sigma}.$$

The strategy for implementing $e^{-iVt}$ is based on the following observation: Suppose one had a unitary oracle O $$\vec{A}|j\rangle |0\rangle_o |0\rangle_{garb}=|j\rangle |A_j\rangle_o |g(j)\rangle_{garb}$$ that on input $|j\rangle \in \mathbb{C}^{\dim[\vec{A}]}$, outputs on the l quoit o register, the value of the $j^{th}$ element of some complex vector $\vec{A}$, together with some garbage state $|g(j)\rangle_{garb}$ of lesser interest required to make the operation reversible. One may then perform a phase rotation that depends on $A_j$ as follows:

$$|j\rangle|0\rangle_o|0\rangle_{garb}|0\rangle \xrightarrow[O_{\vec{A}}]{} |j\rangle|A_j\rangle_o|g(j)\rangle_{garb}|0\rangle \xrightarrow[PHASE]{} \qquad (55)$$
$$e^{-iA_j t}|j\rangle|A_j\rangle_o|g(j)\rangle_{garb}|0\rangle \xrightarrow[O_{\vec{A}}^\dagger]{} e^{-iA_j t}|j\rangle|0\rangle_o|0\rangle_{garb}|0\rangle.$$

If $A_j$ were represented in binary, say, $A_j=\Sigma_{k=0}^{l-1} q_k 2^{-k}$, PHASE could be implemented using $\mathcal{O}(l)$ controlled-phase $|0\rangle\langle 0|\otimes I+|1\rangle\langle 1|\otimes e^{-it 2^{-k} Z}$ rotations.

Thus, one can construct a unitary $O_{V,binary}$ with the property that $$O_{V,binary}\Big(\bigotimes_{\vec{x},\sigma}|n_{\vec{x}\sigma}\rangle\Big)|0\rangle|0\rangle_{garb} = \Big(\bigotimes_{\vec{x},\sigma}|n_{\vec{x}\sigma}\rangle\Big)|f(\vec{n})\rangle|g(\vec{n})\rangle_{garb}; \qquad (56)$$
$$f(\vec{n}) = \sum_{(\vec{x},\sigma)\neq(\vec{y},\sigma')} V(\vec{x}-\vec{y}) n_{\vec{p},\sigma} n_{\vec{q},\sigma'},$$

where the value $f(\vec{n})$ is encoded in $l=\mathcal{O}(\log(1/\epsilon))$ bits. This is implemented by the following sequence, where one has omitted the garbage register for clarity.

$$\Big(\bigotimes_{\vec{x},\sigma}|n_{\vec{x}\sigma}\rangle\Big)|0\rangle \xrightarrow[ADD]{} \qquad (57)$$

-continued $$\bigotimes_{\vec{x}}\left|\sum_\sigma n_{\vec{x}\sigma}\right\rangle \xrightarrow{FFT} \bigotimes_{\vec{k}}|\tilde{x}_{\vec{k}}\rangle \xrightarrow{|\cdot|^2} \bigotimes_{\vec{k}}||\tilde{x}_{\vec{k}}|^2\rangle \xrightarrow{\times V_{\vec{k}}} \bigotimes_{\vec{k}}|V(\vec{k})|\tilde{x}_{\vec{k}}|^2\rangle,$$

The cost of $O_{V,binary}$ may be expressed in term of the four standard reversible arithmetical operations, addition, subtraction, division, and multiplication, which each cost $\mathcal{O}$ (poly(1)) primitive gates. The first steps ADD adds $\mathcal{O}$ (N) pairs of two bits $n_{\vec{x},\sigma=1} + n_{\vec{x},\sigma=1}$ and costs $\mathcal{O}$ (N) arithmetic operations. The second step FFT is a d-dimensional Fast-Fourier-Transform on $\mathcal{O}$ (N) binary numbers and requires $\mathcal{O}$ (N log (N)) arithmetic operations. The third step computes the absolute-value-squared of $\mathcal{O}$ (N) binary numbers, and uses $\mathcal{O}$ (N) arithmetic operations. The last step multiplies each $|\tilde{x}_k|^2$ with the corresponding $V_k$, and costs $\mathcal{O}$ (N) arithmetic operations. This last step may actually be avoided by rescaling the time parameter $e^{-iA_jt} \to e^{-iA_jV_{\vec{k}}t}$ in Eq. (55). Thus the total cost of $O_{V,binary}$ is $\mathcal{O}$ (N log (N) poly(1))=$\tilde{\mathcal{O}}$ (N log(1/$\epsilon$)). Using one query to $O_{V,binary}$, $O_{V,binary}^\dagger$, and $\mathcal{O}$ (N log(1/$\epsilon$)) primitive quantum gates, one may thus apply $e^{-iVt}$ with a phase error $\mathcal{O}$ ($\epsilon$) for a fixed value of t.

A. Application to Quantum Chemistry in the Plane-Wave Basis

The Hamiltonian that generates time-evolution for a state $|\varphi(t)\rangle$ of interacting electrons in d=3 dimension consists of three operators: the electron kinetic energy T, the electron-nuclei potential energy U, and the electron-electron potential energy V. It has been demonstrated that this electronic structure Hamiltonian is a special case of the general Hubbard Hamiltonian of Eq. (46). In the plane-wave basis, $$i\partial_t |\psi(t)\rangle = H |\psi(t)\rangle \tag{58}$$

$$H_P = \frac{1}{2}\sum_{\vec{p},\sigma} |\vec{k}_{\vec{p}}|^2 c_{\vec{p},\sigma}^\dagger c_{\vec{p},\sigma} +$$

$$\frac{4\pi}{\Omega}\sum_{\substack{\vec{p}\ne\vec{q}\\j,\sigma}}\left(-\zeta_j \frac{e^{i\vec{k}_{\vec{q}-\vec{p}}\cdot\vec{R}_j}}{|\vec{k}_{\vec{p}-\vec{q}}|^2}\right)c_{\vec{p},\sigma}^\dagger c_{\vec{q},\sigma} + \frac{2\pi}{\Omega}\sum_{\substack{(\vec{p},\sigma)\ne(\vec{q},\sigma')\\\vec{v}\ne 0}}\frac{c_{\vec{p},\sigma}^\dagger c_{\vec{q},\sigma'}^\dagger c_{\vec{q}+\vec{v},\sigma'}c_{\vec{p}-\vec{v},\sigma}}{|\vec{k}_{\vec{v}}|^2},$$

where $k_{\vec{p}}=2\pi\vec{p}/\Omega^{1/3}$, $\vec{p}\in[-N^{1/3},N^{1/3}]^3$, $r_{\vec{p}}=\vec{p}(\Omega/N)^{1/3}$, $\Omega$ represents the volume of the simulation, and $n_j$ is the nuclear charge of the $j^{th}$ nucleus. Whereas T is diagonal here, one may find an alternate basis where U and V are diagonal. This is the dual basis, defined through the unitary transform FFFT of Eq. (44). In this basis, let us define the state $|\varphi_D(t)\rangle = FFFT^\dagger|\varphi(t)\rangle$, which evolves under the Hamiltonian H, which is of exactly that of Eq. (46), with coefficients $$\tilde{T}(\vec{p}) = \frac{1}{2}|\vec{k}_{\vec{p}}|^2 \quad U(\vec{p}) = -\frac{4\pi}{\Omega}\sum_{\substack{\vec{v}\ne 0,\\j}}\frac{\zeta_j \cos\left[\vec{k}_{\vec{v}}\cdot(\vec{R}_j - \vec{r}_{\vec{p}})\right]}{|\vec{k}_{\vec{v}}|^2}, \tag{59}$$

$$V(\vec{s}) = \frac{2\pi}{\Omega}\sum_{\vec{v}\ne 0,}\frac{\cos\left[\vec{k}_{\vec{v}}\cdot\vec{r}_{\vec{s}}\right]}{|\vec{k}_{\vec{v}}|^2}.$$

Thus the cost of time-evolution by the electronic structure Hamiltonian $e^{-iHt}$ using the interaction picture is given by Eq. (53). The only parameter that depends on the problem is the normalization factor $$\alpha_T = \sum_{\vec{p},\sigma}\frac{|\vec{k}_{\vec{p}}|^2}{2} = O\left(\int_0^{N^{1/3}}\frac{p^2}{\Omega^{2/3}}(4\pi p^2)dp\right) = O\left(\frac{N^{5/3}}{\Omega^{2/3}}\right). \tag{60}$$

Thus the total gate complexity of time-evolution under the assumption of constant density (i.e. N/$\Omega \in$ O(1)) is $$C_{TDS} = O\left(\frac{N^{8/3}}{\Omega^{2/3}}tpoly\log(N, \alpha_T, t, \epsilon)\right) = \tilde{O}(N^2 t\log(1/\epsilon)). \tag{61}$$

In contrast, the cost of simulation in the plane-wave dual basis by prior art Ryan Babbush, Nathan Wiebe, Jarrod McClean, James McClain, Hartmut Neven, and Garnet Kin Chan, "Low depth quantum simulation of electronic structure," arXiv preprint arXiv:1706.00023, 2017, applies the 'Qubitization' technique (see Guang Hao Low and Isaac L Chuang, "Hamiltonian simulation by qubitization," arXiv preprint arXiv:1610.06546, 2016) and has gate complexity that scales like $\tilde{O}(N^{11/3}t)$, and also has a polynomial dependence on the nuclear charge $n_j$. Embodiments of the disclosed method outperform this, and notably depends only poly-logarithmically on the nuclear charges within the problem.

VI. Application to Sparse Hamiltonian Simulation

In this section, a complexity-theoretic perspective of the improvements that are enabled by simulation with the truncated Dyson series and simulation in the interaction picture are submitted. One can do so by evaluating the query complexity for the simulation of sparse Hamiltonians H. Such Hamiltonians of dimension N are called d-sparse if there are at most d=$\mathcal{O}$ (polylog(N)) non-zero entries in every row, and the position and values of these entries may be efficiently output, in say a binary representation, by some classical circuit of size $\mathcal{O}$ (polylog(N)). This abstract model is useful in quantum complexity theory as a natural generalization these classical circuits leads to unitary quantum oracles that can be queried to access the same information, but now in superposition. With this model, one can achieve inSection VIA time-dependent simulation with a square-root improvement with respect to the sparsity parameter, and gate complexity scaling with the average instead of worst-case rate-of-change $\|H\|$. By moving to the interaction picture in Section VI B, one can find more efficient time-independent simulation algorithms for diagonally-dominant Hamiltonians.

This model assumes that the Hamiltonian is input to the simulation routine through two oracles: $O_f$ and $O_H$. $O_H$ is straight forward; it provides the values of the matrix elements of the Hamiltonian given a time index $|t\rangle$ and indices $|x\rangle$, $|y\rangle$ to for the row and column of H as follows $$O_H|t,x,y,0\rangle = |t,x,y,H_{xy}(t)\rangle \tag{62}$$

$O_f$ provides the locations of the non-zero matrix elements in any given row or column of H. Specifically, let $f(x,j)$ give the column index of the $j^{th}$ non-zero matrix element in row x if it exists and an appropriately chosen zero element if it does not. In particular, let $r_{t,j}$ be the list of column indices of these non-zero matrix elements in row J. One can then define, with a time-index t, $$O_f|t,x,j\rangle = |t,x,f_t(x,j)\rangle. \tag{63}$$

A. Simulation of Sparse Time-Dependent Hamiltonians

Applying the truncated Dyson series simulation algorithm to sparse Hamiltonians requires us to synthesize HAM-T in Eq. (7) from these oracles $O_H$, $O_F$. This is possible by a straightforward construction.

Lemma 4 (Synthesis of HAM-T from sparse Hamiltonian oracles). Let an N×N time-dependent d-sparse Hamiltonian H(s) with max-norm $\|H\|_{max} := \max_s \|H(s)\|_{max}$ be defined on the interval $s \in [0, t]$ to $n_p$ bits of precision. Then $$\left(\langle 0|_a \otimes I_s\right) HAM-T (|0\rangle_a \otimes I_s) = \sum_t |t\rangle\langle t|_d \otimes \frac{H(t)}{d\|H\|_{max}}, \quad (64)$$

can be implemented with O(1) queries to $O_f$ and $O_H$, and $\mathcal{O}$ (poly($n_p$)+log (N)) primitive gates.

Proof. Let $U_{col}$, $U_{row}$ be the following unitary transformations $$U_{col}|t\rangle_d|k\rangle_s|0\rangle_a := |t\rangle_d|\chi_k(t)\rangle = \quad (65)$$

$$\frac{1}{\sqrt{d}} \sum_{p \in r_k} |t\rangle_d|k\rangle_s|p\rangle_{a_1} \left( \sqrt{\frac{H^*_{k,p}(t)}{\|H\|_{max}}} |0\rangle_{a_2} + \sqrt{1 - \frac{|H_{k,p}(t)|}{\|H\|_{max}}} |1\rangle_{a_2} \right),$$

$$\langle 0|_a \langle j|_s \langle t|_d U^\dagger_{row} := \langle \overline{\chi}_j(t)|\langle t|_d = \quad (66)$$

$$\frac{1}{\sqrt{d}} \sum_{q \in r_j} \left( \sqrt{\frac{\delta_{j,q} H_{j,q}(t) + (1-\delta_{j,q}) H_{j,q}(t)}{\|H\|_{max}}} \langle 0|_{a_2} + \sqrt{1 - \frac{|H_{q,j}(t)|}{\|H\|_{max}}} \langle 2|_{a_2} \right)$$
$$\langle j|_{a_1} \langle q|_s \langle t|_d,$$

$$\langle \overline{\chi}_j(t) | \chi_k(t) \rangle = \frac{\sqrt{H_{j,k}(t) H^*_{k,j}(t)}}{d\|H\|_{max}} = \frac{H_{j,k}}{d\|H\|_{max}}. \quad (67)$$

Let $|\varphi\rangle = \Sigma_{t,k} \alpha_{t,k} |t\rangle_d |k\rangle_s$. One then has that $$[|0\rangle\langle 0|_a \otimes \mathbb{1}] U^\dagger_{row} \cdot U_{col} |t\rangle_d |\psi\rangle |0\rangle_a = |0\rangle\langle 0|_a \otimes \sum_{t',j} (|t'\rangle\langle t'|_d \otimes |j\rangle\langle j|_s)$$

$$\sum_{t,k} a_{t,k} U^\dagger_{row} \cdot U_{col} |t\rangle_d |k\rangle_s |0\rangle_a.$$

$$= |0\rangle_a \sum_{t',j} |t'\rangle_d |j\rangle_s \sum_{t,k} a_{t,k} \left( \langle \overline{\chi}_j(t')|\langle t'|_d)(|t\rangle_d \left| \chi_k(t) \right\rangle \right)$$

$$= \sum_{j,k} a_{t,k} |0\rangle_a |t\rangle_d |j\rangle_s \frac{H_{j,k}(t)}{d\|H\|_{max}} = \frac{|0\rangle_s H(t)|\psi\rangle}{d\|H\|_{max}}.$$

As this result holds for any input state $|\varphi\rangle$, the choice HAM-T=$U^\dagger_{row} \cdot U_{col}$ satisfies Eq. (64).

The query cost then follows from the fact that $U_{col}$ and $U^\dagger_{row}$ can be implemented using O(1) calls to $O_f$. In particular, $U_{col}$ can be prepared in the following steps:

$$|t\rangle|k\rangle|0\rangle \mapsto |t\rangle|k\rangle \frac{1}{\sqrt{d}} \sum_{\ell=1}^d |\ell\rangle|0\rangle \quad (69)$$

$$\vec{O}_f |t\rangle|k\rangle \frac{1}{\sqrt{d}} \sum_{p \in r_k} |p\rangle|0\rangle$$

$$\vec{O}_H |t\rangle|k\rangle \frac{1}{\sqrt{d}} \sum_{p \in r_k} |p\rangle|H_{k,p}(t)\rangle|0\rangle$$

$$\mapsto |t\rangle|k\rangle \frac{1}{\sqrt{d}} \sum_{p \in r_k} |p\rangle|H_{k,p}(t)\rangle \left( \sqrt{\frac{H^*_{k,p}(t)}{\|H\|_{max}}} |0\rangle + \sqrt{1 - \frac{|H_{k,p}(t)|}{\|H\|_{max}}} |1\rangle \right)$$

$$\vec{O}_H |t\rangle|k\rangle \frac{1}{\sqrt{d}} \sum_{p \in r_k} |p\rangle \left( \sqrt{\frac{H^*_{k,p}(t)}{\|H\|_{max}}} |0\rangle + \sqrt{1 - \frac{|H_{k,p}(t)|}{\|H\|_{max}}} |1\rangle \right) |0\rangle =$$

$$U_{col}|t\rangle|k\rangle|0\rangle.$$

Therefore accessing $U_{col}$ unitaries requires O(1) queries to the fundamental oracles as claimed, along with a arithmetic circuit, of size polynomial in the number of bits used to represent $|H_{k,p}(t)\rangle$, for computing trigonometric functions of the magnitudes of the complex-valued matrix elements as well as their arguments. The argument that $U_{row}^\dagger$ requires O(1) queries follows in exactly the same manner, but with an additional final step that swaps the s and $\alpha_1$ registers. □

Once HAM-T, is obtained, the complexity of simulation follows directly from previous results.

Theorem 4 (Simulation of sparse time-dependent Hamiltonians). Let an N×N time-dependent Hamiltonian H(s) for $s \in [0, t]$ with max-norm, $\|H\|_{max} := \max_s \|H(s)\|_{max}$ and average rate-of-change $$\langle \|\dot{H}\| \rangle = \frac{1}{t} \int_0^t \left\| \frac{dH(s)}{ds} \right\|$$

ds be encoded in the oracles $O_H$ and $O_f$ from Eqs. (62) and (63) to $n_p$ bits of precision. Let $\alpha=d\|H\|_{max}$ and $\mathcal{T}=t\alpha$. Then the time-ordered evolution, operator $\mathcal{T}[\exp(-i\int_0^t H(s)ds)]$ may be approximated with error $\epsilon$ using (68)

1. Queries to $O_H$ and $O_f$: $O\left(\tau \frac{\log(\tau/\epsilon)}{\log\log(\tau/\epsilon)}\right)$.

2. Qubits: $O\left(n_p + \log\left(\frac{N_\tau}{\epsilon\alpha^2}\left(\frac{\langle\|\dot{H}\|\rangle}{\alpha} + \frac{\|H\|^2}{\alpha^2}\right)\right)\right)$.

3. Primitive gates: $O\left(poly(n_p) + \log\left(\frac{N_\tau}{\epsilon\alpha^2}\left(\frac{\langle\|\dot{H}\|\rangle}{\alpha} + \frac{\|H\|^2}{\alpha^2}\right)\right)\frac{\log(\tau/\epsilon)}{\log\log(\tau/\epsilon)}\right)$.

Proof. From Theorem 1, the number of qubits requried is $\mathcal{O}(n_s + n_a + n_d + \log \log(1/\epsilon))$. Values for these parameters are obtained from the construction of HAM-T in Lemma 4, which also requires an additional $n_p$ qubits for the bits of precision to which H is encoded. In this construction, $n_\alpha=$ $\mathcal{O}(n_s) = \mathcal{O}(\log(N))$. $n_d$ is obtained from the number of time-discretization points required by Theorem 1. Simulation for time t is implemented by simulating segments of duration $\Theta(\alpha^{-1})$. As there are $\Theta(t\alpha)$ segments, one can rescale $\epsilon \to \Theta(\epsilon/(t\alpha))$. □

This is a quadratic improvement in sparsity d. Furthermore, instead of scaling with the worst-case $\mathcal{O}(\log(\max_s \|\dot{H}(s)\|))$, one can obtain scaling with average rate-of-change $\langle \|\dot{H}\| \rangle$. If one further assumes that the computed matrix elements $H_{j,k}$ are not exact, the number of bit of precision scales like $n_p = \mathcal{O}(\log(\|H\|t/\epsilon))$. Note several generic improvements to Theorem 4 are possible, but will not be pursued further as they are straightforward. For instance, if $\|H(t)\|_{max}$ as a function of time is known, one may use step sizes of varying size by encoding each segment $t \in [t_j, t_{j+1}]$ with the largest $\max_{\tau \in [t_j, t_{j+1}]} \|H(t)\|_{max}$, rather than the worst-case $\max_t \|H(t)\|_{max}$.

B. Simulation of Sparse Time-Independent Hamiltonians in the Interaction Picture This section concerns time-independent d-sparse Hamiltonians H=A+B where A is diagonal and $B_{kk}=0$ for all k. In particular, consider the case of diagonally dominant Hamiltonians, where $\|A\| \geq d\|B\|_{max}$. Given norms for each of these terms $\|A\|$ and $\|B\|_{max}$, it is straightforward to simulate time-evolution $e^{-iHt}$ in the Schrödinger picture. For instance, using the truncated Taylor series approach in Eq. (38), one obtains a query complexity of $\mathcal{O}(t(d\|B\|_{max}+\|A\|)$ polylog(t, d,$\|A\|$,$\|B\|_{max}$, $\epsilon$)). By instead simulating $H_I(t)=e^{iAt}Be^{-iAt}$ in the interaction picture, the dependence on $\|A\|$ can be removed, which is particularly useful in cases of strong diagonal dominance $\|A\| \geq d\|B\|_{max}$, of which the Hubbard model with long-ranged interactions in Section V is an example. Similar to the disclosed results for time-dependent sparse Hamiltonian simulation in Section VIA, this is easily proven by mapping the input oracles $O_H$ and $O_f$ for matrix values and positions to the oracles of Theorem 3 for the more general result.

Theorem 5 (Simulation of sparse diagonally dominant Hamiltonians). Let an N×N time-independent Hamiltonian H for $s \in [0,t]$ with max-norm $\|A\|$ for the diagonal component and max-norm $\|B\|_{max}$ for the off-diagonal component be encoded in the oracles $O_H$ and $O_f$ from Eqs. (62) and (63) to $n_p$ bits of precision. Let $\alpha_b = d\|B\|_{max}$. Then the time-evolution operator $e^{-iHt}$ may be approximated with error $\epsilon$ using 1. Queries to $O_H$ and $O_f$: $O\left(\alpha_B t \dfrac{\log(\alpha_B \tau/\epsilon)}{\log\log(\alpha_B \tau/\epsilon)}\right)$.

2. Qubits: $O\left(n_p + \log(N) + \log\left(\dfrac{t\|A\|}{\epsilon \alpha_B}\right)\right)$.

3. Primitive gates:

$$O\left(\left(\log(N) + poly(n_p)\log\left(\dfrac{t\|A\|}{\epsilon \alpha_B}\right)\right)\alpha_B t \dfrac{\log(\alpha_B t/\epsilon)}{\log\log(\alpha_B t/\epsilon)}\right) \text{ primitive gates.}$$

Proof. This follows immediately by combining the query complexity of Lemma 3 to $e^{-iAt}$ and HAM-T that encodes the Hamiltonian $H_I(t)=e^{iAt}Be^{-iAt}$ in the rotating frame, with the query complexity of the approach in Theorem 3 for synthesizing these oracles using the input oracles $O_H$ and $O_f$. One possible decomposition of HAM-T is $$HAM-T = \tag{70}$$

$$\left(\sum_{m=0}^{M-1} |m\rangle\langle m|_d \otimes I_a \otimes e^{iA\tau m/M}\right)(I_d \otimes O_B)\left(\sum_{m=0}^{M-1} |m\rangle\langle m|_d \otimes I_a \otimes e^{-iA\tau m/M}\right),$$

$$(\langle 0|_a \otimes I_s)O_B(\langle 0|_a \otimes I_s) = \dfrac{B}{\alpha_B},$$

where $\alpha_B = d\|B\|_{max}$, $\tau = \mathcal{O}(\alpha_B^{-1})$ and $$M = O\left(\dfrac{t}{\epsilon}\dfrac{\|A\|}{\alpha_B}\right).$$

Note that with this construction, $$(\langle 0|_a \otimes I_s)HAM-T(|0\rangle_a \otimes I_s) = \sum_{m=0}^{M-1} |m\rangle\langle m|_d \otimes \dfrac{H_I(\tau m/M)}{d\|B\|_{max}}.$$

First, synthesize $(\Sigma_{m=0}^{M-1} |m\rangle\langle m|_d \otimes e^{iA\tau m/M})$ using $\mathcal{O}(1)$ queries to the input oracles $O_H$, and $\mathcal{O}(\log(N)+n_p \log(M))$ primitive gates. Since A is diagonal, $e^{-iAt}$ can be simulated for any $t>0$ using only two queries. This is implemented by the following steps:

$$|k\rangle|0\rangle \mapsto |k\rangle|k\rangle|0\rangle \underset{O_H}{\mapsto} |k\rangle|k\rangle|H_{k,k}\rangle|0\rangle \mapsto |k\rangle|k\rangle e^{-iH_{k,k}Zt}|0\rangle = \tag{71}$$

$$e^{-iH_{k,k}t}|k\rangle|k\rangle|0\rangle \underset{O_H^\dagger}{\mapsto} e^{-iH_{k,k}t}|k\rangle|k\rangle|0\rangle \to e^{-iH_{k,k}t}|k\rangle|0\rangle.$$

Step one uses $n_s = \mathcal{O}(\log(N))$ CNOT gates to copy the computational basis state $|k\rangle$. Step three applies $\mathcal{O}(n_p)$ phase rotation with angle controlled by the bits of $|H_{k,k}\rangle$, and the value of t, which is given beforehand. Subsequently, $(\Sigma_{m=0}^{M-1}|m\rangle\langle m|_d \otimes I_\alpha \otimes e^{iA\tau m/M})$ may be implemented by a sequence of rotations with angles increasing in a geometric series, and each controlled by a different qubit in the d register, e.g. controlled-$e^{iA\tau 2^{-1}/M}$, $e^{iA\tau 2^{-2}/M}$, $e^{iA\tau 2^{-n+p}/M}$. Naively, this requires $\mathcal{O}(\log(M))$ queries. However, it is only necessary to compute $|H_{k,k}\rangle$ once as the entire sequence of controlled-phases may be applied after step three. Similarly, it is only necessary to copy the computational basis state $\mathcal{O}(1)$ times.

Second, synthesize $O_B$ using $\mathcal{O}(1)$ queries to the input oracles $O_H$ and $O_f$. How this is done should be clear from Lemma 4, by omitting the time-index, and preparing the state $|0\rangle_{\alpha_2}+|11\rangle_{\alpha_2}$ in Eq. (65) when the input indices k=p. This has gate complexity $\mathcal{O}(\text{poly}(n_p)+\log(N))$. Thus $e^{-iA\tau}$ and HAM-T combined have query complexity $\mathcal{O}(1)$ to $O_H$ and $O_f$, and gate complexity $\mathcal{O}(\text{poly}(n_p) \log(M)+\log(N))$. By substituting into Lemma 3, one can obtain the stated results. □

This provides a formal proof that the query complexity of simulating a Hamiltonian, within the interaction picture, is independent of the magnitude of the diagonal elements of the Hamiltonian.

VII. General Embodiments

In this section, example methods for performing aspects of the disclosed embodiments are disclosed. The particular embodiments described should not be construed as limiting, as the disclosed method acts can be performed alone, in different orders, or at least partially simultaneously with one another. Further, any of the disclosed methods or method acts can be performed with any other methods or method acts disclosed herein.

Figure 6:
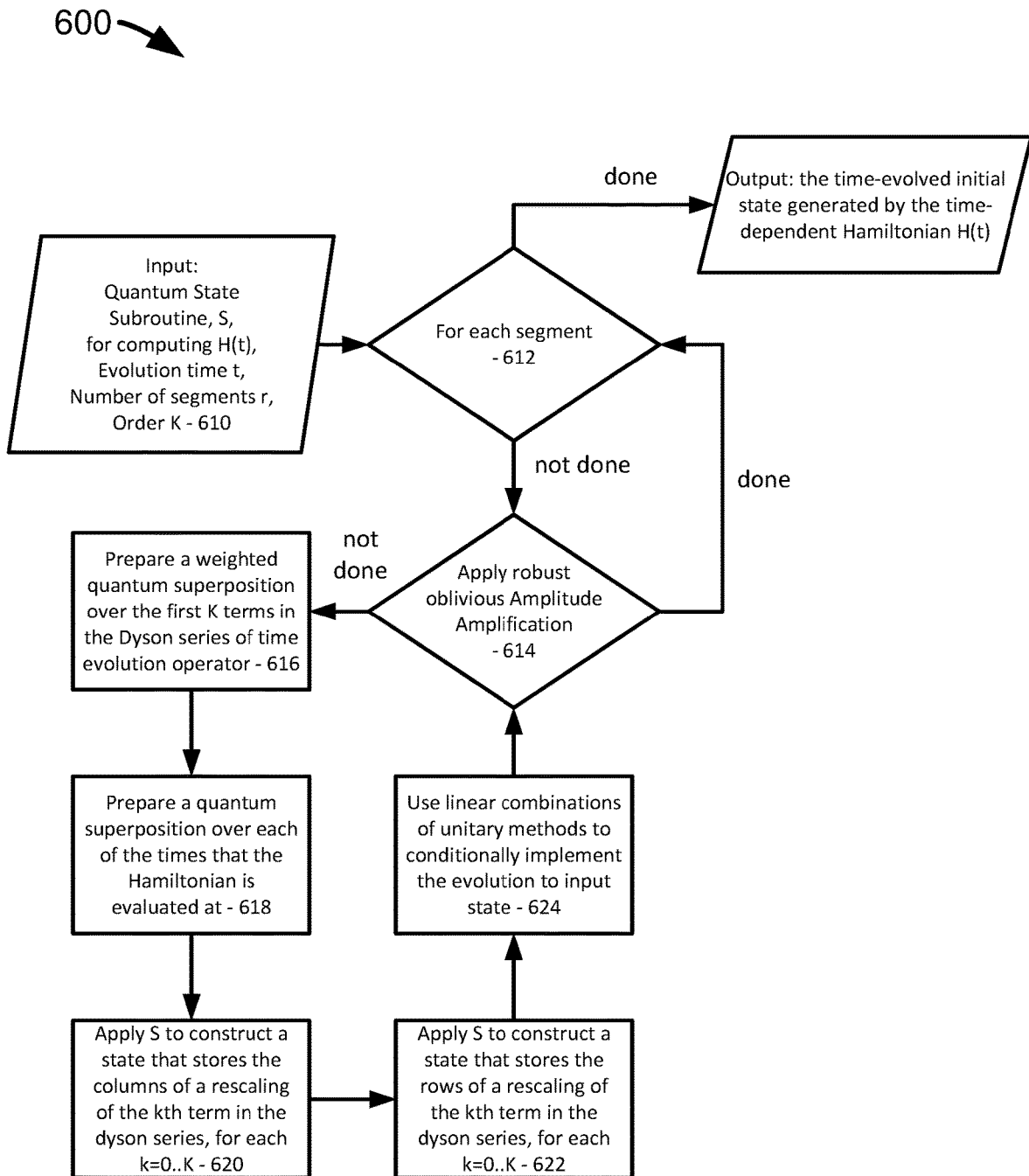
FIG. 6 is an example method for a time-dependent simulation algorithm as disclosed herein.

FIG. 6 is an example method for a time-dependent simulation algorithm as disclosed herein.

In FIG. 6, the inputs are shown at 610. The inputs include quantum state subroutine (S); for computing (H(t)), evolution time (t), number of segments (r), order (K). At 612, a determination is made as to whether any segments remain. If so, the process proceeds to 614, where a robust oblivious amplitude amplification procedure is applied. If the procedure of 614 is done, then the process proceeds to the next segment; if the procedure 614 is not done, then the procedure proceeds to 616. At 616, a weighted quantum superposition is prepared over the first K terms in the Dyson series of time evolution operator. At 618, a quantum superposition is prepared over each of the times that the Hamiltonian is evaluated at. At 620, subroutine (S) is applied to construct a state that stores the columns of a rescaling of the kth term in the dyson series, for each k=0 ... K. At 622, subroutine (S) is applied to construct a state that stores the rows of a rescaling of the kth term in the dyson series, for each k=0 ..., K. At 624, linear combinations of unitary methods are used to conditionally implement the evolution to the input state of 614.

Figure 7:
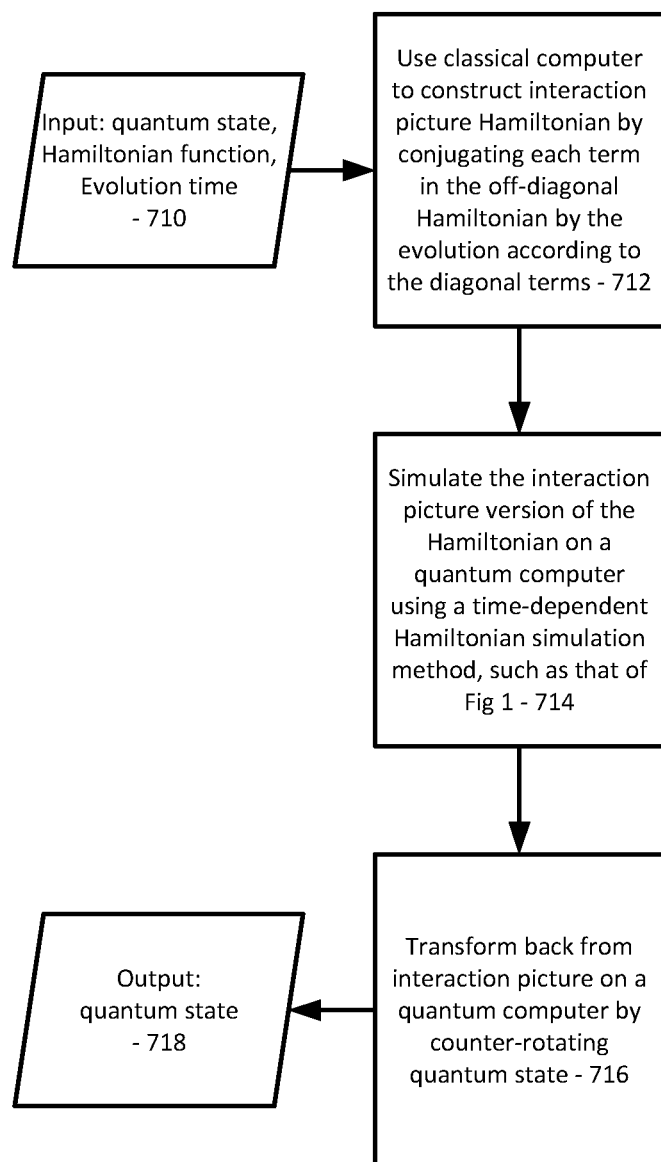
FIG. 7 is an example method for an example interaction picture simulation method as disclosed herein.

FIG. 7 is an example method for an example interaction picture simulation method as disclosed herein.

At 710, a quantum state, Hamiltonian function, and evolution time are input. At 712, a classical computer is used to construct an interaction picture Hamiltonian by conjugating each term in the off-diagonal Hamiltonian by the evolution according to the diagonal terms. At 714, the interaction picture version of the Hamiltonian is simulated on a quantum computer using a time-dependent Hamiltonian simulation method (e.g., such as that of FIG. 1). At 716, the interaction picture is transformed back on the quantum computer by counter-rotating the quantum state. At 718, the resulting quantum state is output.

Figure 8:
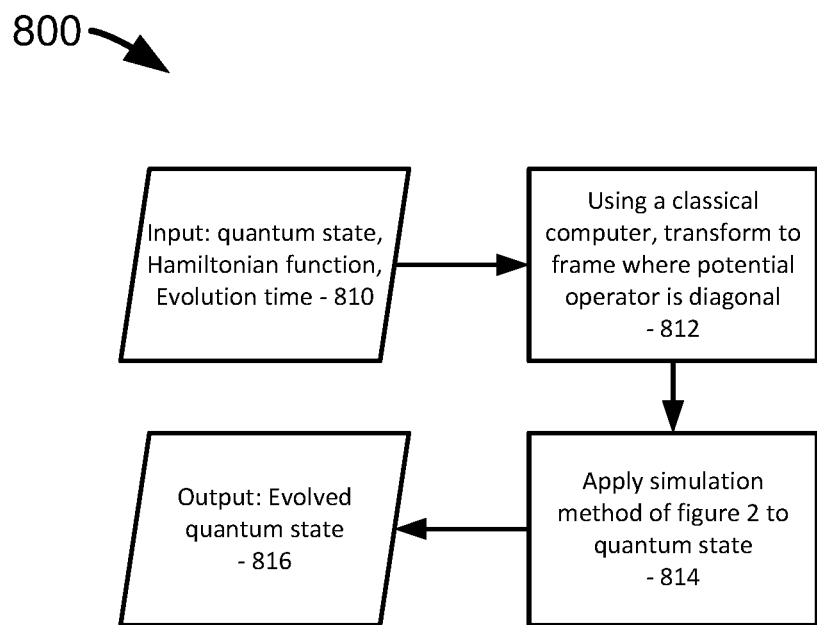
FIG. 8 is an example method simulating chemistry and Hubbard models as disclosed herein.

FIG. 8 is an example method simulating chemistry and Hubbard models as disclosed herein. At 810, a quantum state, Hamiltonian function, and an evolution time are input. At 182, a classical computer is used to transform to a frame where a potential operator is diagonal. At 814, a simulation method (e.g., the method of FIG. 2) is applied to a quantum state by the classical computer. And, at 816, an evolved quantum state is output (e.g., by the classical computer).

Figure 9:
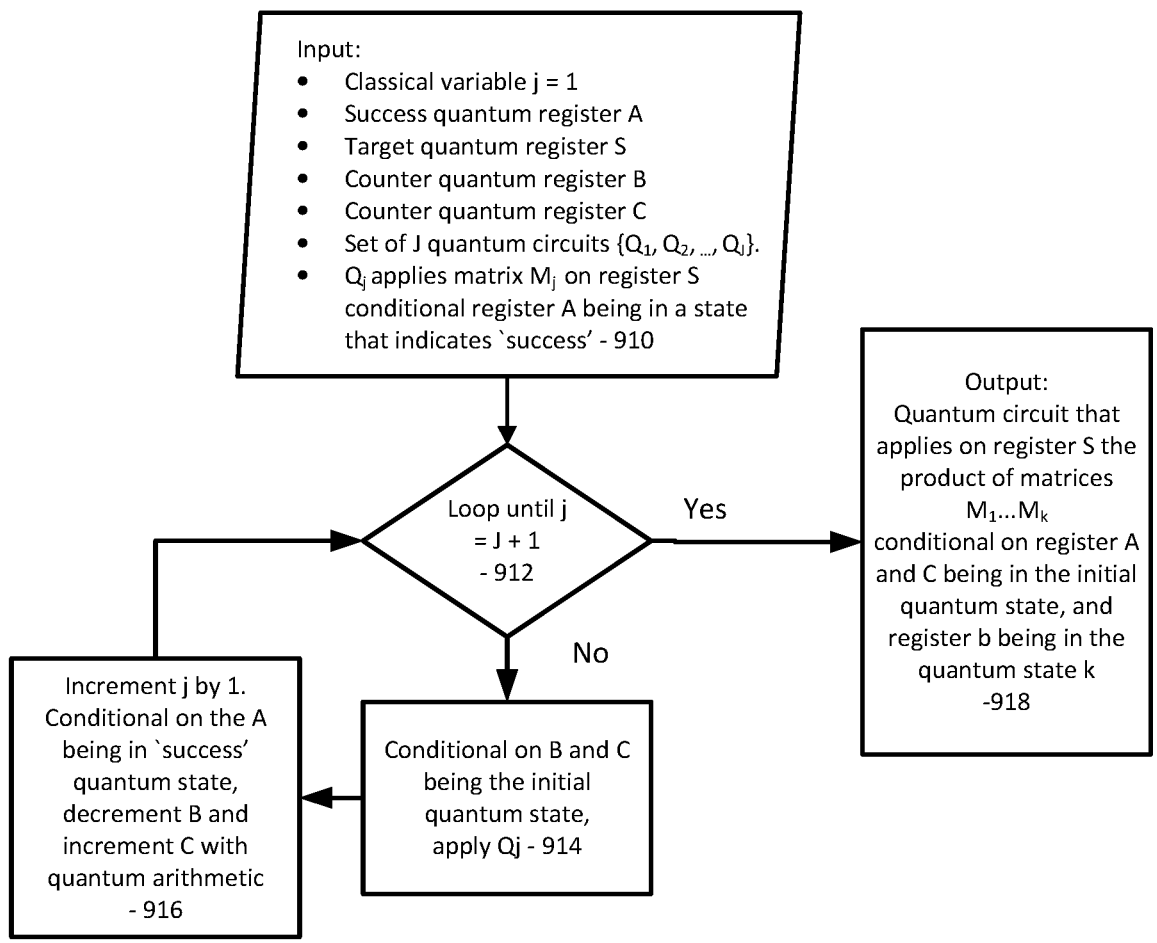
FIG. 9 is an example method of a compression method as disclosed herein.

FIG. 9 is an example method of a compression method as disclosed herein. At 910, numerous values are input, including one or more of (a) a classical variable j=1; (b) a success quantum register A; (c) target quantum register S; (d) counter quantum register B; (e) counter quantum register C; (f) a set of J quantum circuits $Q_1, Q_2, Q_j$, where $Q_j$ applies matrix $M_j$ on register S conditional register A being in a state that indicates 'success. At 912, it is determined whether j=j+1. If not, then the method proceeds to 914. At 914, and conditional on B and C being the initial quantum state, $Q_j$ is applied. Then, at 916, j is incremented by 1, and conditional on the A being in a 'success quantum state, B is decremented and C is incremeneted with quantum arithmetic. 916 leads back into 912, until it is determined that j=j+1. If so, at 918, the method outputs a quantum circuit that applies on register S the product of matrices $M_1 ... M_k$ conditional on register A and C being in the initial quantum state, and register b being in the quantum state k.

Figure 14:
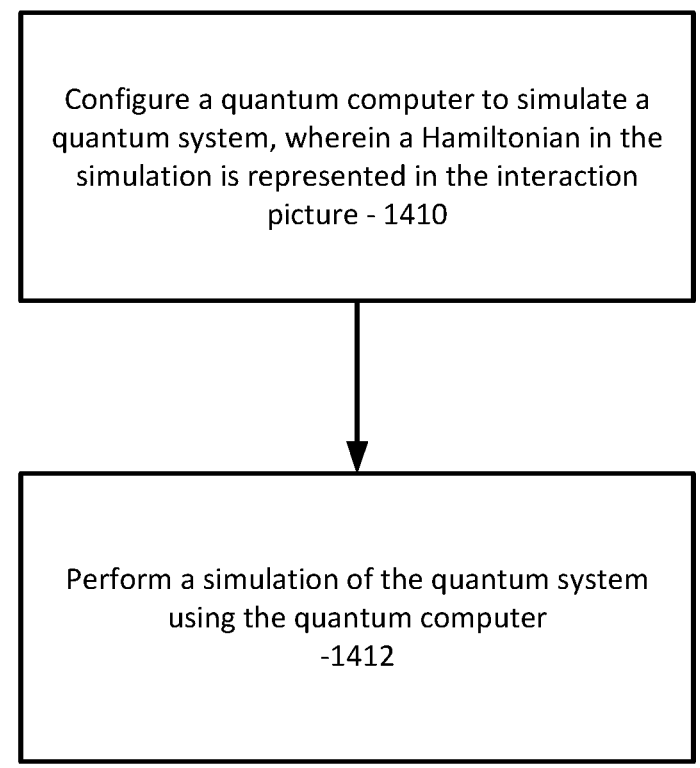
FIG. 14 illustrates an example method for performing a quantum simulation in accordance with an embodiment of the disclosed technology.

FIG. 14 illustrates an example method for performing a quantum simulation in accordance with an embodiment of the disclosed technology.

At 1410, a quantum computer is configured to simulate a quantum system, wherein a Hamiltonian in the simulation is represented in the interaction picture. At 1412, a simulation of the quantum system is performed using the quantum computer.

In certain implementations, the simulation of the quantum system is a subroutine that is repeated two or more times. In some implementations, the simulation is performed using linear combinations of matrices. For instance, in some cases, the simulation uses linear combinations of unitaries performed on a diagonally dominant matrix (e.g., using linear combinations of unitaries performed on the diagonally dominant components of the diagonally dominant matrix). In certain implementations, the quantum system is modelled by a Hubbard model. In particular implementations, the quantum system describes a physical chemical system or molecule. In some implementations, the Hamiltonian is sparse and the simulation uses a state of an auxillary qubit to encode matrix elements of the Hamiltonian instead of using graph decomposition techniques. In certain implementations, the simulation is performed by compressing ancillas for quantum simulation of a time-dependent Hamiltonian.

FIG. 15 illustrates a further example method for performing a quantum simulation in accordance with an embodiment of the disclosed technology.

At 1510, a quantum algorithm is implemented on a quantum computer for simulating a general sparse time-dependent quantum system. In this embodiment, the quantum algorithm does not use graph decomposition techniques.

In certain implementations, a Hamiltonian used in the simulation is represented in the interaction picture. In some implementations, the simulation uses linear combinations of unitaries performed on a diagonally dominant matrix. In particular implementations, a Hamilltonian used in the simulation is represented in the interaction picture and is chosen to be a diagonal matrix. In certain implementations the quantum system is modelled by a Hubbard model, a physical chemical system, or a molecule. In further implementations, the simulation includes compressing ancillas used to index a time for the simulation.

VIII. Example Computing Environments

Figure 10:
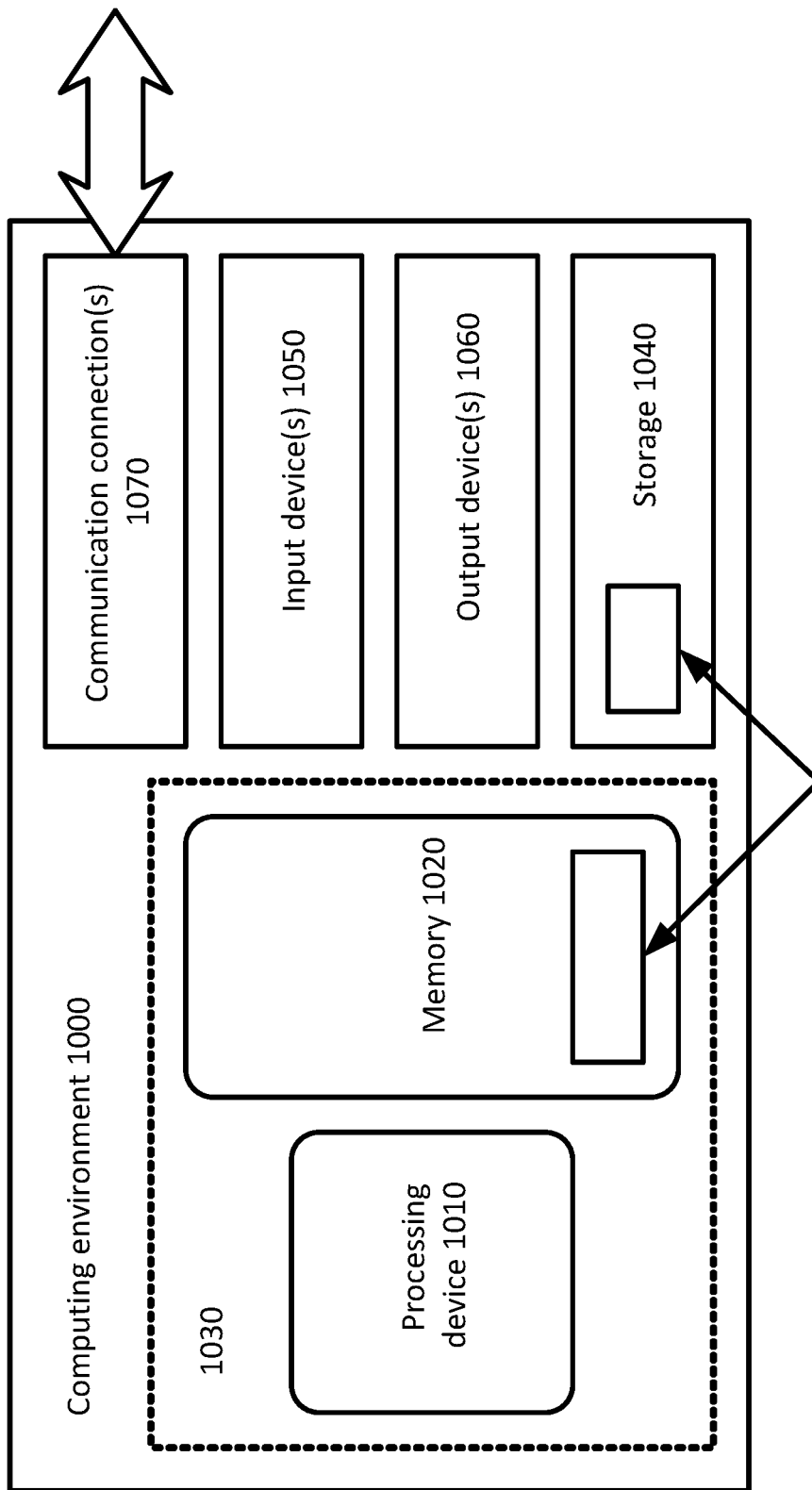
FIG. 10 illustrates a generalized example of a suitable classical computing environment in which aspects of the described embodiments can be implemented.

FIG. 10 illustrates a generalized example of a suitable classical computing environment 1000 in which aspects of the described embodiments can be implemented. The computing environment 1000 is not intended to suggest any limitation as to the scope of use or functionality of the disclosed technology, as the techniques and tools described herein can be implemented in diverse general-purpose or special-purpose environments that have computing hardware.

With reference to FIG. 10, the computing environment 1000 includes at least one processing device 1010 and memory 1020. In FIG. 2, this most basic configuration 1030 is included within a dashed line. The processing device 1010 (e.g., a CPU or microprocessor) executes computer-executable instructions. In a multi-processing system, multiple processing devices execute computer-executable instructions to increase processing power. The memory 1020 may be volatile memory (e.g., registers, cache, RAM, DRAM, SRAM), non-volatile memory (e.g., ROM, EEPROM, flash memory), or some combination of the two. The memory 1020 stores software 1080 implementing tools for peforming any of the disclosed simulation techniques in the quantum computer as described herein. The memory 1020 can also store software 1080 for synthesizing, generating, or compiling quantum circuits for performing the described simulation techniques using quantum computing devices as described herein.

The computing environment can have additional features. For example, the computing environment 1000 includes storage 1040, one or more input devices 1050, one or more output devices 1060, and one or more communication connections 1070. An interconnection mechanism (not shown), such as a bus, controller, or network, interconnects the components of the computing environment 1000. Typically, operating system software (not shown) provides an operating environment for other software executing in the computing environment 1000, and coordinates activities of the components of the computing environment 1000.

The storage 1040 can be removable or non-removable, and includes one or more magnetic disks (e.g., hard drives), solid state drives (e.g. flash drives), magnetic tapes or cassettes, CD-ROMs, DVDs, or any other tangible non-volatile storage medium which can be used to store information and which can be accessed within the computing environment 1000. The storage 1040 can also store instructions for the software 1080 implementing any of the disclosed simulation techniques in a quantum computing device. The storage 1040 can also store instructions for the software 1080 for generating and/or synthesizing any of the described techniques, systems, or quantum circuits.

The input device(s) 1050 can be a touch input device such as a keyboard, touchscreen, mouse, pen, trackball, a voice input device, a scanning device, or another device that provides input to the computing environment 1000. The output device(s) 1060 can be a display device (e.g., a computer monitor, laptop display, smartphone display, tablet display, netbook display, or touchscreen), printer, speaker, or another device that provides output from the computing environment 1000.

The communication connection(s) 1070 enable communication over a communication medium to another computing entity. The communication medium conveys information such as computer-executable instructions or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

As noted, the various methods, techniques for controlling a quantum computing device, circuit design techniques, or compilation/synthesis techniques can be described in the general context of computer-readable instructions stored on one or more computer-readable media. Computer-readable media are any available media (e.g., memory or storage device) that can be accessed within or by a computing environment. Computer-readable media include tangible computer-readable memory or storage devices, such as memory 1020 and/or storage 1040, and do not include propagating carrier waves or signals per se (tangible computer-readable memory or storage devices do not include propagating carrier waves or signals per se).

Various embodiments of the methods disclosed herein can also be described in the general context of computer-executable instructions (such as those included in program modules) being executed in a computing environment by a processor. Generally, program modules include routines, programs, libraries, objects, classes, components, data structures, and so on, that perform particular tasks or implement particular abstract data types. The functionality of the program modules may be combined or split between program modules as desired in various embodiments. Computer-executable instructions for program modules may be executed within a local or distributed computing environment.

Figure 11:
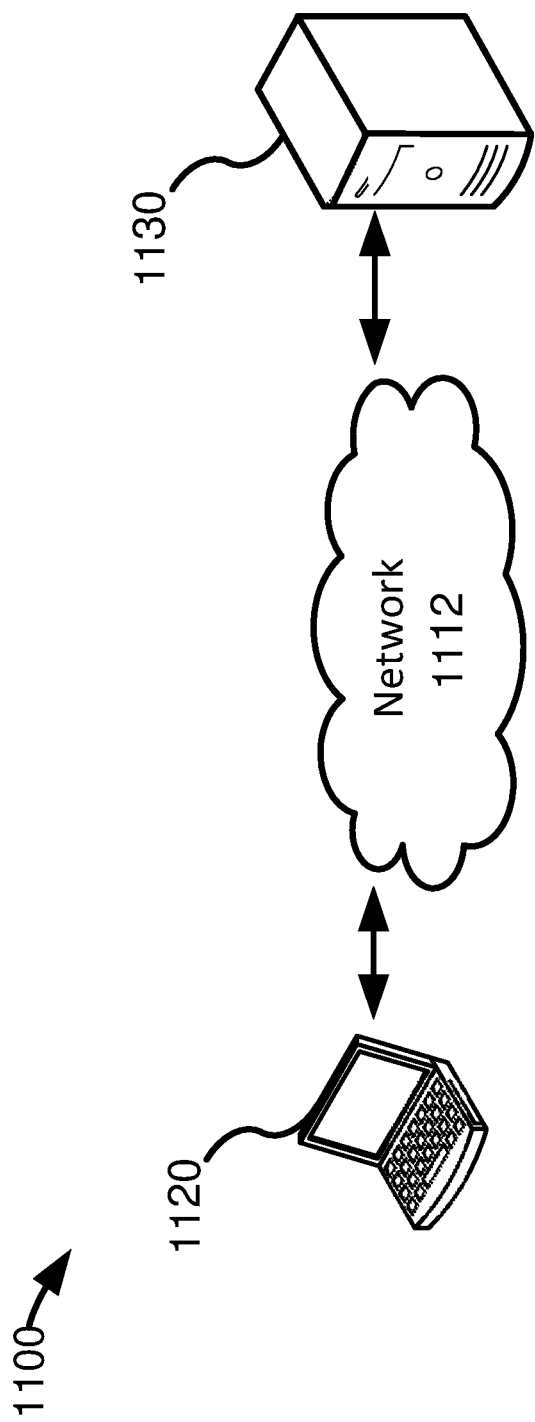
FIG. 11 illustrates an example of a possible network topology (e.g., a client-server network) for implementing a system according to the disclosed technology.

An example of a possible network topology 1100 (e.g., a client-server network) for implementing a system according to the disclosed technology is depicted in FIG. 11. Networked computing device 1120 can be, for example, a computer running a browser or other software connected to a network 1112. The computing device 1120 can have a computer architecture as shown in FIG. 10 and discussed above. The computing device 1120 is not limited to a traditional personal computer but can comprise other computing hardware configured to connect to and communicate with a network 1112 (e.g., smart phones, laptop computers, tablet computers, or other mobile computing devices, servers, network devices, dedicated devices, and the like). Further, the computing device 1120 can comprise an FPGA or other programmable logic device. In the illustrated embodiment, the computing device 1120 is configured to communicate with a computing device 1130 (e.g., a remote server, such as a server in a cloud computing environment) via a network 1112. In the illustrated embodiment, the computing device 1120 is configured to transmit input data to the computing device 1130, and the computing device 1130 is configured to implement a technique for controlling a quantum computing device according to any of the disclosed embodiments and/or a circuit generation/compilation/synthesis technique for generating quantum circuits for performing any of the techniques disclosed herein. The computing device 1130 can output results to the computing device 1120. Any of the data received from the computing device 1130 can be stored or displayed on the computing device 1120 (e.g., displayed as data on a graphical user interface or web page at the computing devices 1120). In the illustrated embodiment, the illustrated network 1112 can be implemented as a Local Area Network (LAN) using wired networking (e.g., the Ethernet IEEE standard 802.3 or other appropriate standard) or wireless networking (e.g. one of the IEEE standards 802.11a, 802.11b, 802.11g, or 802.11n or other appropriate standard). Alternatively, at least part of the network 1112 can be the Internet or a similar public network and operate using an appropriate protocol (e.g., the HTTP protocol).

Figure 12:
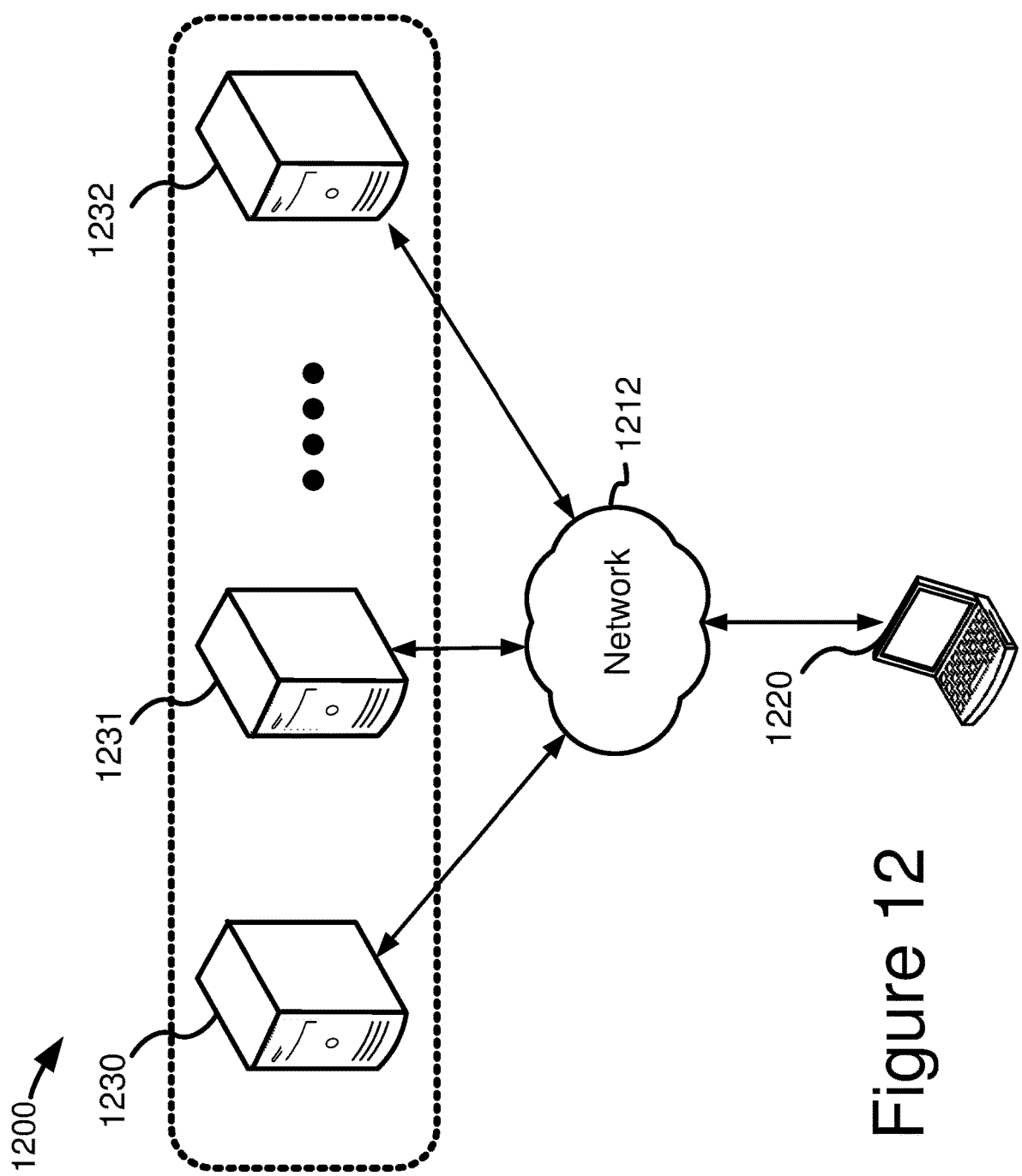
FIG. 12 illustrates another example of a possible network topology (e.g., a distributed computing environment) for implementing a system according to the disclosed technology.

Another example of a possible network topology 1200 (e.g., a distributed computing environment) for implementing a system according to the disclosed technology is depicted in FIG. 12. Networked computing device 1220 can be, for example, a computer running a browser or other software connected to a network 1212. The computing device 1220 can have a computer architecture as shown in FIG. 12 and discussed above. In the illustrated embodiment, the computing device 1220 is configured to communicate with multiple computing devices 1230, 1231, 1232 (e.g., remote servers or other distributed computing devices, such as one or more servers in a cloud computing environment) via the network 1212. In the illustrated embodiment, each of the computing devices 1230, 1231, 1232 in the computing environment 1200 is used to perform at least a portion of a technique for controlling a quantum computing device according to any of the disclosed embodiments and/or a circuit generation/compilation/synthesis technique for generating quantum circuits for performing any of the techniques disclosed herein. In other words, the computing devices 1230, 1231, 1232 form a distributed computing environment in which aspects of the techniques as disclosed herein and/or quantum circuit generation/compilation/synthesis processes are shared across multiple computing devices. The computing device 1220 is configured to transmit input data to the computing devices 1230, 1231, 1232, which are configured to distributively implement such as process, including performance of any of the disclosed methods or creation of any of the disclosed circuits, and to provide results to the computing device 1220. Any of the data received from the computing devices 1230, 1231, 1232 can be stored or displayed on the computing device 1220 (e.g., displayed as data on a graphical user interface or web page at the computing devices 1220). The illustrated network 1212 can be any of the networks discussed above with respect to FIG. 11.

Figure 13:
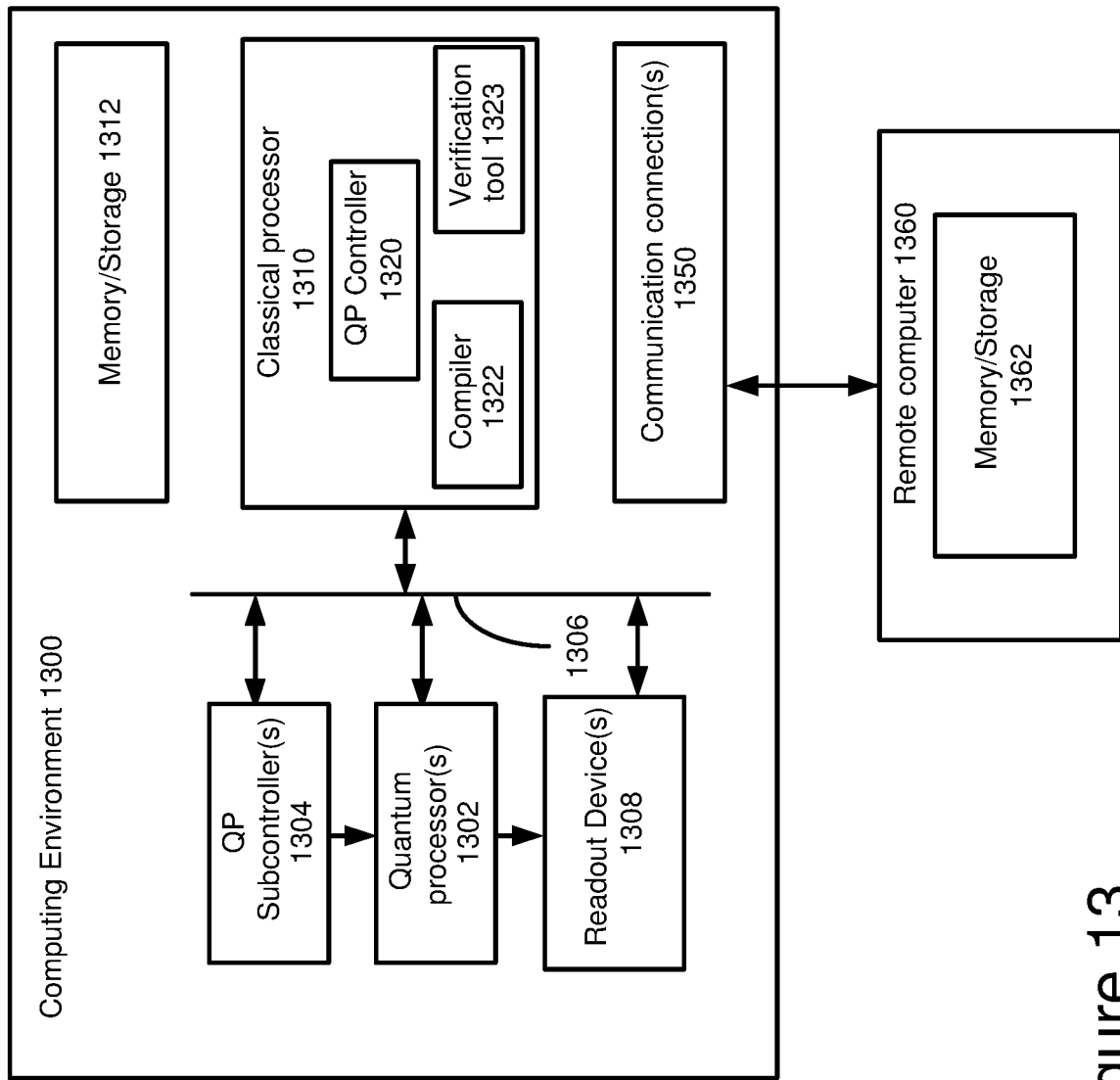
FIG. 13 illustrates an exemplary system for implementing the disclosed technology.

With reference to FIG. 13, an exemplary system for implementing the disclosed technology includes computing environment 1300. In computing environment 1300, a compiled quantum computer circuit description (including quantum circuits configured to perform any of the disclosed simulation techniques as disclosed herein) can be used to program (or configure) one or more quantum processing units such that the quantum processing unit(s) implement the circuit described by the quantum computer circuit description.

The environment 1300 includes one or more quantum processing units 1302 and one or more readout device(s) 1308. The quantum processing unit(s) execute quantum circuits that are precompiled and described by the quantum computer circuit description. The quantum processing unit(s) can be one or more of, but not limited to: (a) a superconducting quantum computer; (b) an ion trap quantum computer; (c) a fault-tolerant architecture for quantum computing; and/or (d) a topological quantum architecture (e.g., a topological quantum computing device using Majorana zero modes). The precompiled quantum circuits, including any of the disclosed circuits, can be sent into (or otherwise applied to) the quantum processing unit(s) via control lines 1306 at the control of quantum processor controller 520. The quantum processor controller (QP controller) 1320 can operate in conjunction with a classical processor 1310 (e.g., having an architecture as described above with respect to FIG. 10) to implement the desired quantum computing process. In the illustrated example, the QP controller 1320 further implements the desired quantum computing process via one or more QP subcontrollers 1304 that are specially adapted to control a corresponding one of the quantum processor(s) 1302. For instance, in one example, the quantum controller 1320 facilitates implementation of the compiled quantum circuit by sending instructions to one or more memories (e.g., lower-temperature memories), which then pass the instructions to low-temperature control unit(s) (e.g., QP subcontroller(s) 1304) that transmit, for instance, pulse sequences representing the gates to the quantum processing unit(s) 1302 for implementation. In other examples, the QP controller(s) 1320 and QP subcontroller(s) 1304 operate to provide appropriate magnetic fields, encoded operations, or other such control signals to the quantum processor(s) to implement the operations of the compiled quantum computer circuit description. The quantum controller(s) can further interact with readout devices 1308 to help control and implement the desired quantum computing process (e.g., by reading or measuring out data results from the quantum processing units once available, etc.)

With reference to FIG. 13, compilation is the process of translating a high-level description of a quantum algorithm into a quantum computer circuit description comprising a sequence of quantum operations or gates, which can include the circuits as disclosed herein (e.g., the circuits configured to perform one or more simulations as disclosed herein). The compilation can be performed by a compiler 1322 using a classical processor 1310 (e.g., as shown in FIG. 10) of the environment 1300 which loads the high-level description from memory or storage devices 1312 and stores the resulting quantum computer circuit description in the memory or storage devices 1312.

In other embodiments, compilation and/or verification can be performed remotely by a remote computer 1360 (e.g., a computer having a computing environment as described above with respect to FIG. 10) which stores the resulting quantum computer circuit description in one or more memory or storage devices 1362 and transmits the quantum computer circuit description to the computing environment 1300 for implementation in the quantum processing unit(s) 1302. Still further, the remote computer 1300 can store the high-level description in the memory or storage devices 1362 and transmit the high-level description to the computing environment 1300 for compilation and use with the quantum processor(s)). In any of these scenarios, results from the computation performed by the quantum processor(s) can be communicated to the remote computer after and/or during the computation process. Still further, the remote computer can communicate with the QP controller(s) 1320 such that the quantum computing process (including any compilation, verification, and QP control procedures) can be remotely controlled by the remote computer 1360. In general, the remote computer 1360 communicates with the QP controller(s) 1320, compiler/synthesizer 1322, and/or verification tool 1323 via communication connections 1350.

In particular embodiments, the environment 1300 can be a cloud computing environment, which provides the quantum processing resources of the environment 1300 to one or more remote computers (such as remote computer 1360) over a suitable network (which can include the internet).

IX. Summation

The dynamics of interest in many condensed matter systems occur in the low-energy subspace of the Hamiltonian. This work demonstrates that by simulating quantum dynamics in the interaction picture, the cost of simulation on a quantum computer for a large class of Hamiltonians can be made to scale with the low-energy component. This is especially useful when the dynamics at high energy scales are, in a certain sense, simple, but nevertheless are necessary as they couple to low energy scales. This represents a significant advance compared to state-of-art time-independent quantum simulation algorithms that generally scales with the spectral norm of the full Hamiltonian. Finding further improvements in simulation algorithms specialized for low-energy subspaces remains a major open problem. Embodiments of the disclosed approach are complementary to alternatives based on spectral gap amplification, and the possibility of combining these methods is an interesting future direction.

More generally, the complexity of time-independent quantum simulation for generic Hamiltonians, given minimal information, appears to have been resolved. Thus future advancements, such as this work, will likely focus on exploiting the detailed structure of Hamiltonians of interest. For example, the result for time-dependent sparse Hamiltonian simulation has scaling $\tilde{\mathcal{O}}(d\|H\|_{max}t)$, but improvement to $\tilde{\mathcal{O}}(\sqrt{d}\|H\|_{max}\|H\|_1 t)$ is straight-forward, if the induced one-norm $\|H\|_1$ of the Hamiltonian is also known beforehand. The promise of results in similar directions is exemplified by recent work that exploit the geometric locality of interactions, or the sizes of different terms in a Hamiltonian. The challenge will be finding characterizations of Hamiltonians that are sufficiently specific so as to enable a speedup, yet sufficiently general so as to include problems of practical and scientific value.

X. Appendix

A. The Truncated Taylor Series Algorithm

The truncated Taylor series simulation algorithm was a major advance in quantum simulation for its conceptual simplicity and computational efficiency. The original algorithm is motivated by truncating the Taylor expansion of the time-evolution operator at degree K.

$$e^{-iHt} = 1 - iHt + \frac{(-iHt)^2}{2!} + \frac{(-iHt)^3}{3!} \ldots = \underbrace{\sum_{k=0}^{K} \frac{(-iHt)^k}{k!}}_{\overline{R}_K} + \underbrace{\sum_{k=K+1}^{\infty} \frac{(-iHt)^k}{k!}}_{R_K}. \quad (72)$$

Assuming that t>0 and that the truncation order K≥2$\|H\|$t, the norms of $\overline{R}_K$ and the remainder term $R_K$ are bounded by $$\|\overline{R}_K\| = \|e^{-iHt} - R_K\| \le 1 + \|R_K\|, \quad (73)$$

$$\|R_K\| \le \sum_{k=K+1}^{\infty} \frac{(\|H\|t)^k}{k!} \le \frac{(\|H\|t)^{K+1}}{(K+1)!} \sum_{k=K+2}^{\infty} (1/2)^{k-K-1} = \frac{2(\|H\|t)^{K+1}}{(K+1)!}.$$

Thus any unitary quantum circuit TTS that acts jointly on registers α,b,s and applies the non-unitary operator $(\langle 00|_{ab} \otimes I_s) TTS(|00\rangle_{ab} \otimes I_s) \approx \overline{R}_K$ approximates the time-evolution operator with error δ and failure probability p given by $$\delta = \|e^{-iHt} - \overline{R}_K\| = \|R_K\| \le \frac{2(\|H\|t)^{K+1}}{(K+1)!}, \quad (74)$$

$$p \le 1 - \min_{|\psi\rangle_s} \left| \frac{\overline{R}_K |\psi\rangle_s}{1 + \|R_K\|} \right|^2 =$$

$$1 - \min_{|\psi\rangle_s} \left| \frac{(e^{-iHt} - R_K)|\psi\rangle_s}{1 + \|R_K\|} \right|^2 \le 1 - \left| \frac{1 - \|R_K\|}{1 + \|R_K\|} \right|^2 = 4\|R_K\| = 4\delta.$$

Solving Eq. (74) for $\|H\|t = \mathcal{O}(1)$ gives the required truncation order $$K = \mathcal{O}\left(\frac{\log(1/\delta)}{\log\log(1/\delta)}\right).$$

The simulation algorithm TTS in FIG. 4 is obtained by constructing two oracles. $HAM_K$, which applies positive integer powers of $(-iH)^k$ up to k=K, and $COEF_K$, which prepares a quantum state that selects these terms with the right coefficients. $HAM_K$ will require additional ancilla registers, which can be indexed with $\vec{a}$ and $\vec{b}$. Note that the gate and space complexity in the truncated Taylor series algorithm is dominated by that of $HAM_K$.

$$\left(\langle 0|_{\vec{a}} \otimes I_{\vec{sb}}\right) HAM_K(|0\rangle_{\vec{a}} \otimes I_{\vec{sb}}) := \sum_{k=0}^{K} |k\rangle\langle k|_{\vec{b}} \otimes (-iH)^k, \quad (75)$$

$$COEF_K |0\rangle_{\vec{b}} := \frac{1}{\sqrt{\beta}} \sum_{k=0}^{K} \sqrt{\frac{t^k}{k!}} |k\rangle_{\vec{b}},$$

$$\beta = \sum_{k=0}^{K} \frac{t^k}{k!} \le e^t.$$

FIG. 4 depicts the quantum circuit representation of (top, left) an example implementation of $HAM_K$ from Eq. (75) using K queries to controlled-HAM, (top, right) a single step of the truncated Taylor series algorithm before oblivious amplitude amplification, and (bottom) a single step of time-evolution by the truncated Taylor series algorithm from Eq. (78). Note that β=2 as a single-round of oblivious amplitude amplification is used. Thin horizontal lines depict single-qubit registers. Filled circles depict a unitary controlled on the $|0\rangle$ state.

The original algorithm implements $HAM_K$ using K queries to controlled-HAM $$C\text{-}HAM := |1\rangle\langle 1|_b \otimes I_{as} + |0\rangle\langle 0|_b \otimes HAM \quad (76)$$

with K copies of registers α and b. The state $|k\rangle_{\vec{b}} = |0\rangle^{\otimes k}|1\rangle^{\otimes K-k}$ that selects desired powers of H is encoded in unary, and so $COEF_K$ may be implemented using $\mathcal{O}(K)$ primitive gates. Up to a proportionality factor β, the unitaries of Eq. (75) allow us to implement the desired linear combination $\overline{R}_K$ for simulating time-evolution.

$$TTS_\beta := (COEF_K^\dagger \otimes I_{\vec{as}}) HAM_K (COEF_K \otimes I_{\vec{as}}) \quad (77)$$

$$(\langle 0|_{\vec{ab}} \otimes I_s) TTS_\beta (|0\rangle_{\vec{ab}} \otimes I_s = \frac{\overline{R}_K}{\beta} \approx \frac{e^{-iHt}}{\beta}.$$

As $\overline{R}_k$ is close to unitary, the success probability $\approx 1/\beta^2$ may be boosted using oblivious amplitude amplification. When β=2, a single round of oblivious amplitude amplification suffices to boost the success probability to $1-\mathcal{O}(\delta)$. Thus, one can choose ln 2≤t=$\mathcal{O}(1)$ such that β=2. If one desires |t|<ln 2, β may be decreased by appending a single-qubit ancilla and noting that $|\langle 0|e^{i\theta X}|0\rangle| = |\cos \theta| \le 1$. Thus simulation is accomplished with the circuit $$TTS = TTS_{\beta=2}(REF_{\vec{ab}} \otimes I_s) TTS_{\beta=2}^\dagger (REF$$
$$\vec{ab} \otimes I_s (TTS_{\beta=2}, REF_{\vec{ab}} = I_{\vec{ab}} - 2|0\rangle\langle 0|_{\vec{ab}}. \quad (78)$$

This approximates time-evolution by $e^{-iHt}$ with error $\|(\langle 0|_{\vec{ab}} \otimes I_s) TTS(|0\rangle_{\vec{ab}} \otimes I_s) - e^{-iHt}\| = \mathcal{O}(\delta)$. In order to simulate evolution $e^{-iHT}$ by longer times T>t, one can apply $TTS^{T/t}$— here t=$\Theta(1)$ is chosen such that T/t is an integer. The overall error $$\epsilon = \|(\langle 0|_{\vec{ab}} \otimes I_s) TTS^{T/t}(|0\rangle_{\vec{ab}} \otimes I_s) - e^{-iHT}\| = \mathcal{O}(T\delta), \quad (79)$$

and success probability $1 - \mathcal{O}(\epsilon)$ may thus be controlled by choosing the error of each segment to be $\delta = \mathcal{O}\left(\frac{\epsilon}{T}\right)$.

This requires a truncation order of $$K = O\left(\frac{\log(\alpha T/\epsilon)}{\log\log(\alpha T/\epsilon)}\right).$$

One may drop the implicit assumption that $\|H\| \le 1$, by rescaling $H \to H/\alpha$, for some normalization constant $\alpha \ge \|H\|$. Thus simulation of $e^{-iHt}$ requires $$O\left(\alpha T \frac{\log(\alpha T/\epsilon)}{\log\log(\alpha T/\epsilon)}\right)$$

queries to C-HAM. Note that the gate cost of all queries to $\text{COEF}_K$ at $$O\left(\alpha T \frac{\log(\alpha T/\epsilon)}{\log\log(\alpha T/\epsilon)}\right)$$

and that of $\text{REF}_{\vec{\alpha}_b}$ at $$O\left(n_a \alpha T \frac{\log(\alpha T/\epsilon)}{\log\log(\alpha T/\epsilon)}\right),$$

is typically dominated by the gate cost of all applications of C-HAM.

The ancilla overhead of the truncated Taylor series algorithm, at $$n_s + O\left(n_\alpha \frac{\log(1/\epsilon)}{\log\log(1/\epsilon)}\right)$$

qubits, may be significantly improved by choosing the sequence of unitaries in the compression gadget Lemma 2 of Section III C to be $U_j = -iHAM$. This straightforwardly furnishes the following result.

Corollary 1 (Hamiltonian simulation by a compressed truncated Taylor series). Let a time-independent Hamiltonian H be encoded in standard-form with normalization $\alpha$ and $n_s + n_\alpha$ qubits, as per Eq. (5). Then the truncated Taylor series algorithm approximates the time-evolution operator $e^{-iHt}$ for any $|\alpha t| \le \ln 2$ to error $\epsilon$ using 1. Queries to HAM: $O\left(\frac{\log(1/\epsilon)}{\log\log(1/\epsilon)}\right)$.
2. Qubits: $n_s + O(n_\alpha + \log\log(1/\epsilon))$.
3. Primitive gates: $O\left((n_\alpha + \log\log(1/\epsilon))\frac{\log(1/\epsilon)}{\log\log(1/\epsilon)}\right)$.

For longer-time simulations $e^{-iHT}$ of duration $T > t$, Corollary 1 is applied $\alpha T/\ln(2)$ times, each with error $$O\left(\frac{\epsilon}{\alpha T}\right).$$

This leads a query complexity $$O\left(\alpha T \frac{\log(\alpha T/\epsilon)}{\log\log(\alpha T/\epsilon)}\right).$$

Though the compressed algorithm is still worse than the quantum signal processing approach, which uses $n_s + O(n_\alpha)$ qubits, the technique is applicable to simulating time-dependent Hamiltonians, as demonstrated in Section III.

XI. Error from Truncating and Discretizing the Dyson Series

In this section, the proof of Lemma 1 is completed for the error from truncating the Dyson series at order K, and the error from approximating its terms, which are time-ordered integrals, with Riemann sums. These results provide a rigorous upper bound on the error of time-dependent Hamiltonian simulation. Let $D_k$ be the $k^{th}$ term in the Dyson expansion, and let $B_k$ be the Riemann sum of $D_k$ with each dimension discretized into $M = t/\Delta$ segments.

$$\mathcal{T}[e^{-i\int_0^t H(s)ds}] = \sum_{k=0}^{\infty} (-i)^k D_k = \lim_{M\to\infty} \sum_{k=0}^{\infty} \frac{(-it)^k}{M^k} B_k, \quad (80)$$

$$D_k := \frac{1}{k!}\int_0^t \cdots \int_0^t \mathcal{T}[H(t_1) \cdots H(t_k)]d^k t,$$

$$B_k := \sum_{0 \le m_k < \cdots < m_1 < M} H(m_k \Delta) \cdots H(m_1 \Delta).$$

It is now proven that the bounds on the $\epsilon_1$ term, which is the error due to truncating the Dyson series at order K.

Lemma 5. Let $H(s): \mathbb{R} \to \mathbb{C}^{N \times N}$ be differentiable on the domain $[0, t]$. For any $\epsilon_1 \in [0, 2^{-e}]$, an approximation to the time ordered operator exponential of $-iH(s)$ can be constructed such that $$\left\|\mathcal{T}[e^{-i\int_0^t H(s)ds}] - \sum_{k=0}^{K} (-i)^k D_k\right\| \le \epsilon_1,$$

1. $K \ge \left\lceil -1 + \frac{2\ln(1/\epsilon_1)}{\ln\ln(1/\epsilon_1) + 1}\right\rceil$ 2. $\max_s \|H(s)\| t \le \ln 2$ if one takes Proof of Lemma 5. We start by bounding $\|D_k\|$.

$$\|D_k\| = \frac{1}{k!}\left\|\int_0^t \cdots \int_0^t \mathcal{T}[H(t_1) \cdots H(t_k)]d^k t\right\| \le \quad (81)$$

$$\frac{1}{k!}\left\|\int_0^t \cdots \int_0^t \prod_{j=1}^k \|H(t_j)\| d^k t\right\| \le \frac{(t \max_s \|H(s)\|)^k}{k!}.$$

At this point, the proof is identical to the time-independent case as $\max_s \|H(s)\|$ is independent of time. Thus using Stirling's approximation and assuming $K \ge 2 \max_s \|H(s)\| |t|$, $$\epsilon_1 = \left\|\mathcal{T}[e^{-i\int_0^t H(s)ds}] - \sum_{k=0}^K (-i)^k D_k\right\| \le \sum_{k=K+1}^{\infty} \|D_k\| \le \quad (82)$$

$$\sum_{k=K+1}^{\infty} \frac{(t\max_s\|H(s)\|)^k}{k!} \leq \frac{(t\max_s\|H(s)\|)^{K+1}}{(K+1)!} \sum_{k=K+2}^{\infty} (1/2)^{k-K-1} =$$

$$\frac{(t\max_s\|H(s)\|)^{K+1}}{(K+1)!} \leq \left(\frac{(te\max_s\|H(s)\|)}{K+1}\right)^{K+1}$$

Now one can find that this in turn is less than $\epsilon_1$ if $\max_s \|H(s)\|te < \min\{\ln(1/\epsilon_1), e\ln 2\} \leq 1$ given that, $\epsilon_1 \leq 2^{-e}$ and $$K \geq \max\left\{-1 + \frac{\ln(1/\epsilon_1)}{W\left(\frac{\ln(1/\epsilon_1)}{\max_s \|H(s)\|te}\right)}, 2\max_s\|H(s)\|\|t|\right\}, \tag{83}$$

where W is the Lambert-W function. Using the fact that for $x \geq 1$, $W(x) \geq (\ln(x)+1)/2$ and $\ln(e\ln 2) < 1$ one can obtain the simpler bound $$K = \left\lceil -1 + \frac{2\ln(1/\epsilon_1)}{\ln\ln(1/\epsilon_1)+1} \right\rceil = O\left(\frac{\ln(1/\epsilon_1)}{\ln\ln(1/\epsilon_1)}\right). \tag{84}$$

It is now proven that the bounds on the $\epsilon_2$ term for the error from approximating the Dyson series with its Riemann sum.

Lemma 6. Let $H(s): \mathbb{R} \to \mathbb{C}^{N \times N}$ be differentiable on the domain $[0,t]$. Let one also define the quantities $$\langle\|\dot{H}\|\rangle := \frac{1}{t}\int_0^t \left\|\frac{dH(s)}{ds}\right\|$$

ds. For integer $K \geq 0$ and $\epsilon_2 > 0$, $$\left\|\sum_{k=0}^{K}(-i)^k D_k - \sum_{k=0}^{K}\left(-i\frac{t}{M}\right)^k B_k\right\| \leq \epsilon_2,$$

by choosing any M such that

1. $M \geq \frac{t^2}{\epsilon_2} 4 e^{\max_s\|H(s)\|t}(\langle\|\dot{H}\|\rangle + \max_s\|H(s)\|^2)$,
2. $M \geq K^2$.

Proof of Lemma 6. One first expands the time-ordered evolution operator using the Dyson series. One can then examine the error incurred in evaluating a given order of the Dyson series for a small hypercubic region of sidelength $\Delta = t/M$. One can then upper bound the maximum number of such hypercubes within the allowed volume and use the triangle inequality to argue that the error is the product of the number of such hypercubes and the maximum error per hypercube.

Since $H(s)$ is a differentiable function it holds from Taylor's theorem that for any $\delta \ll 1$ and computational basis states $|x\rangle, |y\rangle$, $$\langle x|H(s+\delta)|y\rangle = \langle x|H(s)|y\rangle + \delta\langle x|\dot{H}(s)|y\rangle + o\left(\max_s\|\dot{H}(s)\|_{max}\delta\right). \tag{85}$$

Since computational basis states form a complete orthonormal basis it follows through norm inequalities that $$H(s+\delta) = H(s) + \delta \dot{H}(s) + o(\|\dot{H}(s)\|_{max} N^2 \delta). \tag{86}$$

One then has from Taylor's theorem and the triangle inequality that $$\|H(s+\delta) - H(s)\| = \left\|\sum_{j=1}^{r}[H(s+j\delta/r) - H(s+[j-1]\delta/r)]\right\| \leq \tag{87}$$

$$\left\|\sum_{j=1}^{r}\dot{H}(s+[j-1]\delta/r)\delta/r\right\| + r\left[o\left(\max_s\|\dot{H}(s)\|_{max}N^2\delta/r\right)\right] \leq$$

$$\int_0^\delta \|\dot{H}(s)\|ds + r\left[o\left(\max_s\|\dot{H}(s)\|_{max}N^2\delta/r\right)\right].$$

Since this equation holds for all r, it also holds in the limit as r approaches infinity. Therefore $$\|H(s+\delta) - H(s)\| \leq \int_0^\delta \|\dot{H}(s)\|ds. \tag{88}$$

Next, let one consider the error in approximating the integral over a hypercube to lowest order and let one define the hypercube to be C with $x_1, \ldots, x_q$ being the corner of the hypercube with smallest norm. First note that in general if $A_j$ and $B_j$ are a sequence of bounded operators and $\|\cdot\|$ is a sub-multiplicative norm then it is straight forward to show using an inductive argument that for all positive integer q.

$$\left\|\prod_{j=1}^{q} A_j - \prod_{j=1}^{q} B_j\right\| \leq \sum_{k=1}^{q}\left(\prod_{j=1}^{k-1}\|A_j\|\right)\|A_k - B_k\|\left(\prod_{j=k+1}^{q}\|B_j\|\right). \tag{89}$$

By applying this in combination with Eq. (88) to region C, the error induced is $$\left\|\int_C H(x_1+y_1)\ldots H(x_q+y_q)d^q y - \Delta^q \prod_{j=1}^{q} H(x_j)\right\| \leq \tag{90}$$

$$\int_C \left\|\prod_{j=1}^{q} H(x_j+y_j) - \prod_{j=1}^{q} H(x_j)\right\|dy^q, \leq$$

$$\sum_{k=1}^{q}\left(\prod_{j=1}^{k-1}\int_0^\Delta \|H(x_j+s)\|ds\right)\left(\int_0^\Delta\int_0^s \|\dot{H}(x_k+y)\|dyds\right)$$

$$\left(\prod_{j=k+1}^{q}\int_0^\Delta \|H(x_j)\|ds\right) \leq \sum_{k=1}^{q}\left(\prod_{j=1}^{k-1}\int_0^\Delta \|H(x_j+s)\|ds\right)$$

$$\left(\int_0^\Delta\int_0^s \|\dot{H}(x_k+y)\|dyds\right)\left(\prod_{j=k+1}^{q}\int_0^\Delta \alpha ds\right) \leq$$

$$(\alpha)^{q-1}\Delta \sum_{k=1}^{q}\left(\prod_{j\neq k}^{q}\int_0^\Delta ds\right)\left(\int_0^\Delta \|\dot{H}(x_k+s)\|ds\right)$$

where $\alpha := \max_s \|H(s)\|$.

There are two regions in the problem. The first region, which one calls the bulk, is the region that satisfies all the constraints of the problem namely bulk $:=\{(t_1, \ldots, t_q): \lfloor t_1/\Delta \rfloor > \ldots > \lfloor t_q/\Delta \rfloor \}$. Thus for any index $x_1, \ldots, x_q$ to a hypercube in the bulk, the ordering of terms $H(x_1+t_1) \ldots H(x_q+t_q)$ in the integrand of Eq. (90) is fixed. The second region is called the boundary which is the region in which the hypercubes used in the Riemann sum would stretch outside the allowed region for the integral. Since one can approximate the integral to be zero on all hypercubes that intersect the boundary, the maximum error in the approximation is the maximum error that the discrete approximation to the integrand can take within the region scaled to the volume of the corresponding region.

Finally one has from Eq. (90) that the contribution to the error from integration over the bulk of the simplex is $$\sum_{\substack{\vec{x} \in [0, \Delta, \ldots, (M-1)\Delta]^q \\ x_1 < x_2 < \ldots < x_q}} \left\| \int_C H(x_1+t_1) \ldots H(x_q+t_q) d^q t - \Delta^q \prod_{j=1}^{q} H(x_j) \right\| \leq \quad (91)$$

$$\sum_{\substack{\vec{x} \in [0, \Delta, \ldots, (M-1)\Delta]^q \\ x_1 < x_2 < \ldots < x_q}} (\alpha)^{q-1} \Delta \sum_{k=1}^{q} \left( \prod_{j \neq k}^{q} \int_0^{\Delta} ds \right) \left( \int_0^{\Delta} \|\dot{H}(x_k+s)\| ds \right)$$

In order to understand how the error scales let one examine the partial sum over $x_1$ for fixed $k>1$ is $$\sum_{x_2, \ldots, x_q} \sum_{x_1=0}^{x_2-1} \int_0^{\Delta} \|\dot{H}(x_1+s)\| \quad (92)$$

$$ds \left[ (\alpha)^{q-1} \Delta \left( \prod_{j \neq k}^{q} \int_0^{\Delta} ds \right) \left( \int_0^{\Delta} \|\dot{H}(x_k+s)\| ds \right) \right] \leq$$

$$\sum_{x_2, \ldots, x_q} \int_0^{x_2 \Delta} \|\dot{H}(s)\| ds \left[ (\alpha)^{q-1} \Delta \left( \prod_{j \neq k}^{q} \int_0^{\Delta} \|H(x_j+s)\| ds \right) \right.$$

$$\left. \left( \int_0^{\Delta} \|\dot{H}(x_k+s)\| ds \right) \right].$$

The integral then takes exactly the same form as the original integral and so by repeating the argument $q-1$ times it is easy to see, even in the case where $k=1$, that $$\sum_{\substack{\vec{x} \in [0, \Delta, \ldots, (M-1)\Delta]^q \\ x_1 < x_2 < \ldots < x_q}} (\alpha)^{q-1} \Delta \sum_{k=1}^{q} \left( \prod_{j \neq k}^{q} \int_0^{\Delta} ds \right) \left( \int_0^{\Delta} \|\dot{H}(x_k+s)\| ds \right) \leq \quad (93)$$

$$(\alpha)^{q-1} \Delta \sum_{k=1}^{q} \left( \prod_{j \neq k}^{q} \int_0^{x_{j+1}\Delta} ds \right) \left( \int_0^{x_{k+1}\Delta} \|\dot{H}(s)\| ds \right) \leq$$

$$\frac{(\alpha t)^{q-1}}{[q-1]!} \Delta \int_0^t \|\dot{H}(s)\| ds,$$

where the definition that $x_{q+1}:=M=t/\Delta$ has been used and the fact that $\int_0^x \|\dot{H}(s)\| ds$ is a monotonically increasing function of $x$. Thus the contribution to the error from the boundary is at most $$\sum_{q=1}^{K} \frac{(\alpha t)^{q-1}}{[q-1]!} \Delta \int_0^t \|\dot{H}\|(s) ds \leq \sum_{q=1}^{\infty} \frac{(\alpha)^{q-1}}{[q-1]!} \Delta \int_0^t \|\dot{H}(s)\| ds = \quad (94)$$

$$e^{\alpha t} \Delta \int_0^T \|\dot{H}(s)\| ds.$$

Next one desirably estimate the volume of the boundary. If a point is on the boundary then by definition there exists at least one $t_j$ such that $\lfloor t_j/\Delta \rfloor = \lfloor t_{j+1}/\Delta \rfloor$ taking $t_0 = t$. All other values are consistent with points within the bulk. It is then straight forward to see that (after relabeling the indexes for the summation) that the volume can be expressed as the sum over all possible choices of such sums with at least one matched index. If one further assumes that $q^2 \Delta \max_s \|H(s)\| / [\alpha t] \leq \ln(2)$ then one has the following upper bound on boundary contribution to the error in the Dyson series:

$$\int \prod_{j=1}^{q} \|H(t_q)\| \delta_{t \in bdy} dt^q \leq \quad (95)$$

$$\sum_{p=1}^{q} \Delta^q \max_s \|H(s)\|^p \alpha^{q-p} \binom{q}{p} \sum_{j_1=1}^{t/\Delta} \sum_{j_2=1}^{j_1-1} \ldots \sum_{j_{q-p}=1}^{j_{q-p-1}-1} 1 =$$

$$\Delta^q \alpha^q \sum_{p=1}^{q} \max_s \|H(s)\|^p \alpha^{-p} \binom{q}{p} \binom{t/\Delta}{q-p} \cdot \leq$$

$$\Delta^q \alpha^q \sum_{p=1}^{q} \max_s \|H(s)\|^p \alpha^{-p} \frac{(t/\Delta)^q}{q! p!} \left( \frac{q^2 \Delta}{t} \right)^p =$$

$$\frac{t^q \alpha^q}{q!} \sum_{p=1}^{q} \frac{1}{p!} \left( \frac{q^2 \Delta \max_s \|H(s)\|}{\alpha t} \right)^p \leq \frac{t^q \alpha^q}{q!} \left( \frac{q^2 \Delta \max_s \|H(s)\|}{\alpha t} \right)$$

$$\sum_{p=0}^{\infty} \frac{1}{p!} \left( \frac{q^2 \Delta \max_s \|H(s)\|}{\alpha t} \right)^p \leq \frac{2q(t\alpha)^{q-1}}{(q-1)!} \left( \Delta \max_s \|H(s)\| \right)$$

Note that when $q=1$, there is no boundary contribution. Using the fact that $q/(q-1) \leq 2$, $\forall q \geq 2$, this upper bound $$\int \prod_{j=1}^{q} \|H(t_q)\| \delta_{t \in bdy} dt^q \leq \frac{4 \Delta \max_s \|H(s)\| (\alpha t)^{q-1}}{(q-2)!} \quad (96)$$

It then follows from summing Eq. (96) that the error is $$\delta_{bdy} \leq \sum_{q=1}^{K} \int \prod_{j=1}^{q} \|H(t_q)\| \delta_{t \in bdy} dt^q \leq \quad (97)$$

$$\sum_{q=2}^{\infty} \frac{4 \Delta \max_s \|H(s)\| (\alpha t)^{q-1}}{(q-2)!} \leq 4 \Delta \alpha t \max_s \|H(s)\| e^{\alpha t}.$$

By adding this result to that of Eq. (94)

$$\sum_{q=1}^{K} \|D_q - \Delta^q B_q\| \le \delta_{bulk} + \delta_{bdy} \le 4\Delta t e^{max_s \|H(s)\|t} \left( \langle \|\dot{H}\| \rangle + \max_s \|H(s)\|^2 \right) \quad (98)$$

It follows from elementary algebra that this total error is at most $\epsilon_2$ if $$\Delta \le \frac{\epsilon_2}{4t e^{max_s \|H(s)\|t} \left[ \langle \|\dot{H}\| \rangle + \max_s \|H(s)\|^2 \right]}. \quad (99)$$

Expressed in terms of the number of points $$M = \frac{t}{\Delta},$$

the total error is at most $\epsilon_2$ if choose any M such that $$M \ge \frac{t^2}{\epsilon_2} 4 e^{max_s \|H(s)\|t} \left[ \langle \|\dot{H}\| \rangle + \max_s \|H(s)\|^2 \right] \quad (100)$$

The final bound on M quoted immediately follows from $$\frac{q^2 \Delta}{\alpha t} \max_s \|H(s)\| \le \ln(2) \Rightarrow K \le \sqrt{\ln(2)M} \le \sqrt{M}.$$

Now that it has been proven that the necessary results regarding the error in the truncated Dyson series simulation, the following proof of Lemma 1 can be provided:

Proof of Lemma 1. This is proven by combining two intermediate results using a triangle inequality. The approximation error is upper-bounded by $$\left\| \mathcal{T}\left[e^{-i\int_0^t H(s)ds}\right] - \sum_{k=0}^{K} \left(-i\frac{t}{M}\right)^k B_k \right\| = \quad (101)$$

$$\left\| \mathcal{T}\left[e^{-i\int_0^t H(s)ds}\right] - \sum_{k=0}^{K} (-i)^k D_k + \sum_{k=0}^{K} (-i)^k D_k - \sum_{k=0}^{K} \left(-i\frac{t}{M}\right)^k B_k \right\| \quad (102)$$

$$\le \underbrace{\left\| \mathcal{T}\left[e^{-i\int_0^t H(s)ds}\right] - \sum_{k=0}^{K} (-i)^k D_k \right\|}_{\epsilon_1} + \quad (103)$$

$$\underbrace{\left\| \sum_{k=0}^{K} (-i)^k D_k - \sum_{k=0}^{K} \left(-i\frac{t}{M}\right)^k B_k \right\|}_{\epsilon_2} \le \epsilon.$$

One can take in both cases the errors to obey $\epsilon_1 = \epsilon/2$ and $\epsilon_2 = \epsilon/2$. The result then follows by taking the most restrictive of the assumptions of Lemma 5 and Lemma 6. □

XII. Concluding Remarks

Having described and illustrated the principles of the disclosed technology with reference to the illustrated embodiments, it will be recognized that the illustrated embodiments can be modified in arrangement and detail without departing from such principles. For instance, elements of the illustrated embodiments shown in software may be implemented in hardware and vice-versa. Also, the technologies from any example can be combined with the technologies described in any one or more of the other examples. It will be appreciated that procedures and functions such as those described with reference to the illustrated examples can be implemented in a single hardware or software module, or separate modules can be provided. The particular arrangements above are provided for convenient illustration, and other arrangements can be used.

What is claimed is:

1. A method, comprising:
configuring a quantum computer to simulate time-evolution of a quantum system represented by a time-independent Hamiltonian of the form H=A+B, wherein A and B are two non-commuting parts, a free particle theory part A and a part describing interactions B by:
transforming the time-independent Hamiltonian to a time-dependent Hamiltonian, wherein the time-dependent Hamiltonian has the form H(t)=$e^{iAt}Be^{-iAt}$;
approximating a truncation and discretization of a Dyson series for the time-dependent Hamiltonian H(t) with a spectral norm $\alpha = \max_t \|H(t)\|$ and average rate-of change $$\langle \|\dot{H}\| \rangle = \frac{1}{t} \int_0^t \|\dot{H}(s)\| ds;$$

and
performing a simulation of the quantum system using the quantum computer by implementing a circuit of quantum gates.

2. The method of claim 1, wherein the simulation is performed using linear combinations of unitaries.

3. The method of claim 2, wherein the simulation uses linear combinations of unitaries performed on a diagonally dominant matrix.

4. The method of claim 3, wherein the simulation using linear combinations of unitaries is performed on diagonally dominant components of the diagonally dominant matrix.

5. The method of claim 1, wherein the quantum system is modelled by a Hubbard model.

6. The method of claim 1, wherein the quantum system describes a physical chemical system or molecule.

7. The method of claim 1, wherein the Hamiltonian is sparse and the simulation uses a state of an auxiliary qubit to encode matrix elements of the Hamiltonian instead of using graph decomposition techniques.

8. The method of claim 1, further comprising reducing the number of ancillas for quantum simulation of a time-dependent Hamiltonian by avoiding duplication of registers needed to perform the quantum simulation.

9. A computing system, comprising:
a classical computer configured to:
transform a time-independent Hamiltonian of the form H=A+B wherein A and B are two non-commuting parts, a free-particle theory part, A, and a part describing interactions, B, to a time-dependent Hamiltonian in the interaction picture wherein the time-dependent Hamiltonian has the form H(t)=$e^{iAt}Be^{-iAt}$;
approximate a truncation and discretization of a Dyson series for the time-dependent Hamiltonian, H(t), with a spectral-norm $\alpha = \max_t \|H(t)\|$ and an average rate-of-change and $$\langle \|\dot H\| \rangle = \frac{1}{t}\int_0^t \|\dot H(s)\| ds;$$

compile a circuit of quantum gates representing the approximated truncated and discretized Dyson series; and a quantum computer configured to perform a simulation of the quantum system by implementing the circuit of quantum gates.

10. A method, comprising:

implementing a quantum algorithm on a quantum computer for simulating a general sparse time-dependent quantum system represented by a time-dependent Hamiltonian H(t), wherein the quantum algorithm does not use graph decomposition techniques by:

approximating a truncation and discretization of a Dyson series for the time-dependent Hamiltonian, H(t), with a spectral-norm $\alpha = \max_t \|h(t)\|$ and average rate-of-change $$\langle \|\dot H\| \rangle = \frac{1}{t}\int_0^t \|\dot H(s)\| ds;$$

compiling a circuit of quantum gates representing the approximated truncated and discretized Dyson series; and implementing the quantum algorithm on the quantum computer by implementing the circuit of quantum gates.

11. The method of claim 10, wherein the time-dependent Hamiltonian used in the simulation is represented in the interaction picture.

12. The method of claim 10, wherein the simulation uses linear combinations of unitaries performed on a diagonally dominant matrix.

13. The method of claim 10, wherein the quantum system is modelled by a Hubbard model.

14. The method of claim 10, wherein the quantum system describes a physical chemical system, or a molecule.

15. The method of claim 10, further comprising reducing the number of ancillas used to index a time for the simulation by avoiding duplication of registers needed to index a time for the simulation.

\* \* \* \* \*